US012810484B2

(12) United States Patent
Oh

(10) Patent No.: US 12,810,484 B2
(45) Date of Patent: Nov. 24, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Hyunmook Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/995,004

(22) PCT Filed: Jul. 17, 2023

(86) PCT No.: PCT/KR2023/010183
§ 371 (c)(1),
(2) Date: Jan. 15, 2025

(87) PCT Pub. No.: WO2024/014935
PCT Pub. Date: Jan. 18, 2024

(65) Prior Publication Data

US 2026/0024229 A1 Jan. 22, 2026

(30) Foreign Application Priority Data

Jul. 15, 2022 (KR) ........................ 10-2022-0087808

(51) Int. Cl.
*H04N 19/105* (2014.01)
*G06T 9/00* (2006.01)
*H04N 19/169* (2014.01)
*H04N 19/70* (2014.01)

(52) U.S. Cl.
CPC ........... *G06T 9/001* (2013.01); *H04N 19/105* (2014.11); *H04N 19/1883* (2014.11); *H04N 19/70* (2014.11)

(58) Field of Classification Search
CPC .. G06T 9/001; H04N 19/105; H04N 19/1883; H04N 19/70
USPC ........................................................ 375/240.01
See application file for complete search history.

(56) References Cited

U.S. PATENT DOCUMENTS

2020/0413096 A1* 12/2020 Zhang .................. H04N 19/176
2021/0272324 A1 9/2021 Lasserre et al.
2021/0383590 A1 12/2021 Roimela et al.

FOREIGN PATENT DOCUMENTS

KR 10-2022-0027847 A 3/2022
KR 10-2022-0077097 A 6/2022
WO 2022/149810 A1 7/2022

OTHER PUBLICATIONS

International Search Report and Written Opinion in International Appln. No. PCT/KR2023/010183, mailed on Oct. 26, 2023, 16 pages (with English translation).
Extended European Search Report in European Appln. No. 23840026.1, mailed on Jun. 19, 2026, 11 pages.

(Continued)

*Primary Examiner* — Nguyen T Truong
(74) *Attorney, Agent, or Firm* — Fish & Richardson P.C.

(57) ABSTRACT

A point cloud data transmission method according to embodiments may comprise the steps of: encoding point cloud data; and transmitting a bitstream including the point cloud data. A point cloud data reception method according to embodiments may comprise the steps of: receiving a bitstream including point cloud data; and decoding the point cloud data.

15 Claims, 32 Drawing Sheets

(56) References Cited

OTHER PUBLICATIONS

Oh et al., "[G-PCC][EE13.44] Report on attribute layer-group slicing," International Organisation For Standardisation Organisation Internationale De Normalisation ISO/IEC JTC 1/SC 29/WG 7 Coding Of Moving Pictures and Audio, ISO/IEC JTC 1/SC 29/WG 7 m62288, Online, Jan. 2023, 6 pages.

Oh et al., "[G-PCC][EE13.44] Report on attribute layer-group slicing," International Organisation For Standardisation Organisation Internationale De Normalisation ISO/IEC JTC 1/SC 29/WG 7 Coding Of Moving Pictures and Audio, ISO/IEC JTC 1/SC 29/WG 7 m62288, Online, Jan. 2023, 9 pages.

* cited by examiner

FIG. 27

| seq_parameter_set( ) { | Descriptor |
|---|---|
| ...... | |
| sps_extension_flag | u(1) |
| if(sps_extension_flag) { | |
| layer_group_enabled_flag | u(1) |
| if(layer_group_enabled_flag) { | |
| num_layer_groups_minus1 | u(8) |
| for(i=0;<=num_layer_groups_minus1;i++) { | |
| layer_group_id[i] | u(8) |
| num_layers_minus[i] | u(8) |
| subgroup_enabled_flag[i] | u(1) |
| } | |
| if(subgroup_enabled_flags( ) ) { | |
| subgroup_bbox_origin_bits_minus1 | ue(v) |
| subgroup_bbox_size_bits_minus1 | ue(v) |
| } | |
| root_subgroup_bbox_origin | ue(v) |
| root_subgroup_bbox_size | ue(v) |
| } | |
| while(more_data_in_data_unit( ) ) | |
| sps_extension_data_flag | u(1) |
| } | |
| byte_alignment( ) | |
| } | |

FIG. 28

| attribute_data_unit_header( ) { | Descriptor |
|---|---|
| ...... | |
| if(layer_group_enabled_flag) { | |
| subgroup_weight_adj_coeff_a_bits_minus1 | ue(v) |
| subgroup_weight_adj_coeff_b_bits_minus1 | ue(v) |
| subgroup_weight_adj_coeff_a | ue(v) |
| subgroup_weight_adj_coeff_b | ue(v) |
| } | |
| byte_alignment( ) | |
| } | |

FIG. 29

| dependent_attribute_data_unit_header( ) { | Descriptor |
|---|---|
| dadu_attribute_parameter_set_id | u(4) |
| dadu_sps_attr_idx | ue(v) |
| dadu_slice_id | ue(v) |
| layer_group_id | u(8) |
| if(aps_attr_ref_id_present_flag) | |
| attr_ref_layer_group_id | u(8) |
| if(subgroup_enabled_flag[layer_group_id]) { | |
| subgroup_id | u(16) |
| if(aps_attr_ref_id_present_flag &&subgroup_enabled_flag[attr_ref_layer_group_id]) { | |
| attr_ref_subgroup_id | u(16) |
| attr_context_reference_indication_flag | u(1) |
| } | |
| } | |
| subgroup_weight_adj_coeff_present_flag | u(1) |
| if(subgroup_weight_adj_coeff_present_flag) { | |
| subgroup_weight_adj_coeff_a | ue(v) |
| subgroup_weight_adj_coeff_b | ue(v) |
| } | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2023/010183, filed on Jul. 17, 2023, which claims the benefit of Korean Application No. 10-2022-0087808, filed on Jul. 15, 2022. The disclosures of the prior applications are incorporated by reference in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

In one aspect of the present disclosure, a method of transmitting point cloud data may include encoding point cloud data, and transmitting a bitstream containing the point cloud data. In another aspect of the present disclosure, a method of receiving point cloud data may include receiving a bitstream containing point cloud data, and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts.

FIG. 27 illustrates a sequence parameter set according to embodiments;

FIG. 28 illustrates an attribute parameter set and an attribute data unit header according to embodiments;

FIG. 29 illustrates a dependent attribute data unit header according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
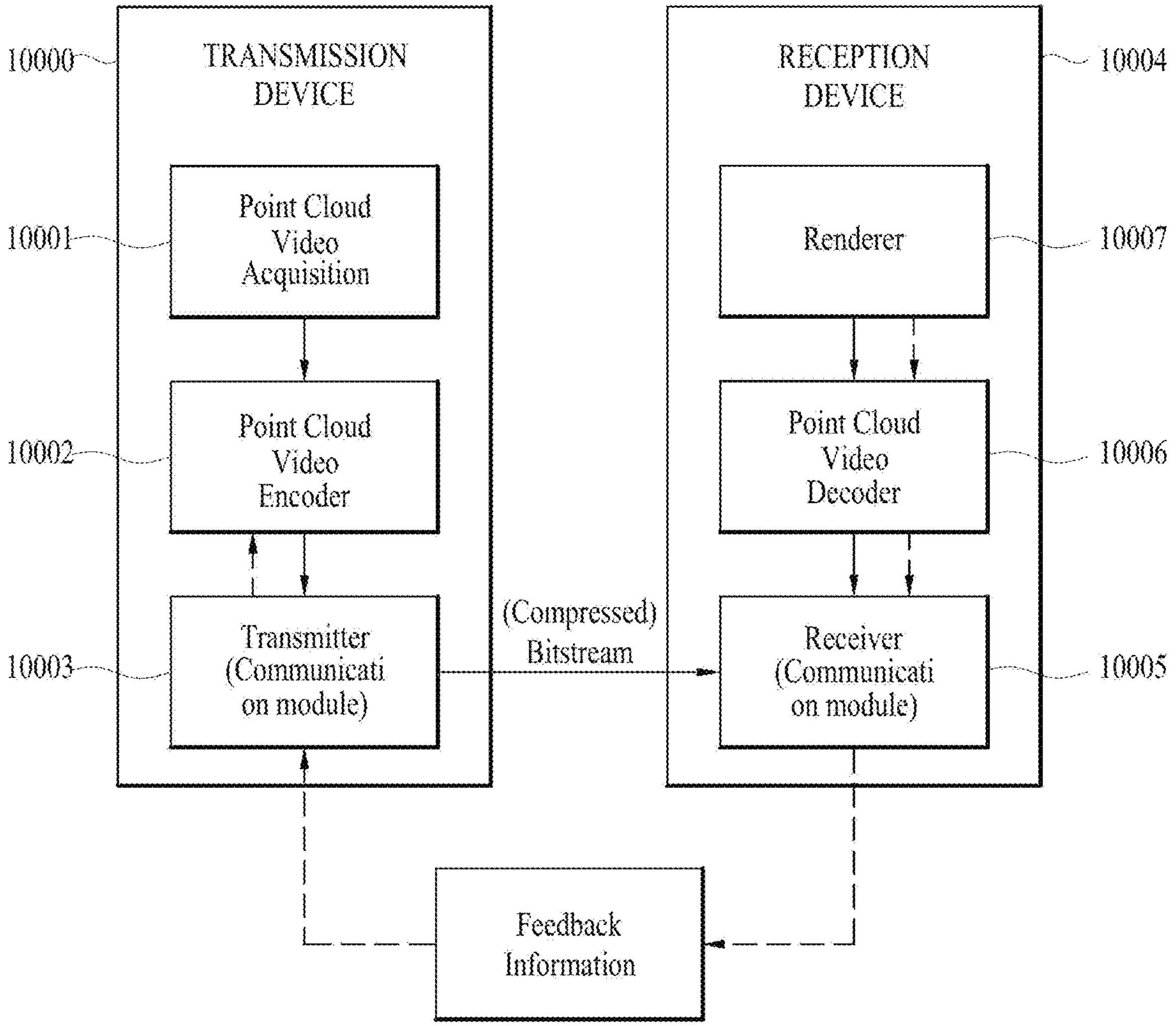
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data, point cloud data, or the like. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the reverse process to the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
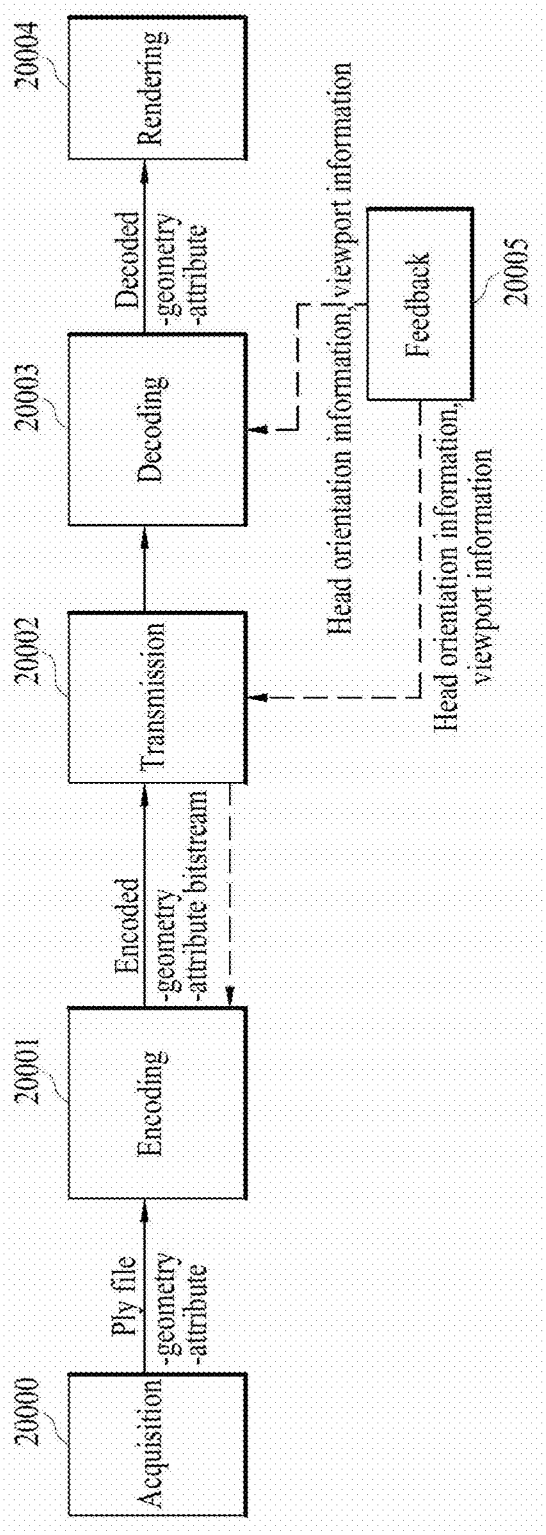
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, position information, position data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry information and attribute information about a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus a detailed description thereof is omitted.

Figure 3:
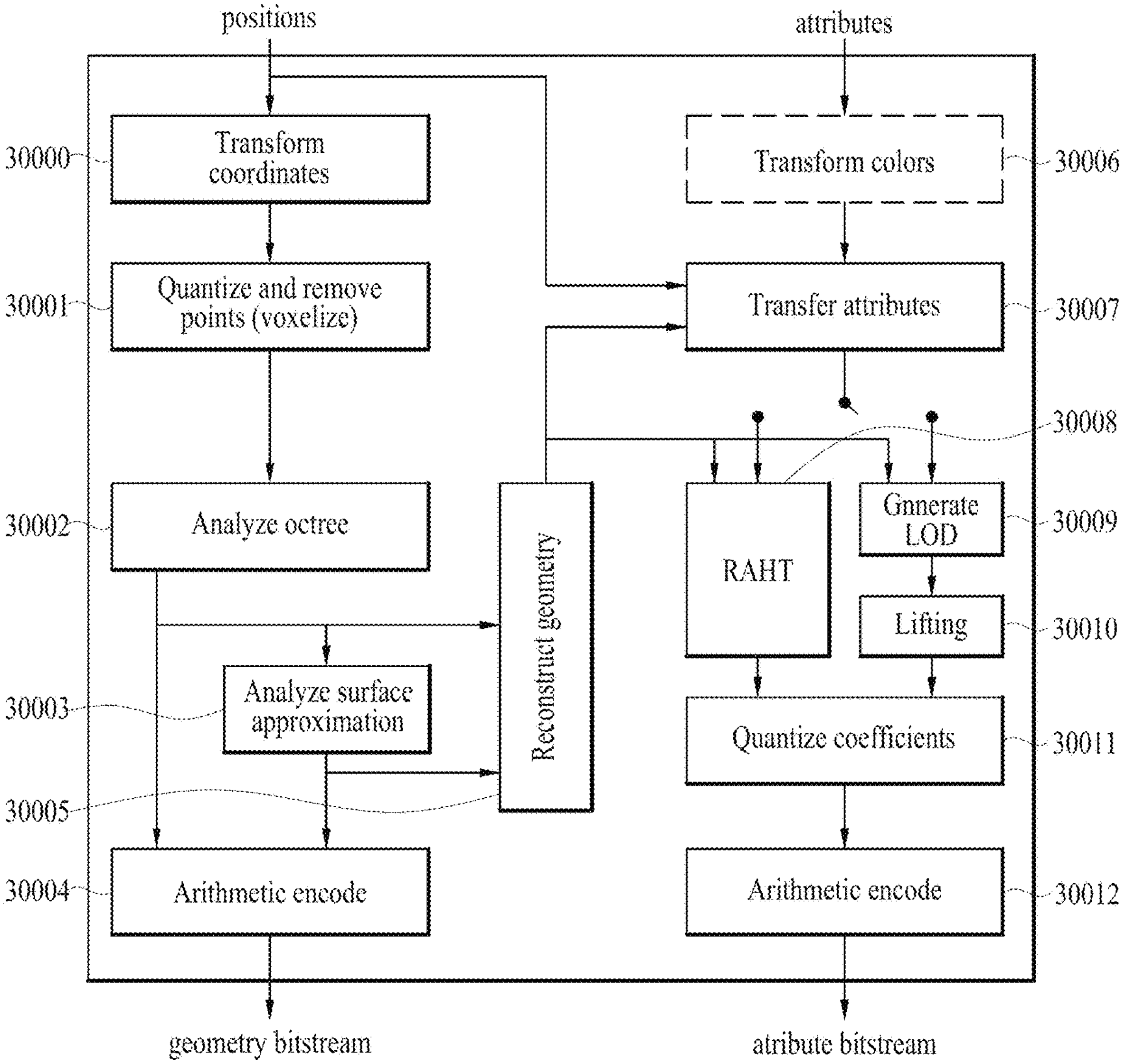
FIG. 3 illustrates an exemplary point cloud encoder according to embodiments.

FIG. 3 illustrates an exemplary point cloud encoder according to embodiments.

FIG. 3 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 30000, a quantizer (Quantize and remove points (voxelize)) 30001, an octree analyzer (Analyze octree) 30002, and a surface approximation analyzer (Analyze surface approximation) 30003, an arithmetic encoder (Arithmetic encode) 30004, a geometry reconstructor (Reconstruct geometry) 30005, a color transformer (Transform colors) 30006, an attribute transformer (Transform attributes) 30007, a RAHT transformer (RAHT) 30008, an LOD generator (Generate LOD) 30009, a lifting transformer (Lifting) 30010, a coefficient quantizer (Quantize coefficients) 30011, and/or an arithmetic encoder (Arithmetic encode) 30012.

The coordinate transformer 30000, the quantizer 30001, the octree analyzer 30002, the surface approximation analyzer 30003, the arithmetic encoder 30004, and the geometry reconstructor 30005 may perform geometry encoding. The geometry encoding according to the embodiments may include octree geometry coding, predictive tree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 30000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 30001 according to the embodiments quantizes the geometry. For example, the quantizer 30001 may quantize the points based on a minimum position value of all points (e.g., a minimum value on each of the X, Y, and Z axes). The quantizer 30001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 30001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 30001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 30002 according to the embodiments performs octree geometry coding (or octree coding) to present voxels in an octree structure. The octree structure represents points matched with voxels, based on the octal tree structure.

The surface approximation analyzer 30003 according to the embodiments may analyze and approximate the octree. The octree analysis and approximation according to the embodiments is a process of analyzing a region containing a plurality of points to efficiently provide octree and voxelization.

The arithmetic encoder 30004 according to the embodiments performs entropy encoding on the octree and/or the approximated octree. For example, the encoding scheme includes arithmetic encoding. As a result of the encoding, a geometry bitstream is generated.

The color transformer 30006, the attribute transformer 30007, the RAHT transformer 30008, the LOD generator 30009, the lifting transformer 30010, the coefficient quantizer 30011, and/or the arithmetic encoder 30012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 30006 according to the embodiments performs color transform coding of transforming color values (or textures) included in the attributes. For example, the color transformer 30006 may transform the format of color information (for example, from RGB to YCbCr). The operation of the color transformer 30006 according to embodiments may be optionally applied according to the color values included in the attributes.

The geometry reconstructor 30005 according to the embodiments reconstructs (decompresses) the octree and/or the approximated octree. The geometry reconstructor 30005 reconstructs the octree/voxels based on the result of analyzing the distribution of points. The reconstructed octree/voxels may be referred to as reconstructed geometry (restored geometry).

The attribute transformer 30007 according to the embodiments performs attribute transformation to transform the attributes based on the reconstructed geometry and/or the positions on which geometry encoding is not performed. As described above, since the attributes are dependent on the geometry, the attribute transformer 30007 may transform the attributes based on the reconstructed geometry information. For example, based on the position value of a point included in a voxel, the attribute transformer 30007 may transform the attribute of the point at the position. As described above, when the position of the center of a voxel is set based on the positions of one or more points included in the voxel, the attribute transformer 30007 transforms the attributes of the one or more points. When the trisoup geometry encoding is performed, the attribute transformer 30007 may transform the attributes based on the trisoup geometry encoding.

The attribute transformer 30007 may perform the attribute transformation by calculating the average of attributes or attribute values of neighboring points (e.g., color or reflectance of each point) within a specific position/radius from the position (or position value) of the center of each voxel. The attribute transformer 30007 may apply a weight according to the distance from the center to each point in calculating the average. Accordingly, each voxel has a position and a calculated attribute (or attribute value).

The attribute transformer 30007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 30007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 30009.

The RAHT transformer 30008 according to the embodiments performs RAHT coding for predicting attribute information based on the reconstructed geometry information. For example, the RAHT transformer 30008 may predict attribute information of a node at a higher level in the octree based on the attribute information associated with a node at a lower level in the octree.

The LOD generator 30009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 30010 according to the embodiments performs lifting transform coding of transforming the attributes a point cloud based on weights. As described above, lifting transform coding may be optionally applied.

The coefficient quantizer 30011 according to the embodiments quantizes the attribute-coded attributes based on coefficients.

The arithmetic encoder 30012 according to the embodiments encodes the quantized attributes based on arithmetic coding.

Although not shown in the figure, the elements of the point cloud encoder of FIG. 3 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 3 described above. Additionally, the one or more processors may operate or execute a set of software programs and/or instructions for performing the operations and/or functions of the elements of the point cloud encoder of FIG. 3. The one or more memories according to the embodiments may include a high speed random access memory, or include a non-volatile memory (e.g., one or more magnetic disk storage devices, flash memory devices, or other non-volatile solid-state memory devices).

Figure 4:
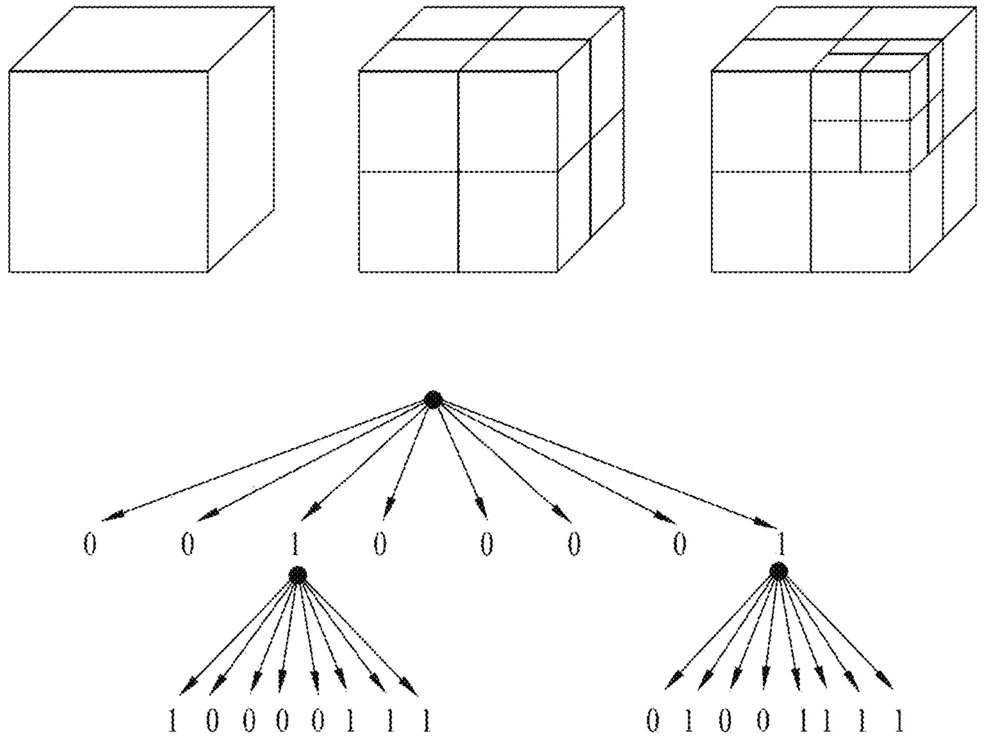
FIG. 4 shows an example of an octree and occupancy code according to embodiments.

FIG. 4 shows an example of an octree and occupancy code according to embodiments.

As described with reference to FIGS. 1 to 3, the point cloud content providing system (point cloud video encoder 10002) or the point cloud encoder (e.g., the octree analyzer 30002) performs octree geometry coding (or octree coding) based on an octree structure to efficiently manage the region and/or position of the voxel.

The upper part of FIG. 4 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}(\text{Log2}(\text{Max}(x\_n\text{^}int, y\_n\text{^}int, z\_n\text{^}in, n = 1, \ldots, N) + 1))$$

As shown in the middle of the upper part of FIG. 4, the entire 3D space may be divided into eight spaces according to partition. Each divided space is represented by a cube with six faces. As shown in the upper right of FIG. 4, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 4 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 4 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 30004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 30002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 30004) according to the embodiments may perform entropy coding on the positions (or position values) of the points.

The point cloud encoder (e.g., the surface approximation analyzer 30003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (e.g., the geometry reconstructor 30005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix} \quad 1$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2$$

$$\begin{bmatrix} \sigma_x^2 \\ \sigma_y^2 \\ \sigma_z^2 \end{bmatrix} = \sum_{i=1}^{n}\begin{bmatrix} \bar{x}_i \\ \bar{y}_i^2 \\ \bar{z}_i^2 \end{bmatrix} \quad 3$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 5:
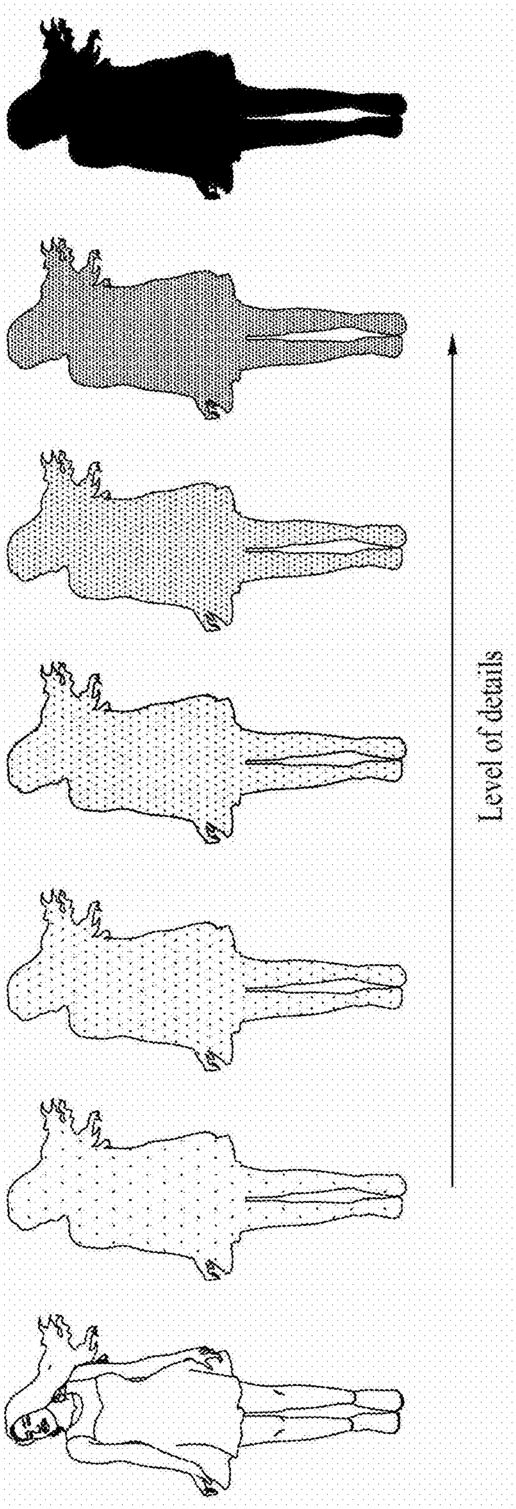
FIG. 5 illustrates an example of point configuration in each LOD according to embodiments.

FIG. 5 illustrates an example of point configuration in each LOD according to embodiments.

As described with reference to FIGS. 1 to 4, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (e.g., the LOD generator 30009) may classify (or reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 6:
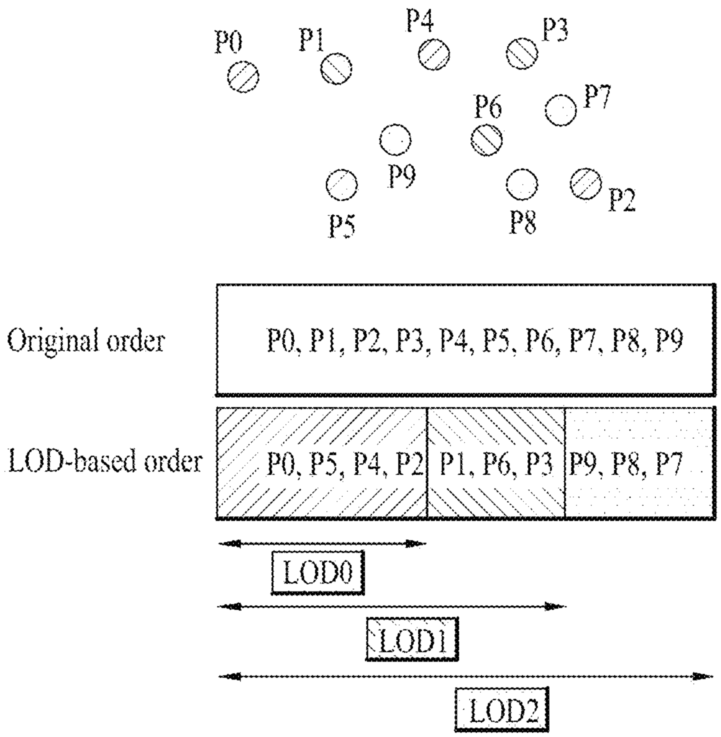
FIG. 6 illustrates an example of point configuration in each LOD according to embodiments.

FIG. 6 illustrates an example of point configuration for each LOD according to embodiments.

As described with reference to FIGS. 1 to 5, the point cloud content providing system, or the point cloud encoder (e.g., the point cloud video encoder 10002, the point cloud encoder of FIG. 3, or the LOD generator 30009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 6 shows examples (P0 to P9) of points of the point cloud content distributed in a 3D space. In FIG. 6, the original order represents the order of points P0 to P9 before LOD generation. In FIG. 6, the LOD based order represents the order of points according to the LOD generation. Points are reorganized by LOD. Also, a high LOD contains the points belonging to lower LODs. As shown in FIG. 6, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 3, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 30011) may quantize and inversely quantize the residuals (which may be called residual attributes, residual attribute values, or attribute prediction residuals, attribute residuals) obtained by subtracting a predicted attribute (attribute value) from the attribute (attribute value) of each point. The quantization process is configured as shown in the following table.

TABLE Attribute prediction residuals quantization pseudo code

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE Attribute prediction residuals inverse quantization pseudo code

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 30012) according to the embodiments may perform entropy coding on the quantized and inversely quantized residual values as described above. When the predictor of each point has no neighbor point, the point cloud encoder according to the embodiments (e.g., the arithmetic encoder 30012) may perform entropy coding on the attributes of the corresponding point without performing the above-described operation.

The point cloud encoder according to the embodiments (e.g., the lifting transformer 30010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 30011) according to the embodiments quantizes the predicted attribute values. In addition, the point cloud encoder (e.g., the arithmetic encoder 30012) performs entropy coding on the quantized attribute values.

The point cloud encoder (for example, the RAHT transformer 30008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,x}} \\ h_{l-1_{x,y,z}} \end{bmatrix} = T_{w1w2}\begin{bmatrix} g_{l_{2x,y,z}} \\ h_{l_{2x+1,y,z}} \end{bmatrix}, \; T_{w1w2} = \frac{1}{\sqrt{w1+w2}}\begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 300012). The weights are calculated as $w_{l-1_{x,y,z}} w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001}\begin{bmatrix} g_{1_{0,0,0z}} \\ g_{1_{0,0,1}} \end{bmatrix}$$

The value of gDC is also quantized and subjected to entropy coding like the high-pass coefficients.

Figure 7:
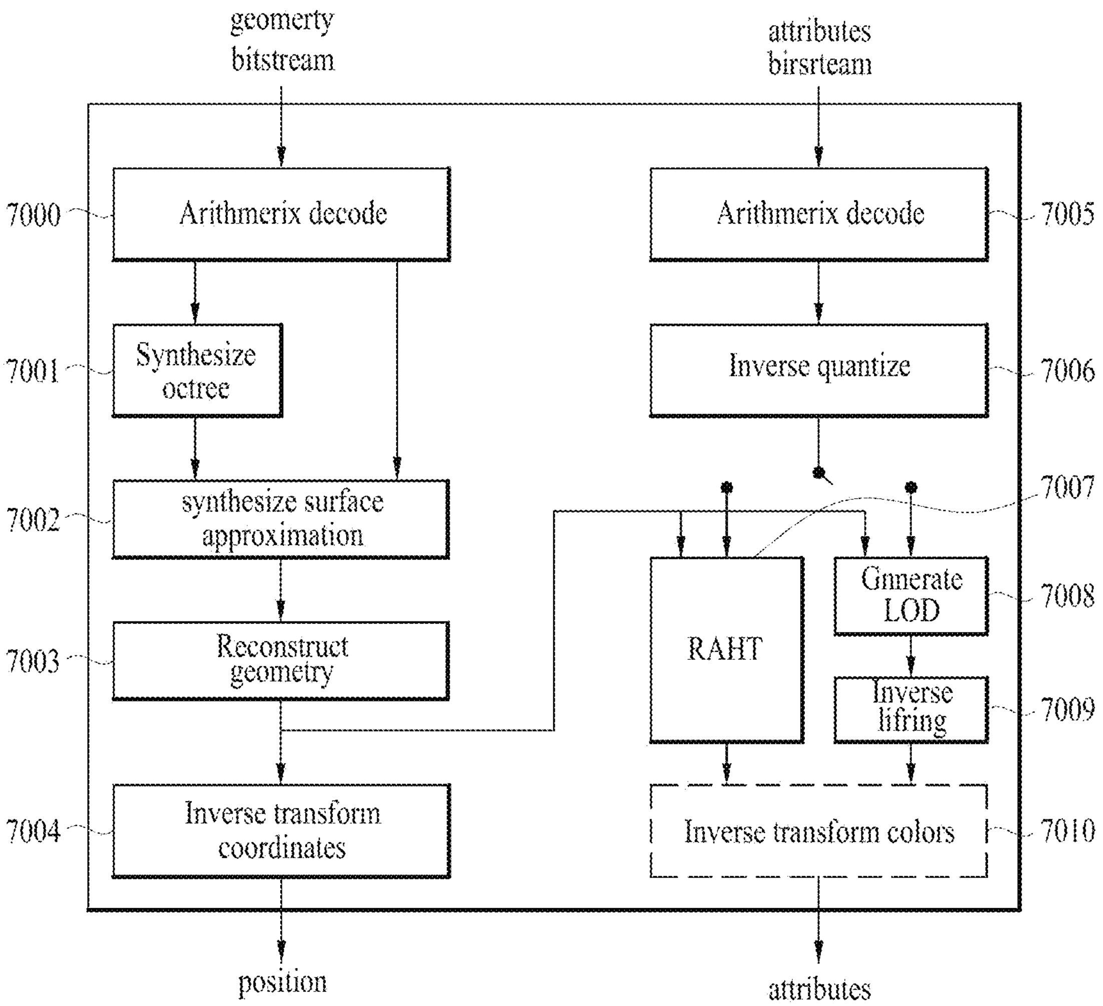
FIG. 7 illustrates a point cloud decoder according to embodiments.

FIG. 7 illustrates a point cloud decoder according to embodiments.

The point cloud decoder illustrated in FIG. 7 is an example of the point cloud decoder and may perform a decoding operation, which is a reverse process to the encoding operation of the point cloud encoder illustrated in FIGS. 1 to 6.

As described with reference to FIGS. 1 and 6, the point cloud decoder may perform geometry decoding and attribute decoding. The geometry decoding is performed before the attribute decoding.

The point cloud decoder according to the embodiments includes an arithmetic decoder (Arithmetic decode) 7000, an octree synthesizer (Synthesize octree) 7001, a surface approximation synthesizer (Synthesize surface approximation) 7002, and a geometry reconstructor (Reconstruct geometry) 7003, a coordinate inverse transformer (Inverse transform coordinates) 7004, an arithmetic decoder (Arithmetic decode) 7005, an inverse quantizer (Inverse quantize) 7006, a RAHT transformer 7007, an LOD generator (Generate LOD) 7008, an inverse lifter (inverse lifting) 7009, and/or a color inverse transformer (Inverse transform colors) 7010.

The arithmetic decoder 7000, the octree synthesizer 7001, the surface approximation synthesizer 7002, and the geometry reconstructor 7003, and the coordinate inverse transformer 7004 may perform geometry decoding. The geometry decoding according to the embodiments may include direct decoding and trisoup geometry decoding. The direct coding and trisoup geometry decoding are selectively applied. The geometry decoding is not limited to the above-described example, and is performed as a reverse process to the geometry encoding described with reference to FIGS. 1 to 6.

The arithmetic decoder 7000 according to the embodiments decodes the received geometry bitstream based on the arithmetic coding. The operation of the arithmetic decoder 7000 corresponds to the reverse process to the arithmetic encoder 30004.

The octree synthesizer 7001 according to the embodiments may generate an octree by acquiring an occupancy code from the decoded geometry bitstream (or information on the geometry secured as a result of decoding). The occupancy code is configured as described in detail with reference to FIGS. 1 to 6.

When the trisoup geometry encoding is applied, the surface approximation synthesizer 7002 according to the embodiments may synthesize a surface based on the decoded geometry and/or the generated octree.

The geometry reconstructor 7003 according to the embodiments may regenerate geometry based on the surface and/or the decoded geometry. As described with reference to FIGS. 1 to 9, direct coding and trisoup geometry encoding are selectively applied. Accordingly, the geometry reconstructor 7003 directly imports and adds position information about the points to which direct coding is applied. When the trisoup geometry encoding is applied, the geometry reconstructor 7003 may reconstruct the geometry by performing the reconstruction operations of the geometry reconstructor 30005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 7004 according to the embodiments may acquire positions of the points by transforming the coordinates based on the reconstructed geometry.

The arithmetic decoder 7005, the inverse quantizer 7006, the RAHT transformer 7007, the LOD generator 7008, the inverse lifter 7009, and/or the color inverse transformer 7010 may perform the attribute decoding described with reference to FIG. 6. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 7005 according to the embodiments decodes the attribute bitstream by arithmetic coding.

The inverse quantizer 7006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 7007, the LOD generator 7008, and/or the inverse lifter 7009 may process the reconstructed geometry and the inversely quantized attributes. As described above, the RAHT transformer 7007, the LOD generator 7008, and/or the inverse lifter 7009 may selectively perform a decoding operation corresponding to the encoding of the point cloud encoder.

The color inverse transformer 7010 according to the embodiments performs inverse transform coding to inversely transform a color value (or texture) included in the decoded attributes. The operation of the color inverse transformer 7010 may be selectively performed based on the operation of the color transformer 30006 of the point cloud encoder.

Although not shown in the figure, the elements of the point cloud decoder of FIG. 7 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 7 described above. Additionally, the one or more processors may operate or execute a set of software programs and/or instructions for performing the operations and/or functions of the elements of the point cloud decoder of FIG. 7.

Figure 8:
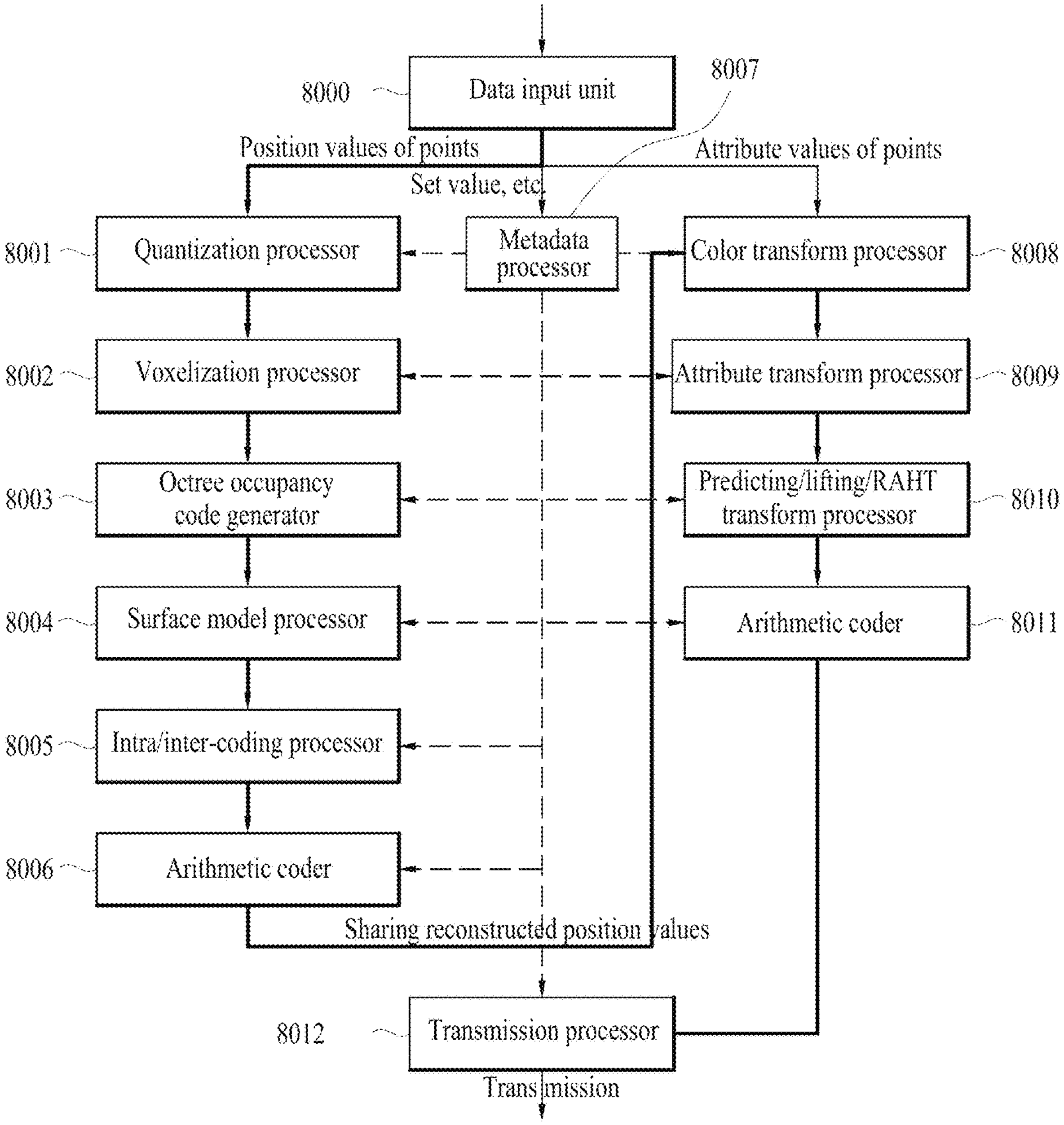
FIG. 8 illustrates a transmission device according to embodiments.

FIG. 8 illustrates a transmission device according to embodiments.

The transmission device shown in FIG. 8 is an example of the transmission device 10000 of FIG. 1 (or the point cloud encoder of FIG. 3). The transmission device illustrated in FIG. 8 may perform one or more of the operations and methods the same as or similar to those of the point cloud encoder described with reference to FIGS. 1 to 6. The transmission device according to the embodiments may include a data input unit 8000, a quantization processor 8001, a voxelization processor 8002, an octree occupancy code generator 8003, a surface model processor 8004, an intra/inter-coding processor 8005, an arithmetic coder 8006, a metadata processor 8007, a color transform processor 8008, an attribute transform processor 8009, a prediction/lifting/RAHT transform processor 8010, an arithmetic coder 8011 and/or a transmission processor 8012.

The data input unit 8000 according to the embodiments receives or acquires point cloud data. The data input unit 8000 may perform an operation and/or acquisition method the same as or similar to the operation and/or acquisition method of the point cloud video acquirer 10001 (or the acquisition process 20000 described with reference to FIG. 2).

The data input unit 8000, the quantization processor 8001, the voxelization processor 8002, the octree occupancy code generator 8003, the surface model processor 8004, the intra/inter-coding processor 8005, and the arithmetic coder 8006 perform geometry encoding. The geometry encoding according to the embodiments is the same as or similar to the geometry encoding described with reference to FIGS. 1 to 9, and thus a detailed description thereof is omitted.

The quantization processor 8001 according to the embodiments quantizes geometry (e.g., position values of points). The operation and/or quantization of the quantization processor 8001 is the same as or similar to the operation and/or quantization of the quantizer 30001 described with reference to FIG. 3. Details are the same as those described with reference to FIGS. 1 to 9.

The voxelization processor 8002 according to the embodiments voxelizes the quantized position values of the points. The voxelization processor 8002 may perform an operation and/or process the same or similar to the operation and/or the voxelization process of the quantizer 30001 described with reference to FIG. 3. Details are the same as those described with reference to FIGS. 1 to 6.

The octree occupancy code generator 8003 according to the embodiments performs octree coding on the voxelized positions of the points based on an octree structure. The octree occupancy code generator 8003 may generate an occupancy code. The octree occupancy code generator 8003 may perform an operation and/or method the same as or similar to the operation and/or method of the point cloud encoder (or the octree analyzer 30002) described with reference to FIGS. 3 and 4. Details are the same as those described with reference to FIGS. 1 to 6.

The surface model processor 8004 according to the embodiments may perform trisoup geometry encoding based on a surface model to reconstruct the positions of points in a specific region (or node) on a voxel basis. The surface model processor 8004 may perform an operation and/or method the same as or similar to the operation and/or method of the point cloud encoder (e.g., the surface approximation analyzer 30003) described with reference to FIG. 3. Details are the same as those described with reference to FIGS. 1 to 6.

The intra/inter-coding processor 8005 according to the embodiments may perform intra/inter-coding on point cloud data. The intra/inter-coding processor 8005 may perform coding the same as or similar to the intra/inter-coding described with reference to FIG. 7. Details are the same as those described with reference to FIG. 7. According to embodiments, the intra/inter-coding processor 8005 may be included in the arithmetic coder 8006.

The arithmetic coder 8006 according to the embodiments performs entropy encoding on an octree of the point cloud data and/or an approximated octree. For example, the encoding scheme includes arithmetic encoding. The arithmetic coder 8006 performs an operation and/or method the same as or similar to the operation and/or method of the arithmetic encoder 30004.

The metadata processor 8007 according to the embodiments processes metadata about the point cloud data, for example, a set value, and provides the same to a necessary processing process such as geometry encoding and/or attribute encoding. Also, the metadata processor 8007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 8008, the attribute transform processor 8009, the prediction/lifting/RAHT transform processor 8010, and the arithmetic coder 8011 perform the attribute encoding. The attribute encoding according to the embodiments is the same as or similar to the attribute encoding described with reference to FIGS. 1 to 6, and thus a detailed description thereof is omitted.

The color transform processor 8008 according to the embodiments performs color transform coding to transform color values included in attributes. The color transform processor 8008 may perform color transform coding based on the reconstructed geometry. The reconstructed geometry is the same as described with reference to FIGS. 1 to 9. Also, it performs an operation and/or method the same as or similar to the operation and/or method of the color transformer 30006 described with reference to FIG. 3 is performed. A detailed description thereof is omitted.

The attribute transform processor 8009 according to the embodiments performs attribute transformation to transform the attributes based on the reconstructed geometry and/or the positions on which geometry encoding is not performed. The attribute transform processor 8009 performs an operation and/or method the same as or similar to the operation and/or method of the attribute transformer 30007 described with reference to FIG. 3. A detailed description thereof is omitted. The prediction/lifting/RAHT transform processor 8010 according to the embodiments may code the transformed attributes by any one or a combination of RAHT coding, prediction transform coding, and lifting transform coding. The prediction/lifting/RAHT transform processor 8010 performs at least one of the operations the same as or similar to the operations of the RAHT transformer 30008, the LOD generator 30009, and the lifting transformer 30010 described with reference to FIG. 3. In addition, the prediction transform coding, the lifting transform coding, and the RAHT transform coding are the same as those described with reference to FIGS. 1 to 9, and thus a detailed description thereof is omitted.

The arithmetic coder 8011 according to the embodiments may encode the coded attributes based on the arithmetic coding. The arithmetic coder 8011 performs an operation and/or method the same as or similar to the operation and/or method of the arithmetic encoder 300012.

The transmission processor 8012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 8007 according to the embodiments may generate and/or process the signaling information and transmit the same to the transmission processor 8012. According to embodiments, the elements to perform geometry encoding and the elements to perform attribute encoding may share data/information with each other as indicated by dotted lines. The transmission processor 8012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 9:
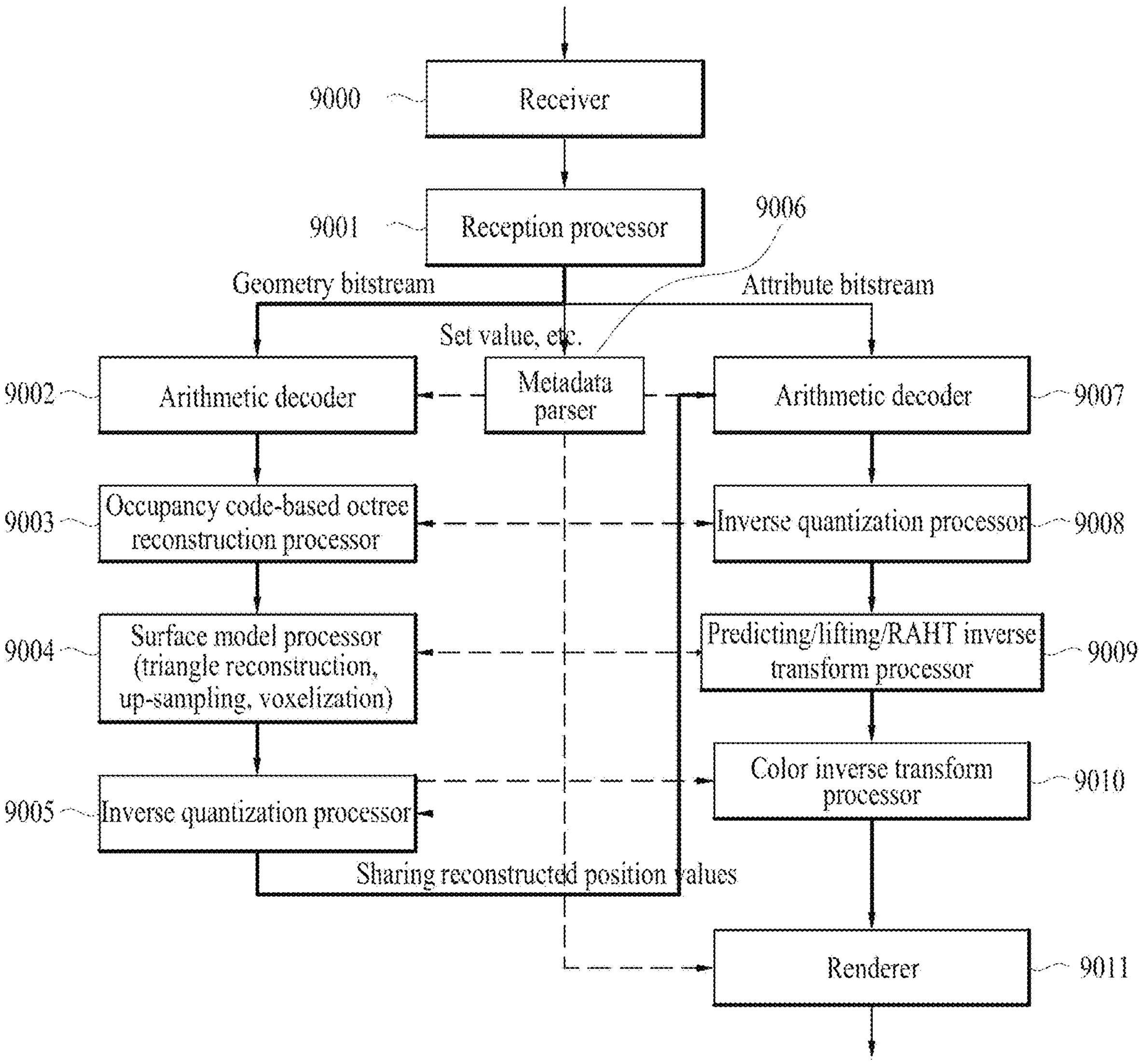
FIG. 9 illustrates a reception device according to embodiments.

FIG. 9 illustrates a reception device according to embodiments.

Figure 10:
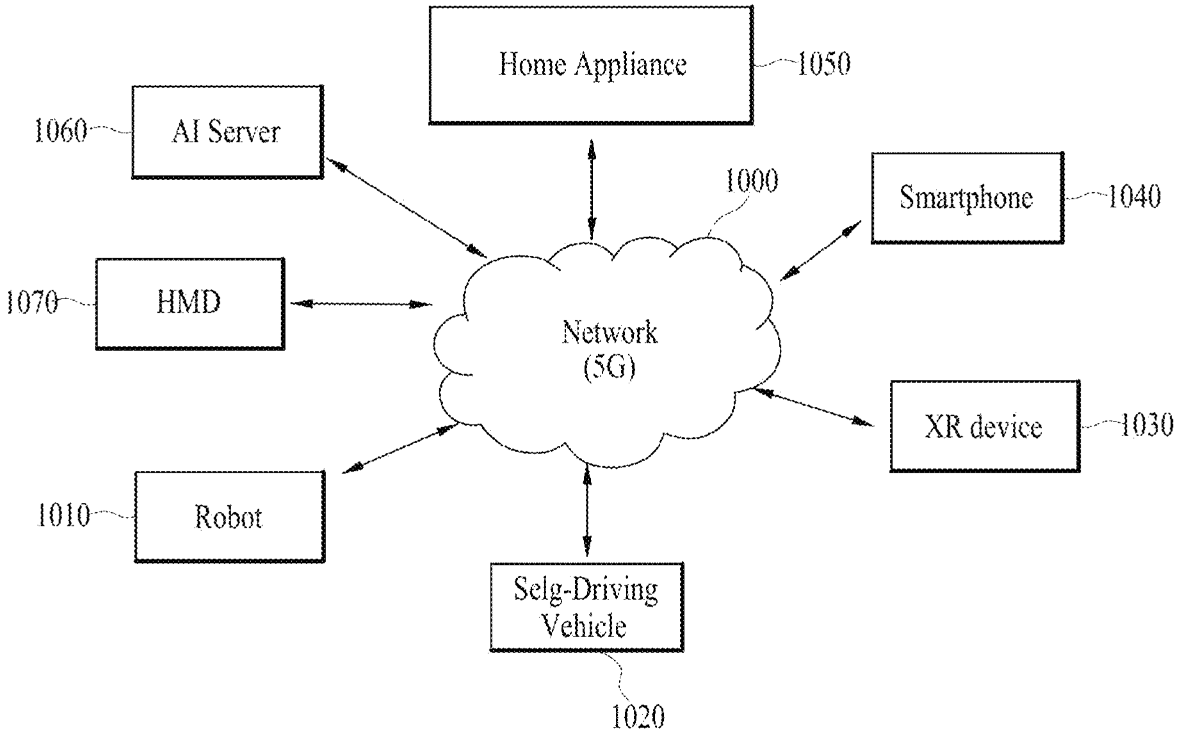
FIG. 10 illustrates an exemplary structure operable in connection with point cloud data transmission/reception methods/devices according to embodiments.
Figure 11:
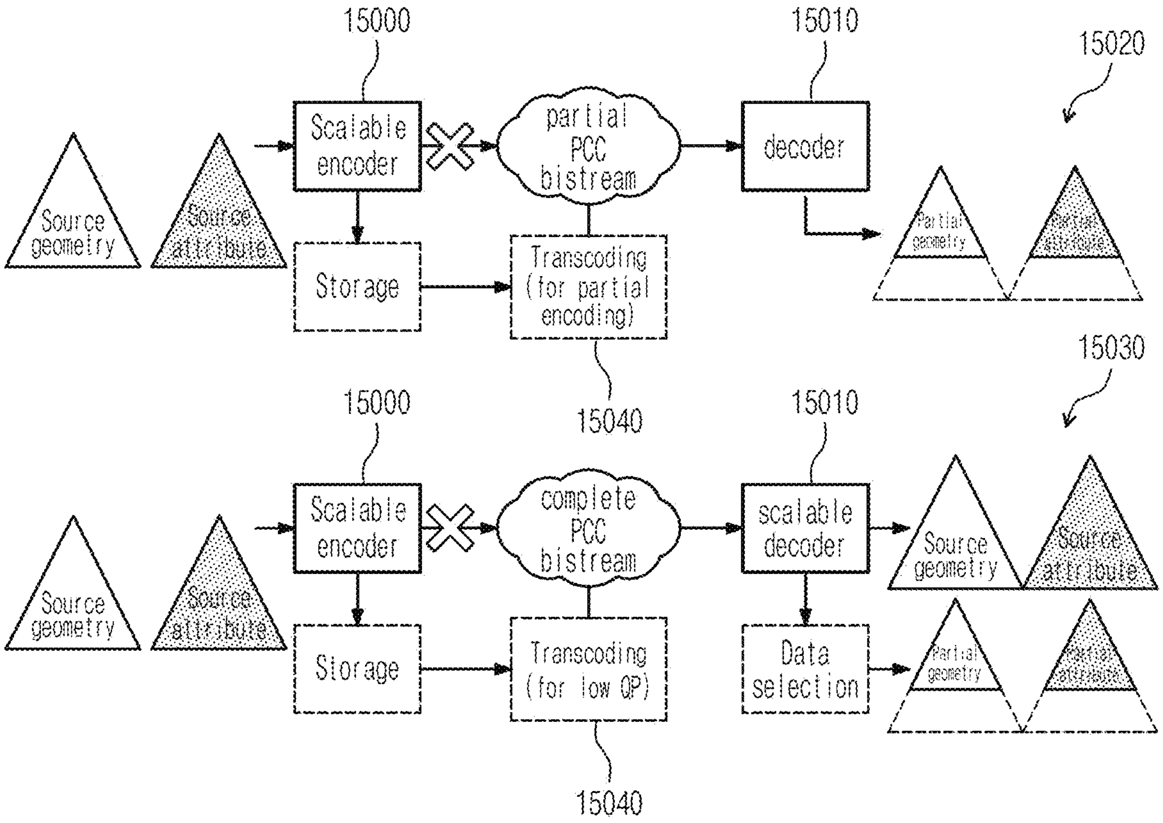
FIG. 11 illustrates a process of encoding, transmitting, and decoding point cloud data according to embodiments.

The reception device illustrated in FIG. 9 is an example of the reception device 10004 of FIG. 1 (or the point cloud decoder of FIGS. 10 and 11). The reception device illustrated in FIG. 9 may perform one or more of the operations and methods the same as or similar to those of the point cloud decoder described with reference to FIGS. 1 to 11.

The reception device according to the embodiment may include a receiver 9000, a reception processor 9001, an arithmetic decoder 9002, an occupancy code-based octree reconstruction processor 9003, a surface model processor (triangle reconstruction, up-sampling, voxelization) 9004, an inverse quantization processor 9005, a metadata parser 9006, an arithmetic decoder 9007, an inverse quantization processor 9008, a prediction/lifting/RAHT inverse transform processor 9009, a color inverse transform processor 9010, and/or a renderer 9011. Each element for decoding according to the embodiments may perform a reverse process to the operation of a corresponding element for encoding according to the embodiments.

The receiver 9000 according to the embodiments receives point cloud data. The receiver 9000 may perform an operation and/or reception method the same as or similar to the operation and/or reception method of the receiver 10005 of FIG. 1. The detailed description thereof is omitted.

The reception processor 9001 according to the embodiments may acquire a geometry bitstream and/or an attribute bitstream from the received data. The reception processor 9001 may be included in the receiver 9000.

The arithmetic decoder 9002, the occupancy code-based octree reconstruction processor 9003, the surface model processor 9004, and the inverse quantization processor 905 may perform geometry decoding. The geometry decoding according to embodiments is the same as or similar to the geometry decoding described with reference to FIGS. 1 to 10, and thus a detailed description thereof is omitted.

The arithmetic decoder 9002 according to the embodiments may decode the geometry bitstream based on arithmetic coding. The arithmetic decoder 9002 performs an operation and/or coding the same as or similar to the operation and/or coding of the arithmetic decoder 7000.

The occupancy code-based octree reconstruction processor 9003 according to the embodiments may reconstruct an octree by acquiring an occupancy code from the decoded geometry bitstream (or information about the geometry secured as a result of decoding). The occupancy code-based octree reconstruction processor 9003 performs an operation and/or method the same as or similar to the operation and/or octree generation method of the octree synthesizer 7001. When the trisoup geometry encoding is applied, the surface model processor 9004 according to the embodiments may perform trisoup geometry decoding and related geometry reconstruction (e.g., triangle reconstruction, up-sampling, voxelization) based on the surface model method. The surface model processor 9004 performs an operation the same as or similar to that of the surface approximation synthesizer 7002 and/or the geometry reconstructor 7003.

The inverse quantization processor 9005 according to the embodiments may inversely quantize the decoded geometry.

The metadata parser 9006 according to the embodiments may parse metadata contained in the received point cloud data, for example, a set value. The metadata parser 9006 may pass the metadata to geometry decoding and/or attribute decoding. The metadata is the same as that described with reference to FIG. 8, and thus a detailed description thereof is omitted.

The arithmetic decoder 9007, the inverse quantization processor 9008, the prediction/lifting/RAHT inverse transform processor 9009 and the color inverse transform processor 9010 perform attribute decoding. The attribute decoding is the same as or similar to the attribute decoding described with reference to FIGS. 1 to 10, and thus a detailed description thereof is omitted.

The arithmetic decoder 9007 according to the embodiments may decode the attribute bitstream by arithmetic coding. The arithmetic decoder 9007 may decode the attribute bitstream based on the reconstructed geometry. The arithmetic decoder 9007 performs an operation and/or coding the same as or similar to the operation and/or coding of the arithmetic decoder 7005.

The inverse quantization processor 9008 according to the embodiments may inversely quantize the decoded attribute bitstream. The inverse quantization processor 9008 performs an operation and/or method the same as or similar to the operation and/or inverse quantization method of the inverse quantizer 7006.

The prediction/lifting/RAHT inverse transform processor 9009 according to the embodiments may process the reconstructed geometry and the inversely quantized attributes. The prediction/lifting/RAHT inverse transform processor 9009 performs one or more of operations and/or decoding the same as or similar to the operations and/or decoding of the RAHT transformer 7007, the LOD generator 7008, and/or the inverse lifter 7009. The color inverse transform processor 9010 according to the embodiments performs inverse transform coding to inversely transform color values (or textures) included in the decoded attributes. The color inverse transform processor 9010 performs an operation and/or inverse transform coding the same as or similar to the operation and/or inverse transform coding of the color inverse transformer 7010. The renderer 9011 according to the embodiments may render the point cloud data.

FIG. 10 illustrates an exemplary structure operable in connection with point cloud data transmission/reception methods/devices according to embodiments.

The structure of FIG. 10 represents a configuration in which at least one of a server 1060, a robot 1010, a self-driving vehicle 1020, an XR device 1030, a smartphone 1040, a home appliance 1050, and/or a head-mount display (HMD) 1070 is connected to the cloud network 1000. The robot 1010, the self-driving vehicle 1020, the XR device 1030, the smartphone 1040, or the home appliance 1050 is called a device. Further, the XR device 1030 may correspond to a point cloud data (PCC) device according to embodiments or may be operatively connected to the PCC device.

The cloud network 1000 may represent a network that constitutes part of the cloud computing infrastructure or is present in the cloud computing infrastructure. Here, the cloud network 1000 may be configured using a 3G network, 4G or Long Term Evolution (LTE) network, or a 5G network.

The server 1060 may be connected to at least one of the robot 1010, the self-driving vehicle 1020, the XR device 1030, the smartphone 1040, the home appliance 1050, and/or the HMD 1070 over the cloud network 1000 and may assist in at least a part of the processing of the connected devices 1010 to 1070.

The HMD 1070 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1010 to 1050 to which the above-described technology is applied will be described. The devices 1010 to 1050 illustrated in FIG. 10 may be operatively connected/coupled to a point cloud data transmission device and reception device according to the above-described embodiments.

< *PCC* + *XR* >

The XR/PCC device 1030 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1030 may analyze 3D point cloud data or image data acquired through various sensors or from an external device and generate position data and attribute data about 3D points. Thereby, the XR/PCC device 1030 may acquire information about the surrounding space or a real object, and render and output an XR object. For example, the XR/PCC device 1030 may match an XR object including auxiliary information about a recognized object with the recognized object and output the matched XR object.

< *PCC* + *XR* + Mobile phone >

The XR/PCC device 1030 may be implemented as a mobile phone 1040 by applying PCC technology.

The mobile phone 1040 may decode and display point cloud content based on the PCC technology.

< *PCC*+Self − driving + *XR* >

The self-driving vehicle 1020 may be implemented as a mobile robot, a vehicle, an unmanned aerial vehicle, or the like by applying the PCC technology and the XR technology.

The self-driving vehicle 1020 to which the XR/PCC technology is applied may represent a self-driving vehicle provided with means for providing an XR image, or a self-driving vehicle that is a target of control/interaction in the XR image. In particular, the self-driving vehicle 1020 which is a target of control/interaction in the XR image may be distinguished from the XR device 1030 and may be operatively connected thereto.

The self-driving vehicle 1020 having means for providing an XR/PCC image may acquire sensor information from sensors including a camera, and output the generated XR/PCC image based on the acquired sensor information. For example, the self-driving vehicle 1020 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 31:
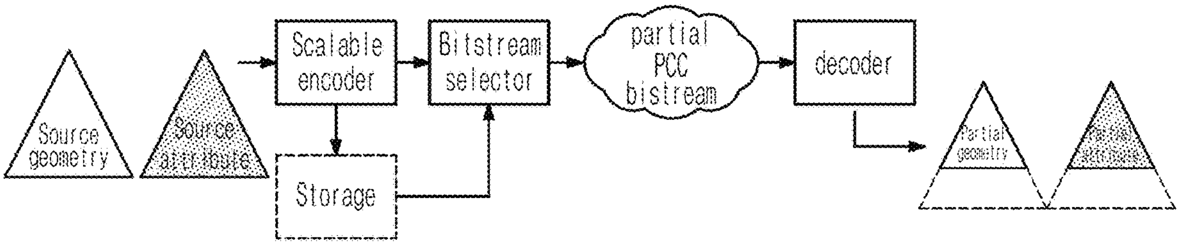
FIG. 31 illustrates a method of transmitting and receiving point cloud data according to embodiments.
Figure 32:
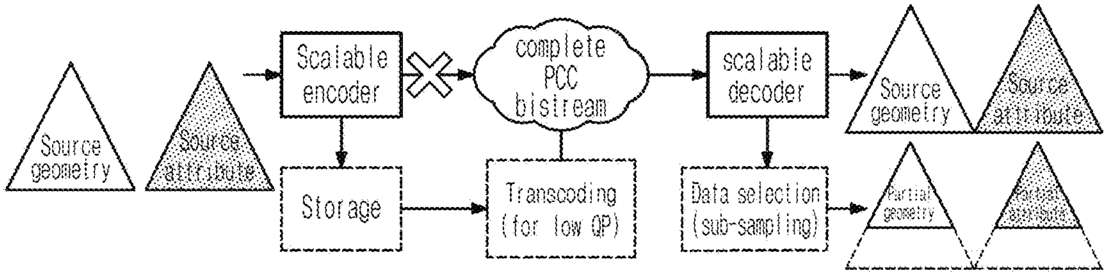
FIG. 32 illustrates a method of transmitting and receiving point cloud data according to embodiments.
Figure 33:
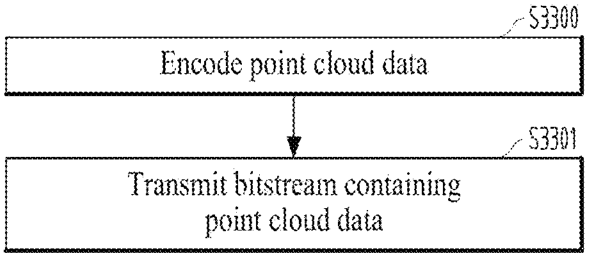
FIG. 33 illustrates a method of transmitting point cloud data according to embodiments.

The point cloud data transmission method/device according to embodiments may be construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 11, 20, and 30 to 32, the transmission method of FIG. 33, and the like.

Figure 34:
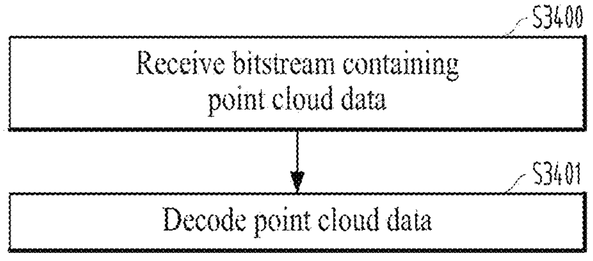
FIG. 34 illustrates a method of receiving point cloud data according to embodiments.

The point cloud data transmission method/device according to embodiments may be construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 11, 20, and 30 to 32, the transmission method of FIG. 34, and the like.

Further, the point cloud data transmission/reception method/device according to the embodiments may be referred to simply as a method/device.

According to embodiments, geometry data, geometry information, position information, and geometry constituting point cloud data are to be construed as having the same meaning. Attribute data and attribute information constituting the point cloud data are to be construed as having the same meaning.

Methods/devices according to embodiments may include and perform predicting transform for partial coding of G-PCC.

Embodiments include a method for efficiently supporting selective decoding of a part of data due to a receiver performance or a transmission speed in transmitting and receiving point cloud data, when necessary. Embodiments include a method for selecting necessary information or removing unnecessary information in a bitstream unit by dividing geometry and attribute data delivered per data unit into semantic units such as geometry octree and Level of Detail (LoD).

Embodiments include a method of configuring a data structure composed of a point cloud. More specifically, embodiments disclose a packing and signaling method for effectively transferring point cloud compression (PCC) data configured based on a layer, and include a method of applying the packing and signaling method to a scalable PCC based service. In particular, embodiments include a method of configuring slice segments and transmitting and receiving the same so as to be more suitable for a scalable PCC service when a direct compression mode is used for position compression. In particular, embodiments may provide a compression structure for efficiently storing and transmitting large point cloud data having a wide distribution and high point density.

Referring to FIG. 3, point cloud data is composed of a position (geometry) (e.g., XYZ coordinates) and attributes (e.g., color, reflectance, intensity, grayscale, opacity, etc.) of each datum. In point cloud compression (PCC), octree-based compression is performed to efficiently compress distribution characteristics of uneven distribution in 3D space, and attribute information is compressed based thereon. FIG. 3 is a flowchart for the transmitting and receiving sides of the PCC.

FIG. 11 illustrates a process of encoding, transmission, and decoding point cloud data according to embodiments.

Each component of FIG. 11 may correspond to hardware, software, a processor, and/or a combination thereof.

A point cloud encoder 15000 is a transmission device carrying out a transmission method according to embodiments, and may scalably encode and transmit point cloud data.

A point cloud decoder 15010 is a reception device carrying out a reception method according to embodiments, and may scalably decode the point cloud data.

Source data received by the encoder 15000 may include geometry data and/or attribute data.

The encoder 15000 scalably encodes the point cloud data, but does not immediately generate a partial PCC bitstream. Instead, when it receives full geometry data and full attribute data, it stores the data in a storage connected to the encoder. Then, the encoder may perform transcoding for partial encoding, and generate and transmit a partial PCC bitstream. The decoder 15010 may receive and decode the partial PCC bitstream to reconstruct partial geometry and/or partial attributes.

Upon receiving the full geometry and full attributes, the encoder 15000 may store the data in the storage connected to the encoder, and transcode the point cloud data with a low quantization parameter (QP) to generate and transmit a complete PCC bitstream. The decoder 15010 may receive and decode the complete PCC bitstream to reconstruct full geometry and/or full attributes. The decoder 15010 may select a partial geometry and/or a partial attribute from the complete PCC bitstream through data selection.

The method/device according to the embodiment compresses and transmits the point cloud data by dividing the position information about data points and feature information such as color/brightness/reflectance, which are the point cloud data, into geometry information and attribute information. In this case, an octree structure having layers may be configured according to the degree of detail or PCC data may be configured according to levels of detail (LoDs). Then, scalable point cloud data coding and representation may be performed based the configured structure or data. In this case, only a part of the point cloud data may be decoded or represented due to the performance of the receiver or the transfer rate.

In this process, the method/device according to the embodiments may remove unnecessary data in advance. In other words, when only a part of the scalable PCC bitstream needs to be transmitted (i.e., only some layers are decoded in scalable decoding), there is no way to select and send only the necessary part. Therefore, 1) the necessary part needs to be re-encoded (15020) after decoding, or 2) the receiver must selectively apply an operation after the whole data is transferred thereto (15030). However, in case 1), delay may occur due to the time for decoding and re-encoding (15020). In case 2), bandwidth efficiency may be degraded due to transmission of unnecessary data. Further, when a fixed bandwidth is used, data quality may need to be lowered for transmission (15030).

Accordingly, the method/device according to the embodiments may define a slice segmentation structure of point cloud data, and signal a scalable layer and slice structure for scalable transmission.

In embodiments, to ensure efficient bitstream delivery and decoding, the bitstream may be divided into specific units to be processed.

For octree-based geometry compression, the method/device according to the embodiments may use entropy-based coding and direct coding together. In this case, a slice configuration for efficiently utilization of scalability is needed.

The unit according to the embodiments may be referred to as an LOD, a layer, a slice, or the like. LOD is the same term as LOD in attribute data coding, but may mean a data unit for a layered structure of a bitstream. It may be a concept corresponding to one depth or a bundle of two or more depths based on the hierarchical structure of point cloud data, for example, depths (levels) of an octree or multiple trees. Similarly, a layer is provided to generate a unit of a sub-bitstream, and is a concept that corresponds to one depth or a bundle of two or more depths, and may correspond to one LOD or two or more LODs. Also, a slice is a unit for configuring a unit of a sub-bitstream, and may correspond to one depth, a part of one depth, or two or more depths. Also, it may correspond to one LOD, a part of one LOD, or two or more LODs. According to embodiments, the LOD, the layer, and the slice may correspond to each other or one of the LOD, the layer, and the slice may be included in another one. Also, a unit according to embodiments may include an LOD, a layer, a slice, a layer group, or a subgroup, and may be referred to as being complementary to each other.

In addition, in the case of a large point cloud that is distributed wide and has a high density of points, a delay issue may be raised because there are many bitstreams that need to be processed to access a region of interest. The method/device according to the embodiments may address this delay issue. For a hierarchical point cloud structure for compression of large point cloud data with low delay according to embodiments, a tile/brick/slice layer-group/slice subgroup, tile/slice layer-group/slice subgroup, slice layer-group/slice subgroup, or layer-group bbox→subgroup bbox relationship may be used.

Figure 12:
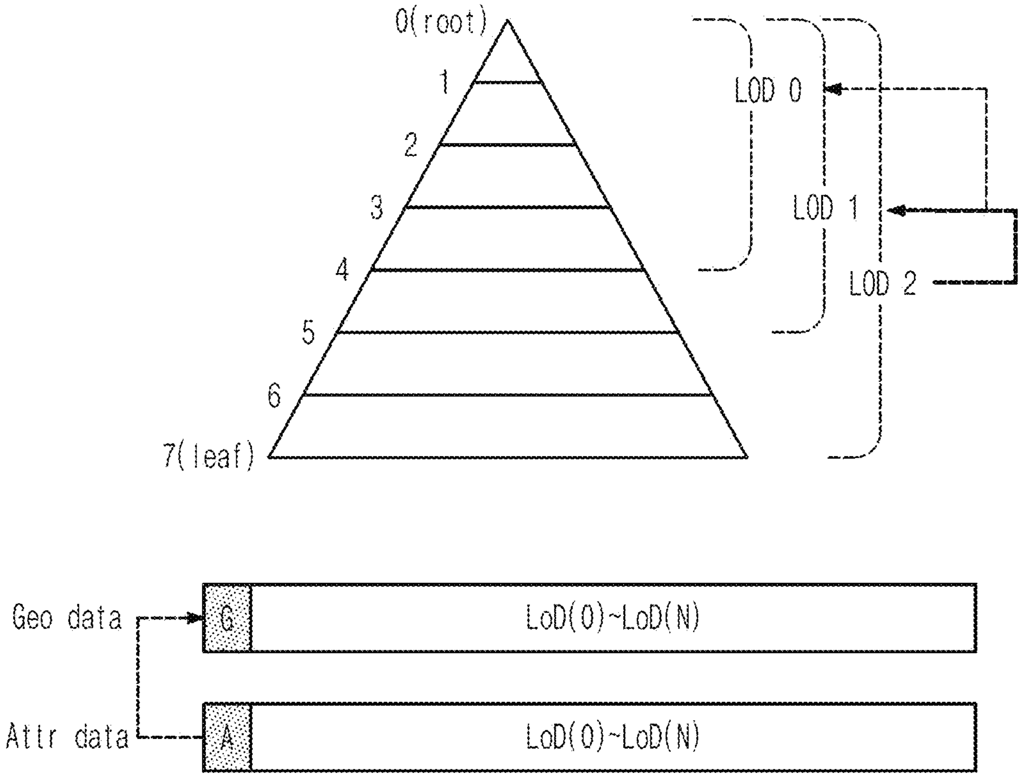
FIG. 12 illustrates a layer-based point cloud data configuration according to embodiments and a geometry and attribute bitstream structure according to embodiments.

FIG. 12 shows a layer-based point cloud data configuration and a structure of geometry and attribute bitstreams according to embodiments.

The transmission method/device according to the embodiments may configure layer-based point cloud data as shown in FIG. 12 to encode and decode the point cloud data.

Embodiments are directed to efficient transmission and decoding by selectively transmitting and decoding data in a bitstream unit for point cloud data configured in layers.

Layering of point cloud data may have a layer structure in terms of SNR, spatial resolution, color, temporal frequency, bit depth, or the like depending on the application field, and may construct layers in a direction in which data density increases based on the octree structure or LoD structure.

Figure 16:
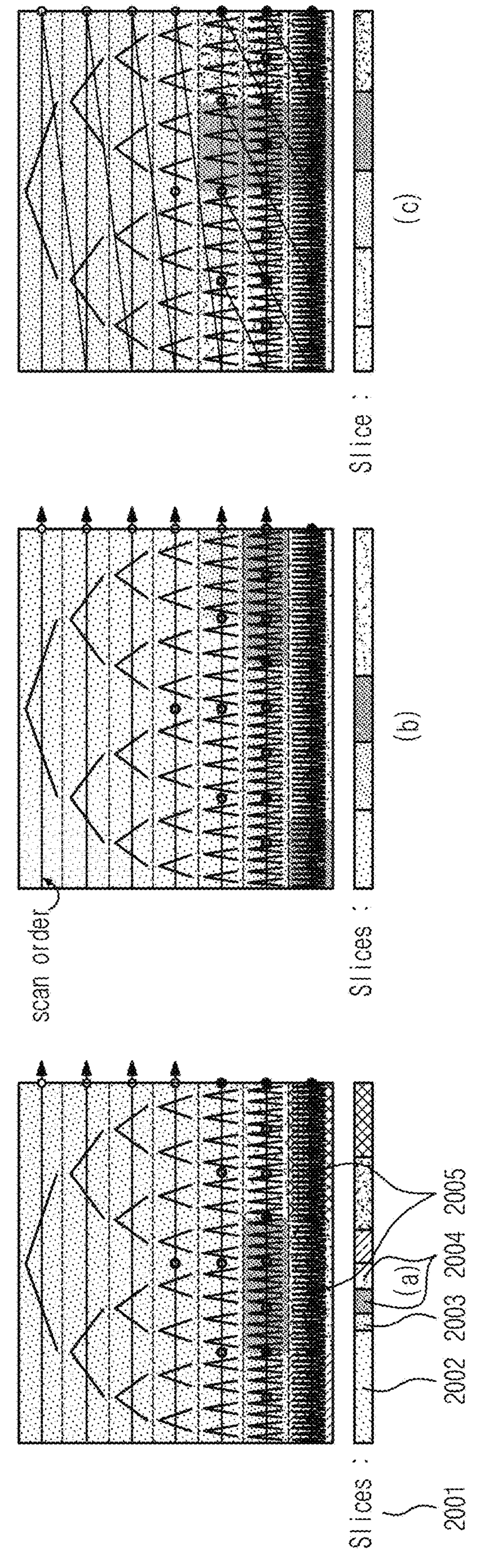
FIG. 16 illustrates a method of configuring slices containing point cloud data according to embodiments.

The method/device according to the embodiments may configure, encode, and decode a geometry bitstream and an attribute bitstream based on the layering as shown in FIG. 16.

A bitstream acquired through point cloud compression by the transmission device/encoder according to the embodiments may be divided into a geometry data bitstream and an attribute data bitstream according to the type of data and transmitted.

Each bitstream according to the embodiments may be composed of slices. Regardless of layer information or LoD information, the geometry data bitstream and the attribute data bitstream may each be configured as one slice and delivered. In this case, when only a part of the layer or LoD is to be used, operations of 1) decoding the bitstream, 2) selecting only a desired part and removing unnecessary parts, and 3) performing encoding again based on only the necessary information should be performed.

Figure 13:
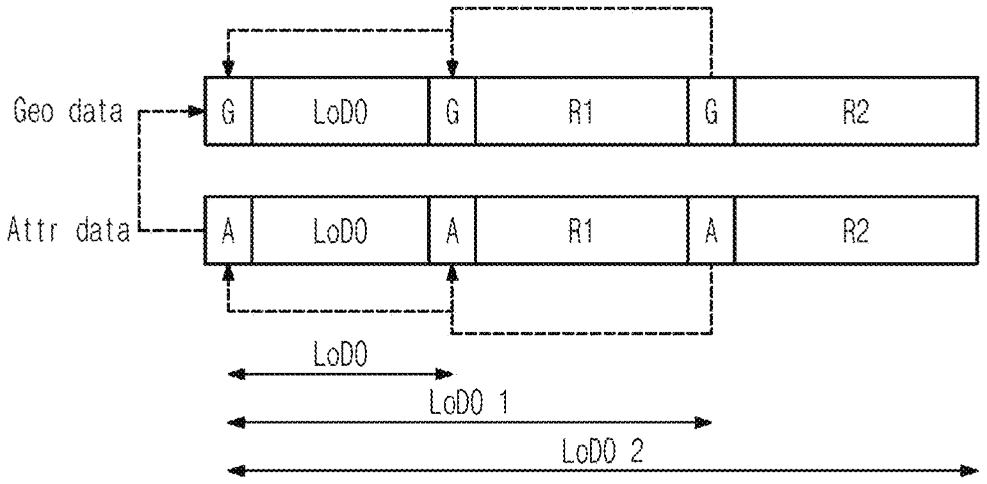
FIG. 13 illustrates bitstream configurations according to embodiments.

FIG. 13 shows a bitstream configuration according to embodiments.

The transmission method/device according to the embodiments may generate a bitstream as shown in FIG. 13, and the reception method/device according to the embodiments may decode point cloud data included in the bitstream as shown in FIG. 13.

Bitstream Configuration According to Embodiments

In embodiments, in order to avoid unnecessary intermediate processes, a bitstream may be divided into layers (or LoDs) and transmitted.

Figure 17:
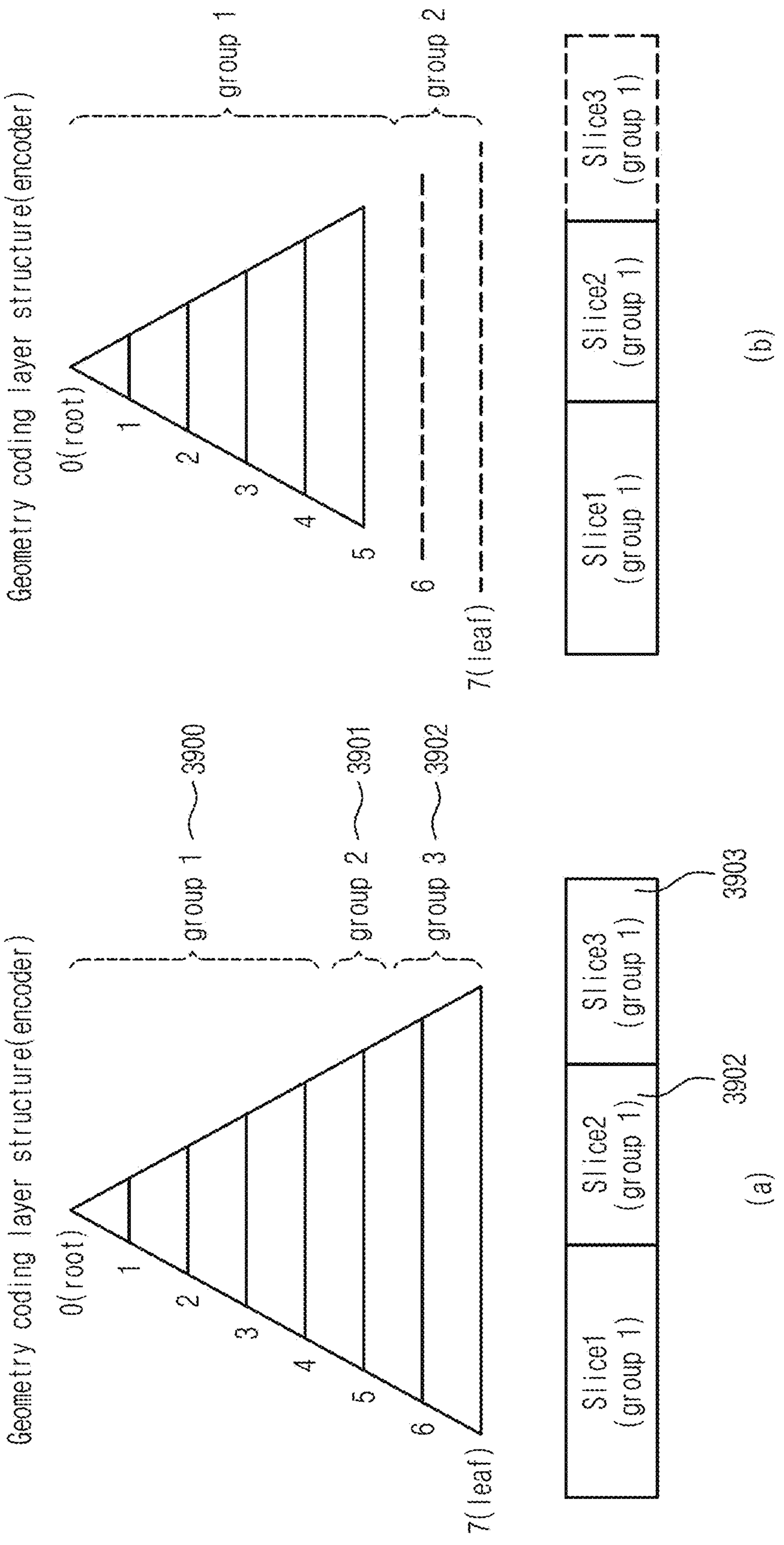
FIG. 17 illustrates a geometry coding layer structure according to embodiments.

For example, in the LoD-based PCC structure, a lower LoD is included in a higher LoD. Information included in the current LoD but not included in the previous LoD, that is, information newly included in each LoD may be referred to as R (Rest). As shown in FIG. 17, the initial LoD information and the information R newly included in each LoD may be divided and transmitted in each independent unit.

The transmission method/device according to the embodiments may encode geometry data and generate a geometry bitstream. The geometry bitstream may be configured for each LOD or layer. The geometry bitstream may include a header (geometry header) for each LOD or layer. The header may include reference information for the next LOD or the next layer. The current LOD (layer) may further include information R (geometry data) not included in the previous LOD (layer).

The reception method/device according to the embodiments may encode attribute data and generate an attribute bitstream. The attribute bitstream may be configured for each LOD or layer, and the attribute bitstream may include a header (attribute header) for each LOD or layer. The header may include reference information for the next LOD or the next layer. The current LOD (layer) may further include information R (attribute data) not included in the previous LOD (layer).

The reception method/device according to the embodiments may receive a bitstream composed of LODs or layers and efficiently decode only necessary data without a complicated intermediate process.

Figure 14:
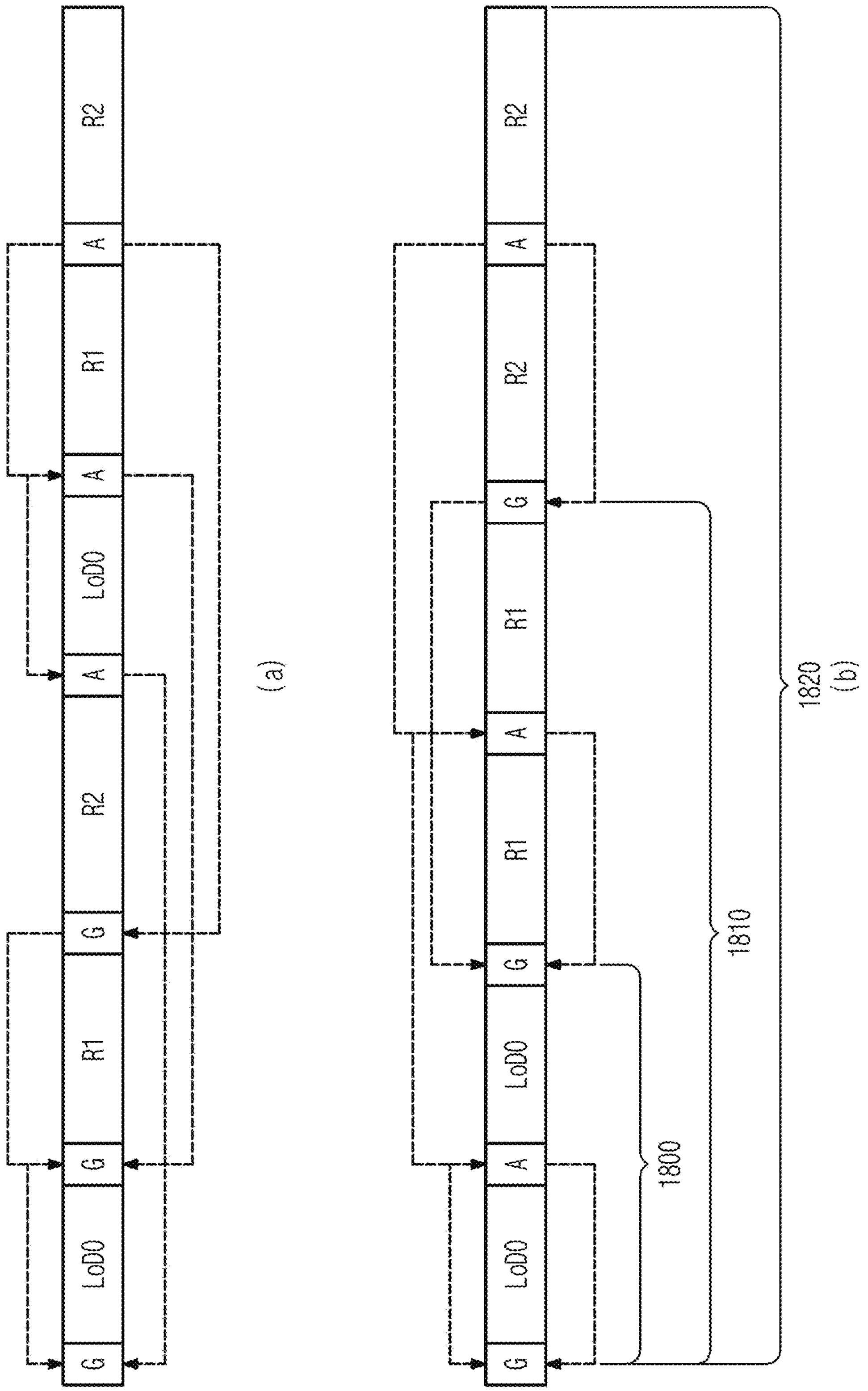
FIG. 14 illustrates a bitstream sorting method according to embodiments.

FIG. 14 illustrates a bitstream sorting method according to embodiments.

The method/device according to the embodiments may sort the bitstreams of FIG. 13 as shown in FIG. 14.

Bitstream Sorting Method According to Embodiments

In transmitting a bitstream, the transmission method/device according to the embodiments may serially transmit geometry and attributes as shown in FIG. 14. In this case, depending on the type of data, the whole geometry information (geometry data) may be transmitted first, and then the attribute information (attribute data) may be transmitted. In this case, the geometry information may be quickly reconstructed based on the transmitted bitstream information.

In FIG. 14-(*a*), for example, layers (LODs) containing geometry data may be positioned first in the bitstream, and layers (LODs) containing attribute data may be positioned after the geometry layers. Since the attribute data is dependent on the geometry data, the geometry layer may be placed first. In addition, the positions may be changed differently according to embodiments. Reference may also be made between geometry headers and between an attribute header and a geometry header.

Referring to FIG. 14-(*b*), bitstreams constituting the same layer including geometry data and attribute data may be collected and delivered. In this case, by using a compression technique capable of parallel decoding of geometry and attributes, the decoding execution time may be shortened. In this case, information that needs to be processed first (lower LoD, wherein geometry must precede attribute) may be placed first.

A first layer 1800 includes geometry data and attribute data corresponding to the lowest LOD 0 (layer 0) together with each header. A second layer 1810 includes LOD 0 (layer 0), and also includes the geometry data and attribute data of points for a new and more detailed layer 1 (LOD 1), which are not included in LOD 0 (layer 0), as information R1. A third layer 1820 may be subsequently placed in a similar manner.

The transmission/reception method/device according to the embodiments may efficiently select a layer (or LoD) desired in an application field at a bitstream level when a bitstream is transmitted and received. In the bitstream sorting method according to the embodiments, collecting and transmitting geometry information (FIG. 18) may produce an empty part in the middle after bitstream level selection. In this case, the bitstream may need to be rearranged. In the case where geometry and attributes are bundled and delivered according to each layer (FIG. 14), unnecessary information may be selectively removed according to the application field as follows.

Figure 15:
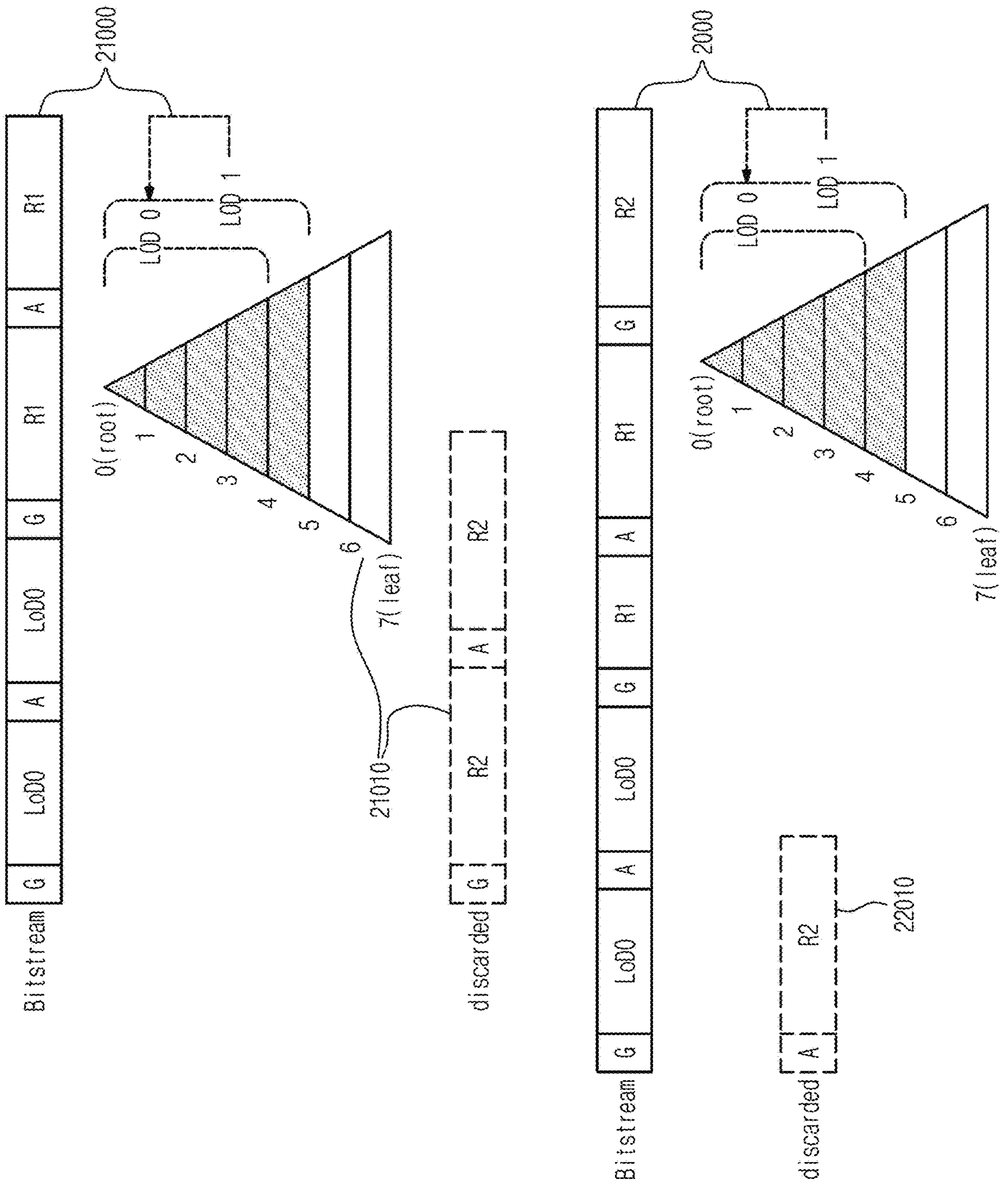
FIG. 15 illustrates a method of selecting geometry data and attribute data according to embodiments.

FIG. 15 illustrates a method of selecting geometry data and attribute data according to embodiments.

Bitstream selection according to embodiments of methods/devices is performed as follows.

When a bitstream needs to be selected as described above, the method/device according to the embodiments may select data at the bitstream level: 1) symmetric selection of geometry and attributes; 2) asymmetrical selection of geometry and attributes; or 3) A combination of the above two methods.

1) Symmetric Selection of Geometry and Attributes

Referring to FIG. 15, which illustrates a case where LoDs only up to LoD1 (LOD 0+R1) are selected (19000) and transmitted or decoded, information corresponding to R2 (new portion in LOD 2) corresponding to an upper layer is removed for transmission/decoding.

2) Asymmetric Selection of Geometry and Attributes

A method/device according to embodiments may transmit geometry and attributes asymmetrically. Only the attribute of the upper layer (Attribute R2) is removed (19001), and the full geometry (from level 0 (root level) to level 7 (leaf level) in the triangular octree structure) may be selected and transmitted/decoded (19011).

Referring to FIG. 16, when point cloud data is represented in an octree structure and hierarchically divided into LODs (or layers), scalable encoding/decoding (scalability) may be supported.

The scalability function according to the embodiments may include slice level scalability and/or octree level scalability.

The LoD (level of detail) according to the embodiments may be used as a unit for representing a set of one or more octree layers. In addition, it may mean a bundle of octree layers to be configured as a slice.

In attribute encoding/decoding, the LOD according to the embodiments may be extended and used as a unit for dividing data in detail in a broader sense.

That is, spatial scalability by an actual octree layer (or scalable attribute layer) may be provided for each octree layer. However, when scalability is configured in slices before bitstream parsing, selection may be made in LoDs according to embodiments.

In the octree structure, LOD0 may correspond to the root level to level 4, LOD1 may correspond to the root level to level 5, and LOD2 may correspond to the root level to level 7, which is the leaf level.

That is, as shown in FIG. 12, when scalability is utilized in slices, as in the case of scalable transmission, the provided scalable step may correspond to three steps of LoD0, LoD1, and LoD2, and the scalable step that may be provided by the octree structure in the decoding operation may correspond to eight steps from the root to the leaf.

According to embodiments, for example, in FIG. 12, when LoD0 to LoD2 are configured as respective slices, a transcoder (the transcoder 15040 of FIG. 11) of the receiver or the transmitter may select 1) LoD0 only, select 2) LoD0 and LoD1, or select 3) LoD0, LoD1, and LoD2 for scalable processing.

Example 1: When only LoD0 is selected, the maximum octree level may be 4, and one scalable layer may be selected from among octree layers 0 to 4 in the decoding process. In this case, the receiver may consider a node size obtainable through the maximum octree depth as a leaf node, and may transmit the node size through signaling information.

Example 2: When LoD0 and LoD1 are selected, layer 5 may be added. Thus, the maximum octree level may be 5, and one scalable layer may be selected from among octree layers 0 to 5 in the decoding process. In this case, the receiver may consider a node size obtainable through the maximum octree depth as a leaf node, and may transmit the node size through signaling information.

According to embodiments, an octree depth, an octree layer, and an octree level may be a unit in which data is divided in detail.

Example 3: When LoD0, LoD1, and LoD2 are selected, layers 6 and 7 may be added. Thus, the maximum octree level may be 7, and one scalable layer may be selected from among octree layers 0 to 7 in the decoding process. In this case, the receiver may consider a node size obtainable through the maximum octree depth as a leaf node, and may transmit the node size through signaling information.

FIG. 16 illustrates a method of configuring a slice including point cloud data according to embodiments.

Slice Configuration According to Embodiments

The transmission method/device/encoder according to the embodiments may configure a G-PCC bitstream by segmenting the bitstream in a slice structure. A data unit for detailed data representation may be a slice.

A slice according to embodiments may mean a data unit for partitioning point cloud data. That is, a slice represents a portion of the point cloud data. The slice may be referred to as terms representing a certain portion or unit.

For example, one or more octree layers may be matched to one slice.

The transmission method/device according to the embodiments, for example, the encoder, may configure a slice 2001-based bitstream by scanning a node (point) included in an octree in the direction of scan order 2000.

In FIG. 16-(*a*), some nodes in an octree layer may be included in one slice.

The octree layer (e.g., level 0 to level 4) may constitute one slice 2002.

Partial data of an octree layer, for example, level 5 may constitute each slice 2003, 2004, 2005.

Partial data of an octree layer, for example, level 6 may constitute each slice.

In FIGS. 16-(*b*) and 16-(*c*), when multiple octree layers are matched to one slice, only some nodes of each layer may be included. In this way, when multiple slices constitute one geometry/attribute frame, information necessary to configure a layer may be delivered for the receiver. The information may include information about layers included in each slice and information about nodes included in each layer.

In FIG. 16-(*b*), octree layers, for example, level 0 to level 3 and partial data of level 4 may be configured as one slice.

Octree layers, for example, partial data of level 4 and partial data of level 5 may be configured as one slice.

Octree layers, for example, partial data of level 5 and partial data of level 6 may be configured as one slice.

An octree layer, for example, partial data of level 6 may be configured as one slice.

In FIG. 16-(*c*), octree layers, for example, data of level 0 to level 4 may be configured as one slice.

Partial data from each of octree layer level 5, level 6, and level 7 may be configured as one slice.

The encoder and the device corresponding to the encoder according to the embodiments may encode the point cloud data, and may generate and transmit a bitstream including the encoded data and parameter information related to the point cloud data.

Furthermore, in generating the bitstream, the bitstream may be generated based on the bitstream structure according to embodiments (see, for example, FIGS. 12 to 16). Accordingly, the reception device, the decoder, and a corresponding device according to the embodiments may receive and parse a bitstream configured to be suitable for selective partial data decoding, and partially decode and efficiently provide the point cloud data (see FIG. 11).

Scalable Transmission According to Embodiments

The point cloud data transmission method/device according to the embodiments may scalably transmit a bitstream including point cloud data, and the point cloud data reception method/device according to the embodiments may scalably receive and decode the bitstream.

When the bitstream according to embodiments shown in FIGS. 12 to 16 is used for scalable transmission, information needed to select a slice required by the receiver may be transmitted to the receiver. Scalable transmission may mean transmitting or decoding only a part of a bitstream, rather than decoding the entire bitstream, and the result thereof may be low resolution point cloud data.

When scalable transmission is applied to the octree-based geometry bitstream, point cloud data may need to be configured with information ranging only up to a specific octree layer for the bitstream of each octree layer (FIG. 16) from a root node to a leaf node.

To this end, the target octree layer should have no dependency on information about the lower octree layer. This may be a constraint applied to geometry coding and attribute coding in common.

In addition, in scalable transmission, a scalable structure used for the transmitter/receiver to select a scalable layer needs to be delivered. Considering the octree structure according to the embodiments, all octree layers may support the scalable transmission, or the scalable transmission may be allowed only for a specific octree layer or lower layers. When a slice includes some of the octree layers, a scalable layer in which the slice is included may be indicated. Thereby, it may be determined whether the slice is necessary/not necessary in the bitstream stage. In the example of FIG. 16-(*a*), the yellow part starting from the root node constitutes one scalable layer without supporting scalable transmission. Following octree layers may be matched to scalable layers in a one-to-one correspondence. In general, scalability may be supported for a part corresponding to the leaf node. When multiple octree layers are included in a slice, it may be defined that one scalable layer shall be configured for the layers.

In this case, scalable transmission and scalable decoding may be used separately according to the purpose. The scalable transmission may be used at the transmitting/receiving side for the purpose of selecting information up to a specific layer without involving a decoder. The scalable decoding is used to select a specific layer during coding. That is, the scalable transmission may support selection of necessary information without involving a decoder in a compressed state (in the bitstream stage), such that the information may be transmitted or determined by the receiver. On the other hand, the scalable decoding may support encoding/decoding data only up to a required part in the encoding/decoding process, and may thus be used in such a case as scalable representation.

In this case, the layer configuration for scalable transmission may be different from the layer configuration for scalable decoding. For example, the three bottom octree layers including leaf nodes may constitute one layer in terms of scalable transmission. However, when all layer information is included in terms of scalable decoding, scalable decoding may be performed for each of leaf node layer n, leaf node layer n−1, leaf node layer n−2.

A method/device according to embodiments may perform fine granularity slicing.

When fine granularity slicing is enabled, the G-PCC bitstream (see FIG. 24 and the like) may be split into multiple sub-bitstreams in the encoding operation of the point cloud transmission method according to the embodiments. To effectively use the layering structure of G-PCC, each slice may include coded data for a partial coding layer or a partial region. Using the partitioning of slices paired with the coding layer structure, use cases of scalable transmission or spatial random access may be supported in an efficient manner.

FIG. 17 illustrates a geometry coding layer structure according to embodiments.

Figure 23:
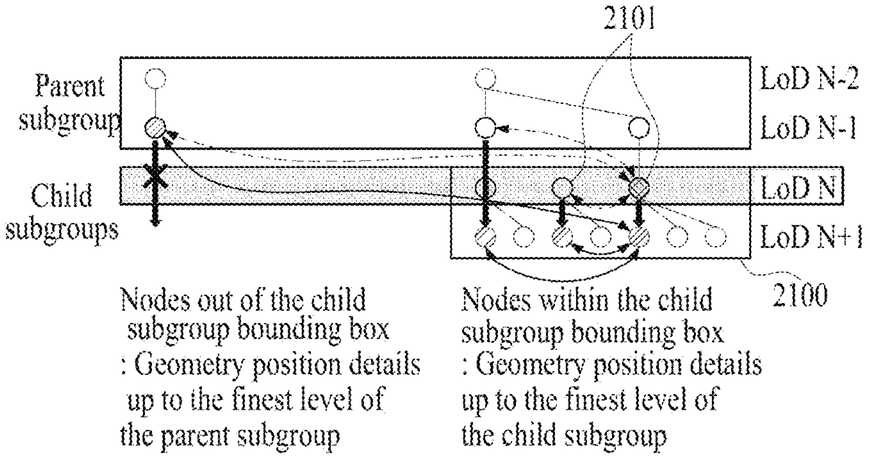
FIG. 23 illustrates a nearest neighbor search process according to embodiments.
Figure 30:
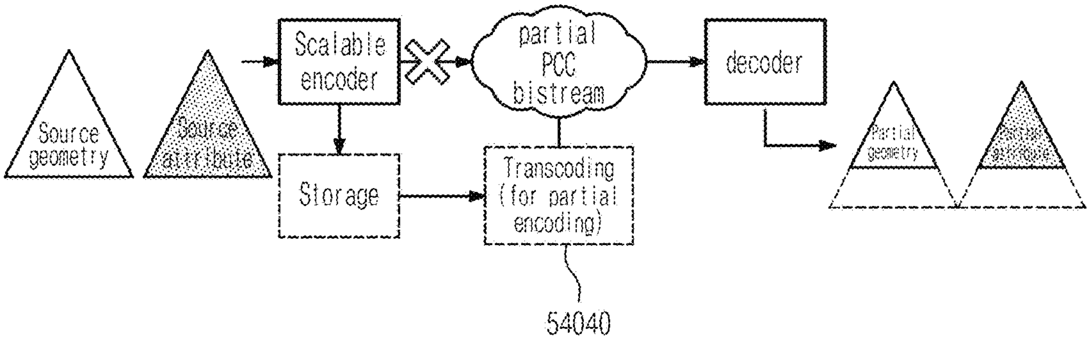
FIG. 30 illustrates the process of transmitting partial point cloud data according to embodiments.

The point cloud data transmission method/device according to the embodiments, namely, the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 12, 21, 28, and 29, the transmission method of FIGS. 23 and 30, or the like, may encode a point cloud into a layer structure to generate a layer-based bitstream, as illustrated in FIG. 17.

Figure 24:
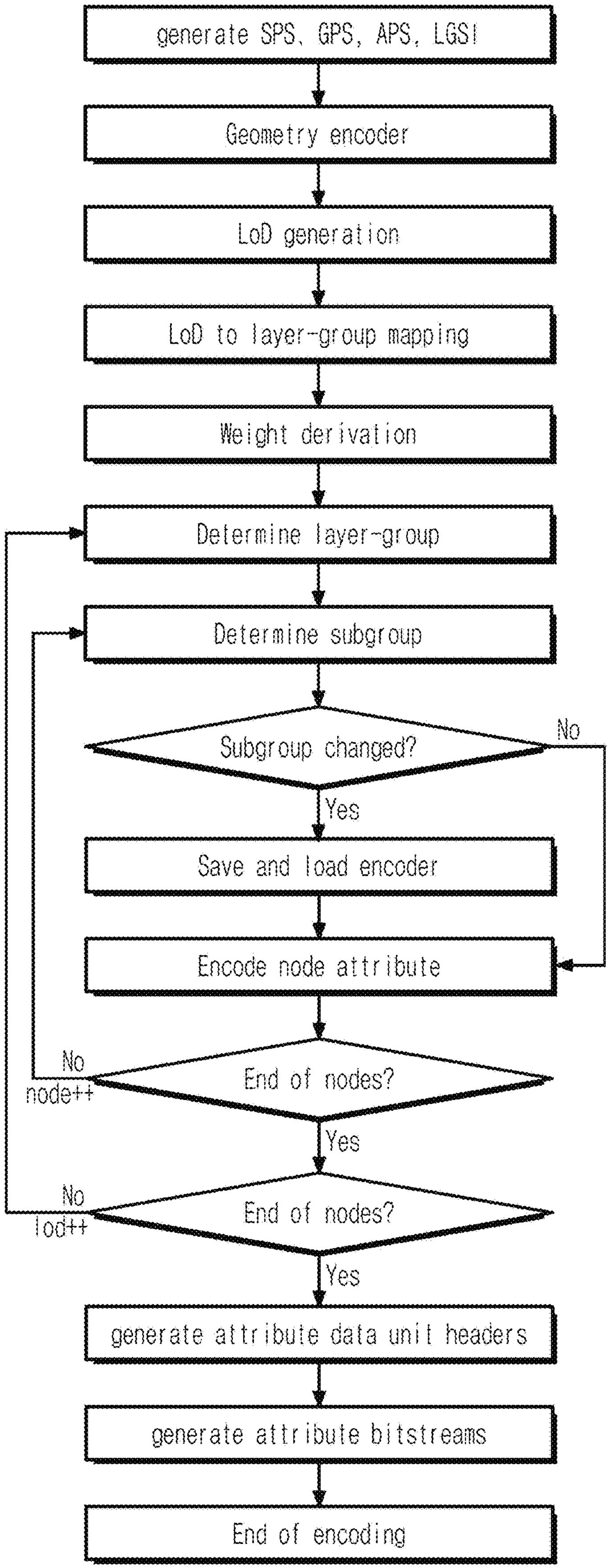
FIG. 24 illustrates an attribute encoding method according to embodiments.

The point cloud data reception method/device according to embodiments, namely, the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIG. 7, the reception device of FIG. 9, the devices of FIG. 10, the decoder of FIGS. 11, 21, 28, and 29, the reception method of FIGS. 24 and 31, or the like, may receive layer-based point cloud data and bitstreams and selectively decode the data, as illustrated in FIG. 17.

The bitstream and point cloud data according to the embodiments may be generated based on coding layer-based slice segmentation. By slicing the bitstream at the end of the coding layer of the encoding process, the method/device according to the embodiments may select a related slice, thereby supporting scalable transmission or partial decoding.

FIG. 17-(*a*) shows a geometry coding layer structure with 8 layers in which each slice corresponds to a layer group. Layer group 1 3900 includes coding layers 0 to 4. Layer group 2 3901 includes coding layer 5. Layer group 3 3902 is a group for coding layers 6 and 7. When a geometry (or attribute) has a tree structure having eight levels (depths), a bitstream may be hierarchically configured by grouping data corresponding to one or more levels (depths). Each group may be included in one slice.

FIG. 17-(*b*) shows the decoded output when selecting 2 slices out of 3 groups. When the decoder selects group 1 and group 2, partial layers of levels (depth) 0 to 5 of the tree may be selected. That is, partial decoding of coding layers may be supported without accessing the entire bitstream by using the slices of the layer group structure.

For the partial decoding process according to the embodiments, the encoder may generate three slices generated based on the layer group structure. The decoder may perform partial decoding by selecting two slices from among the three slices.

A bitstream (FIG. 24) according to embodiments may include layer-based groups/slices 3903. Each slice may include a header including signaling information related to point cloud data (geometry data and/or attribute data) included in the slice. The reception method/device according to the embodiments may select partial slices and decode point cloud data included in a payload of the slices based on the header included in the slices.

The method/device according to the embodiments may further divide the layer group into several subgroups (subgroups) in consideration of use cases of spatial random access in addition to the layer group structure. The subgroups are mutually exclusive, and a set of subgroups may be the same as a layer group. Since the points of each subgroup form a boundary in the spatial domain, the subgroup may be represented by subgroup bounding box information. Based on spatial information, the layer group and subgroup structures may support spatial access. By efficiently comparing a region of interest (ROI) with the bounding box information about each slice, spatial random access within a frame or tile may be supported.

The method/device according to the embodiments may divide layer groups 1 to 3 3900, 3901, and 3902 into one or more subgroups.

Although FIG. 17 shows a geometry coding layer structure as an example, an attribute coding layer structure may be generated in a similar manner.

A method/device according to embodiments may perform layer-group based slice segmentation. In fine granularity slicing, each slice segment may contain coded data from a layer-group defined as follows.

A layer-group is defined as a group of contiguous tree layers whose start and end depths may be any number in the tree depth and whose start is less than its end. The order of the coded data in a slice segment may be the same as the order of the coded data in a single slice.

For example, suppose that a geometry coding layer structure with eight layers is configured, as shown in FIG. 17-(*a*). In this example, there are three layer-groups, each of which is matched to a different slice: layer-group 1 for coding layers 0 to 4, layer-group 2 for coding layer 5, and layer-group 3 for coding layers. When the first two slices are transmitted or selected, the decoded output will be partial layers 0 to 5, as shown in FIG. 17-(*b*). By using slices in the layer-group structure, partial decoding of coding layers may be supported even without accessing the entire bitstream.

A subgroup is a subset of a layer-group whose points in the subgroup are adjacent to each other. Subgroups of a layer-group are mutually exclusive, and the set of points in a subgroup of a layer-group may be the same as the set of points in the layer-group. The points in each subgroup are bounded in a spatial region, and therefore the boundaries of a subgroup may be described with subgroup bounding box information. Using spatial information, the layer-group and subgroup structure may support efficient access to a region of interest (ROI) by selecting slices that cover the ROI.

Figure 18:
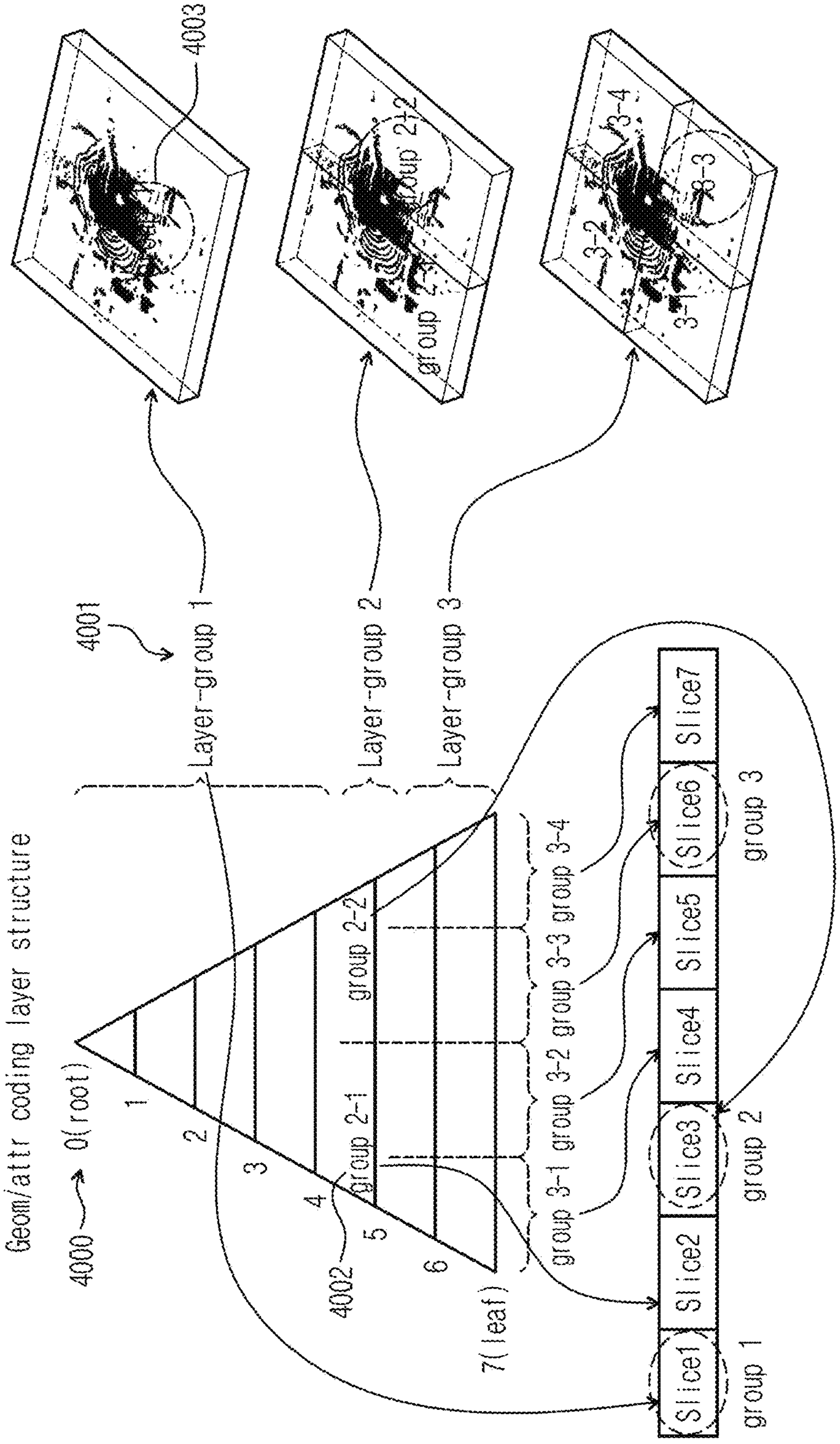
FIG. 18 illustrates a layer group and subgroup structure according to embodiments.

FIG. 18 illustrates a layer group structure and subgroup structure according to embodiments.

The layer structure-based point cloud data and bitstream shown in FIG. 17 may represent a bounding box as shown in FIG. 18.

The subgroup structure and the bounding box corresponding to the subgroup are shown. Layer group 2 is divided into two subgroups (group2-1 and group2-2) and layer group 3 is divided into four subgroups (group3-1, group3-2, group3-3, and group3-4). The subgroups of layer group 2 and the subgroups of layer group 3 are included in different slices. Given slices of a layer group and subgroups with bounding box information, 1) the bounding box of each slice may be compared with the ROI, and 2) the slice whose subgroup bounding box correlates with the ROI may be selected and spatial access may be performed. Then, 3) the selected slice is selected. When the ROI is considered in region 3-3, slices 1, 3, and 6 are selected as subgroup bounding boxes of layer group 1 and subgroups 2-2 and 3-3 to cover the ROI region.

For effective spatial access, it is assumed that there is no dependency between the subgroups of the same layer group. In live streaming or low-latency use cases, when each slice segment is received, the selection and decoding operations may be performed to increase temporal efficiency.

The method/device according to the embodiments may represent data as layers (which may be referred to as depths or levels) as a layer tree 4000 during geometry and/or attribute encoding. Point cloud data corresponding to layers (depths/levels) may be grouped into a layer group (or group) 4001 as in FIG. 39. Each layer group may be further divided (segmented) into subgroups 4002. A bitstream may be generated by configuring each subgroup as a slice. The reception device according to the embodiments may receive the bitstream, select a specific slice, decode a subgroup included in the slice, and decode a bounding box corresponding to the subgroup. For example, when slice 1 is selected, a bounding box 4003 corresponding to group 1 may be decoded. Group 1 may be data corresponding to the largest region. When the user wants to additionally view a detailed region for group 1, the method/device according to the embodiments may select slice 3 and/or slice 6, and may partially and hierarchically access the bounding box (point cloud data) of group 2-2 and/or group 3-3 for the detailed regions included in the region of group 1.

Figure 19:
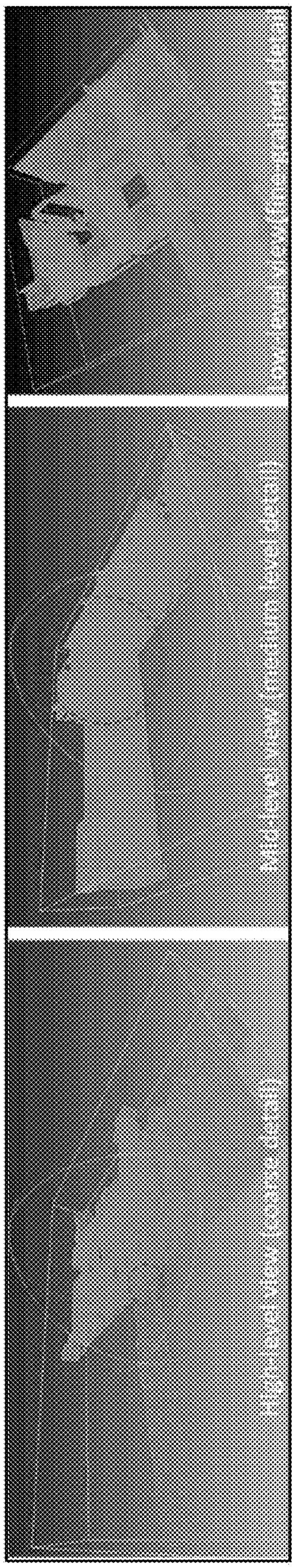
FIG. 19 illustrates a multi-resolution, multi-size ROI according to embodiments.

FIG. 19 illustrates a multi-resolution, multi-size ROI according to embodiments.

Layer-group slicing may provide efficient access to large-scale point cloud data or dense point cloud data based on scalability and spatial access capabilities. It may take a significant amount of time to render or display content due to the large number of points and the large size of the data. As an alternative approach, the level of detail may be adjusted based on the viewer's interest. For example, when a viewer is far away from a scene or an object, structural or global region information is more important than local detailed information. On the other hand, when the viewer moves closer to a specific region or object, detailed information about the ROI is needed. Using an adaptive approach, the renderer may efficiently provide data of sufficient quality to the viewer. FIG. 19 illustrates an example incremental detail changes for three levels of viewing distance, where the viewing distance changes based on ROI. For example, the viewing distances may be 1) a high-level view (coarse detail), 2) a medium-level view (medium-level detail), and 3) a low-level view (fine-grained detail).

Figure 20:
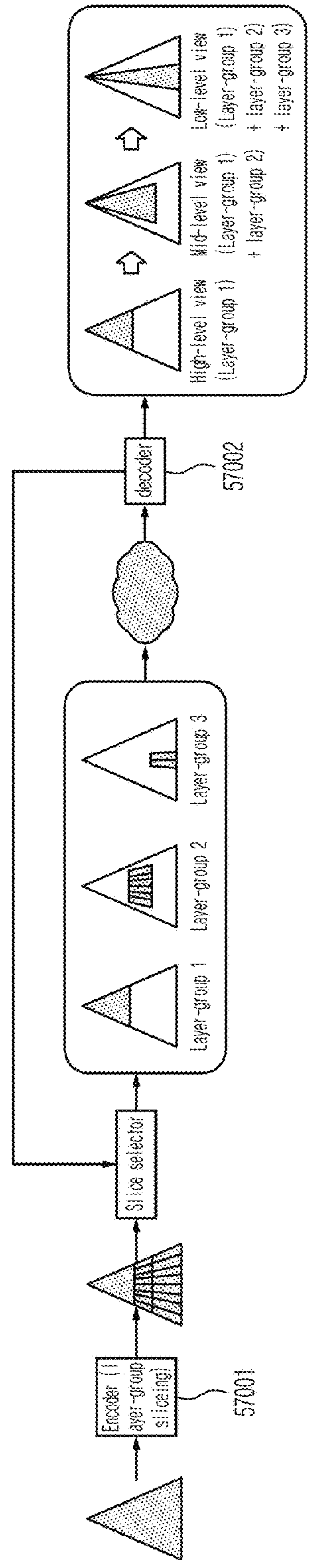
FIG. 20 illustrates layer group slices according to embodiments.

FIG. 20 illustrates a layer-group slice according to embodiments.

The point cloud data transmission method/device according to the embodiments, namely, the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 12, 21, 28, and 29, the transmission method of FIGS. 23 and 30, or the like may slice point cloud data based on layer-groups, as shown in FIG. 20.

The point cloud data reception method/device according to embodiments, namely, the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIG. 7, the reception device of FIG. 9, the devices of FIG. 10, the decoder of FIGS. 11, 21, 28, and 29, the reception method of FIGS. 24 and 31, or the like may receive and decode data sliced based on layer-groups, as shown in FIG. 20.

A method/device according to embodiments may support a high-resolution ROI based on scalability of hierarchical slicing and spatial accessibility.

Referring to FIG. 20, the encoder may generate a bitstream slice of an octree layer group or a spatial sub-group of each layer group. According to the request, a slice matching the ROI of each resolution may be selected and transmitted. Since detailed information other than the requested ROI is not included in the bitstream, the entire bitstream size may be smaller than in the tile-based approach. The decoder of the receiver may combine the slices to generate three outputs. For example, 1) the high-level view output may be generated from layer-group slice 1; 2) the mid-level view output may be generated in layer-group slice 1 and the selected sub-group of layer group 2; 3) low-level views of fine detailed outputs may be generated in layer group 1 and the selected sub-groups of layer groups 2 and 3. Since the output may be generated progressively, the receiver may provide a viewing experience, such as magnification/reduction. Resolution may gradually increase from a high level of view to a low level of view.

The encoder 60000 may correspond to a geometry encoder and an attribute encoder as a point cloud encoder according to embodiments, which. The encoder may slice the point cloud data based on a layer group (or group). The layer may be referred to as a depth of a tree, a level of a layer, or the like. As shown in part 60000-1, the depth of the octree of the geometry and/or the level of the attribute layer may be divided into a layer group (or a sub-group).

The slice selector 60001, in conjunction with the encoder 60000, may select a partitioned slice (or sub-slice) to selectively and partially transmit the data such as layer group 1 to layer group 3.

The decoder 6002 may decode the selectively and partially transmitted point cloud data. For example, it may decode a high-level view for layer group 1 (which has a high depth/layer/level or an index of 0, or is close to root). Thereafter, the mid-level view may be decoded by increasing the index of the depth/level over layer group 1 alone based on layer group 1 and layer group 2. The low-level view may be decoded based on layer group 1 to layer group 3.

Figure 21:
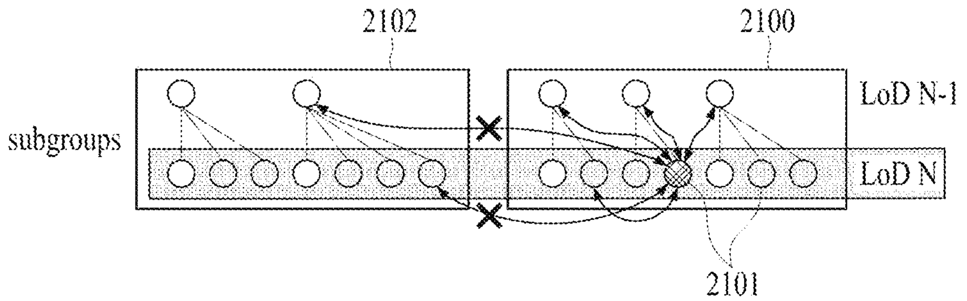
FIG. 21 illustrates a nearest neighbor search process according to embodiments.

FIG. 21 illustrates a nearest neighbor search process according to embodiments.

FIG. 21 illustrates the process of finding the nearest neighbor to predict the current point when encoding and decoding points based on a prediction method using the transmission/reception method/device according to embodiments.

The coding (encoding/decoding) process according to embodiments may be configured as follows.

To encode and decode points, the encoding and decoding methods according to embodiments may perform a nearest neighbor (NN) search, find the nearest neighbors similar to the current point, and perform a predicting transform. The nearest neighbor search may be referred to as NN search or the like.

For example, the proposed NN search based on the NN search method of G-PCCv1 also finds prediction candidates from the neighbor nodes of a higher LoD and the coded nodes of the current LoD. For fast search, the search range is limited by the cubic boundary and the number of points in Morton coding order. Embodiments may use additional constraints called an intra-layer group search boundary when a neighbor candidate is in the same layer group as the current node, considering the sub-group boundary.

In the intra-layer-group search boundary, when the neighbor candidate is in the same layer group as the current node, the use of neighbor nodes in the same sub-group boundary is restricted.

That is, neighbor nodes outside the subgroup bounding box cannot be considered as neighbor candidates for the current node, as shown in FIG. 21. For example, when the current encoding/coding target is a first subgroup 2100, the first subgroup 2100 includes nodes (points) belonging to LoD N−1 and LoD N. To predict the current node 2101, a predicted value may be generated by referencing the current node's parent or predecessor. Nodes belonging to a second subgroup 2102, different from the first subgroup 2100 to which the current node 2101 belongs, are excluded from neighbor candidates for the current node 2101.

Additionally, embodiments may use layer-group adapted positions in subgroup estimation and neighbor distance calculation. Thereby, discrepancies between the encoder and decoder may be prevented, considering cases where a child subgroup is missing.

Layer-group adapted position: Indicates a coded position shifted to the right by the number of LoDs of the coded descendant subgroup and then shifted to the left by the number of LoDs of the coded descendant subgroup and the skipped descendant subgroup.

Figure 22:
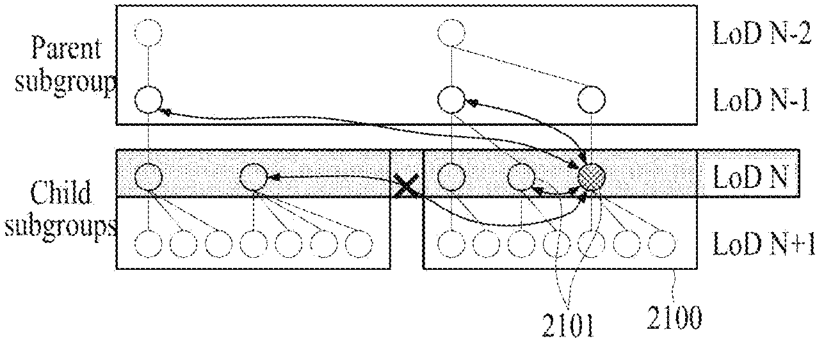
FIG. 22 illustrates a nearest neighbor search process according to embodiments.

FIG. 22 illustrates an NN search process according to embodiments.

FIG. 22 illustrates an NN search process similar to that in FIG. 21.

When the current LoD is at the coarsest level of the current layer group, a neighbor candidate may be in a different layer group. In this case, neighbors may be searched beyond the subgroup boundary when the node is at the upper subgroup boundary.

Inter-layer-group search boundary: As shown in FIG. 22, when a neighbor candidate is in a higher layer group, the use of neighbor nodes at the upper subgroup boundary may be restricted.

FIG. 23 illustrates an NN search process according to embodiments.

FIG. 23 illustrates an NN search process similar to those in FIGS. 21 and 22.

When the layer-group adapted position is used, the coded positioning of a node from the parent node may be handled differently when the node is within the subgroup bounding box of the current node.

The layer-group adapted position according to the embodiments may be configured as follows.

Nodes within the child subgroup bounding box: A coded position shifted to the right by the number of LoDs of the coded subgroup of the current subgroup and then shifted to the left by the number of LoDs of the coded subgroup of the current subgroup and the number of skipped child subgroups.

Nodes out of the child subgroup bounding box: A coded position shifted to the right by the number of LoDs of the coded subgroup of the upper subgroup, and then shifted to the left by the number of LoDs and the number of skipped child subgroups in the coded subgroup of the upper subgroup.

That is, when a neighbor candidate is within the subgroup bounding box, the details of the geometry position are considered up to the highest level of the child subgroup when the neighbor candidate is within the subgroup boundary. On the other hand, when the neighbor candidate is outside the subgroup boundary, the details of the geometry position are considered up to the highest level of the parent subgroup.

Referring to FIG. 21, in the embodiments, in order to generate a predicted value for the current node of the first subgroup 2100, nodes at a higher LoD level included in the first subgroup 2100 to which the current node belongs and/or previous nodes at the current LoD level of the first subgroup 2100 to which the current node belongs may be referenced. Nodes in the second subgroup 2102, not in the first subgroup, are excluded from candidates for predicting the current node.

Referring to FIG. 22, in the embodiments, the second subgroup to which the current node does not belong cannot be a neighbor candidate for predicting the current node. The first subgroup and the second subgroup may be divided by a boundary. However, the parent subgroup including the first subgroup 2100 and the second subgroup may be a neighbor candidate for predicting the current node. A node belonging to a parent subgroup at a higher LoD level than the LoD level to which the current node in the first subgroup belongs may be a neighbor candidate for the current node.

Referring to FIG. 23, the geometry position (geometry information, geometry, etc.) for predicting the current node may be considered more specifically. The geometry position value of a node that belongs to the first subgroup 2100 including the current node 2101 and that is at a lower level than the LoD level to which the current node belongs may be a neighbor geometry position candidate for the current node. That is, geometry positions may be selected from the range of nodes included in the child subgroup bounding box. Nodes that belong to the second subgroup, which is different from the first subgroup to which the current node belongs, cannot be neighbor candidates for the current node. However, when the second subgroup is a sibling subgroup belonging to the same parent subgroup as the first subgroup to which the current node belongs, nodes belonging to the parent subgroup may be neighbor candidates for the current node. When selecting a node that belongs to the parent subgroup, the geometry positions of the nodes in the parent subgroup may not be defined in detail up to the range of the child subgroup, and the geometry positions may only be determined up to the LoD level to which the parent subgroup belongs.

For example, the NN search according to the embodiments may be represented in pseudocode as follows.

```
inline void
buildPredictorsFast(
const AttributeParameterSet& aps,
const AttributeBrickHeader& abh,
const PCCPointSet3& pointCloud,
int32_t minGeomNodeSizeLog 2,
int geom_num_points_minus1,
std::vector<PCCPredictor>& predictors,
std::vector<uint32_t>& numberOfPointsPerLevelOfDetail,
std::vector<uint32_t>& indexes,
LayerGroupSlicingParams& layerGroupParams) {
const int32_t pointCount=int32_t(pointCloud.getPointCount( ));
assert(pointCount);
std::vector<MortonCodeWithIndex>packedVoxel;
computeMortonCodesUnsorted(pointCloud, aps.lodNeighBias, packedVoxel);
if (!aps.canonical_point_order_flag)
std::sort(packedVoxel.begin( ), packedVoxel.end( ));
```

```
std::vector<uint32_t>retained, input, pointIndexToPredictorIndex;
pointIndexToPredictorIndex.resize(pointCount);
retained.reserve(pointCount);
std::vector<uint32_t>pointIdxToPackedVoxelIdx;
std::vector<uint32_t>dcmNodesList;
if (layerGroupParams.layerGroupEnabledFlag) {
pointIdxToPackedVoxelIdx.resize(pointCount);
for (uint32_t i=0; i<pointCount; i++) {
auto pointIdx=packedVoxel[i].index;
pointIdxToPackedVoxelIdx[pointIdx]=i;
}
int layerIdx=0;
int dcmNodesCount=0;
int maxNumLayer=0;
for (int i=0; i<=layerGroupParams.numLayerGroupsMinus1; i++)
maxNumLayer+=layerGroupParams.numLayersPerLayerGroup[i];
for (int i=0; i<=layerGroupParams.numLayerGroupsMinus1; i++)
{
for (int j=0; j<layerGroupParams.numLayersPerLayerGroup[i]; j++, layerIdx++) {
for (int sbgrIdx=0; sbgrIdx<=layerGroupParams.numSubgroupsMinus1[i]; sbgrIdx++)
{
if (layerGroupParams.dcmNodesIdx[layerIdx][sbgrIdx].size( ) && layerIdx<maxNumLayer-1) {
for (int m=0; m<layerGroupParams.dcmNodesIdx[layerIdx][sbgrIdx].size( ); m++) {
auto pointIdx=layerGroupParams.dcmNodesIdx[layerIdx][sbgrIdx][m];
auto packedVoxelIndex=pointIdxToPackedVoxelIdx[pointIdx];
demNodesList.push_back(packedVoxelIndex);
}
}
}
}
}
if (dcmNodesList.size( )) {
input.resize(pointCount-demNodesList.size( ));
int dcmIdx=0;
int nonIdcmIdx=0;
for (uint32_t i=0; i<pointCount; ++i) {
uint32_t packedVoxelIndex;
if (dcmIdx<dcmNodesList.size( )) {
packedVoxelIndex=dcmNodesList[dcmIdx];
if (packedVoxel[packedVoxelIndex].mortonCode!=packedVoxel[i].mortonCode)
dcmIdx++;
else if(nonIdcmIdx<input.size( ))
input[nonIdcmIdx++]=i;
}
else if (nonIdcmIdx<input.size( ))
input[nonIdcmIdx++]=i;
}
}
else {
input.resize(pointCount);
for (uint32_t i=0; i<pointCount; ++i)
input[i]=i;
}
}
else {
input.resize(pointCount);
for (uint32_t i=0; i<pointCount; ++i) {
input[i]=i;
}
}
//prepare output buffers
predictors.resize(pointCount);
numberOfPointsPerLevelOfDetail.resize(0);
indexes.resize(0);
indexes.reserve(pointCount);
numberOfPointsPerLevelOfDetail.reserve(21);
numberOfPointsPerLevelOfDetail.push_back(pointCount);
bool concatenateLayers=aps.scalable_lifting_enabled_flag;
if (layerGroupParams.layerGroupEnabledFlag)
  concatenateLayers=false;
std::vector<uint32_t>indexesOfSubsample;
if (concatenateLayers)
  indexesOfSubsample.reserve(pointCount);
std::vector<Box3<int32_t>>bBoxes;
const int32_t log 2CubeSize=7;
MortonIndexMap3d atlas;
atlas.resize(log 2CubeSize);
atlas.init( );
auto maxNumDetailLevels=aps.maxNumDetailLevels( );
int32_t predIndex=int32_t(pointCount);
int treeLvlGap=0;
int maxNumLayers=0;
std::vector<int>predIdxToSubgroupMap;
std::vector<int>predIdxToLayerGroupMap;
if (layerGroupParams.layerGroupEnabledFlag) {
predIdxToLayerGroupMap.resize(pointCount, -1);
predIdxToSubgroupMap.resize(pointCount, -1);
treeLvlGap=layerGroupParams.rootNodeSizeLog 2.max( )-layerGroupParams.rootNodeSizeLog 2_coded.max( );
for (int m=0; m<=layerGroupParams.numLayerGroupsMinus1; m++)
maxNumLayers+=layerGroupParams.numLayersPerLayerGroup[m];
maxNumDetailLevels=maxNumLayers+1;
}
int maxLoD=0;
for (auto lodIndex=minGeomNodeSizeLog 2;
  !input.empty( )&& lodIndex<maxNumDetailLevels;
    ++lodIndex) {
const int32_t startIndex=indexes.size( );
if (lodIndex==maxNumDetailLevels-1) {
  for (const auto index:input) {
    indexes.push_back(index);
  }
}else {
subsample(
  aps, abh, pointCloud, packedVoxel, input, lodIndex,
    retained, indexes,
  atlas, layerGroupParams);
}
const int32_t endIndex=indexes.size( );
int shiftLayerGroup=0;
int shiftPrtLayerGroup=0;
int curLayerGroup=0;
int curSubgroup=0;
int prtLayerGroup=0;
int prtSubgroup=0;
```

```
std::vector<std::vector<uint32_t>>retained_subgroup, indexes_subgroup;
if (layerGroupParams.layerGroupEnabledFlag) {
int layerIdx=maxNumLayers−lodIndex;
int accNumLayers=0;
for (int m=0; m<=layerGroupParams.numLayerGroupsMinus1; m++) {
accNumLayers+=layerGroupParams.numLayersPerLayerGroup[m];
if (accNumLayers>=layerIdx) {
curLayerGroup=m;
break;
}
}
if (accNumLayers−layerGroupParams.numLayersPerLayerGroup[curLayerGroup]+1==layerIdx && curLayerGroup>0)
prtLayerGroup=curLayerGroup−1;
else
prtLayerGroup=curLayerGroup;
int maxNumLayers_curLayerGroup=0;
int maxNumLayers_prtLayerGroup=0;
int maxNumLayers_total=0;
for (int i=0; i<=layerGroupParams.numLayerGroupsMinus1; i++) {
maxNumLayers_total+=layerGroupParams.numLayersPerLayerGroup[i];
if (i<=curLayerGroup)
maxNumLayers_curLayerGroup+=layerGroupParams.numLayersPerLayerGroup[i];
if (i<=prtLayerGroup)
maxNumLayers_prtLayerGroup+=layerGroupParams.numLayersPerLayerGroup[i];
}
shiftLayerGroup=maxNumLayers_total−maxNumLayers_curLayerGroup;
shiftPrtLayerGroup=maxNumLayers_total−maxNumLayers_prtLayerGroup;
retained_subgroup.clear( );
indexes_subgroup.clear( );
retained_subgroup.resize(layerGroupParams.numSubgroupsMinus1[prtLayerGroup]+1);
indexes_subgroup.resize(layerGroupParams.numSubgroupsMinus1[curLayerGroup]+1);
for (int i=0; i<=layerGroupParams.numSubgroupsMinus1[curLayerGroup]; i++)
std::vector<std::vector<uint32_t>>demNodeList_ParentSubgroup;
int layerIdx_minus1=layerIdx−1;
if (demNodesList.size( )) {
demNodeList_ParentSubgroup.resize(layerGroupParams.numSubgroupsMinus1[prtLayer Group]+1);
int lyrGrpIdx=0;
if (layerIdx_minus1>0) {
for (int curLodIndex=0; curLodIndex<layerIdx_minus1; curLodIndex++) {
lyrGrpIdx=0;
int accNumLayers=0;
for (int m=0; m<=layerGroupParams.numLayerGroupsMinus1; m++) {
accNumLayers+=layerGroupParams.numLayersPerLayerGroup[m];
if (accNumLayers>curLodIndex) {
lyrGrpIdx=m;
break;
}
}
for (int m=0; m<=layerGroupParams.numSubgroupsMinus1[lyrGrpIdx]; m++) {
if (layerGroupParams.sliceSelectionIndicationFlag[lyrGrpIdx][m]) {
auto bbox_min=layerGroupParams.subgrpBboxOrigin[lyrGrpIdx][m];
auto bbox_max=bbox_min+layerGroupParams.subgrpBboxSize[lyrGrpIdx][m];
for (int subgrpIdx=0; subgrpIdx<=layerGroupParams.numSubgroupsMinus1[prtLayerGroup]; subgrpIdx++) {
auto retained_subgrp_bbox_min=layerGroupParams.subgrpBboxOrigin[prtLayerGroup][subgrpIdx];
auto retained_subgrp_bbox_max=retained_subgrp_bbox_min+layerGroupParams.subgrpBboxSize[prtLayerGroup][subgrpIdx];
if (retained_subgrp_bbox_min[0]>=bbox_min[0]&& retained_subgrp_bbox_max[0]<=
bbox_max[0]
&& retained_subgrp_bbox_min[1]>=bbox_min[1]&& retained_subgrp_bbox_max[1]<=bbox_max[1]
&& retained_subgrp_bbox_min[2]>=bbox_min[2]&& retained_subgrp_bbox_max[2]<=bbox_max[2]) {
for (int k=0; k<layerGroupParams.dcmNodesIdx[curLodIndex][m].size( ); k++) {
auto pointCloudIndex=layerGroupParams.dcmNodesIdx[curLodIndex][m][k];
auto packedVoxelIndex=pointIdxToPackedVoxelIdx[pointCloudIndex];
dcmNodeList_ParentSubgroup[subgrpIdx].push_back(packedVoxelIndex);
}
}
}
}
}
}
for (int subgrpIdx=0; subgrpIdx<=layerGroupParams.numSubgroupsMinus1[prtLayerGroup]; subgrpIdx++)
}
}
for (int i=0; i<retained.size( ); i++) {
auto pos=(pointCloud[packedVoxel[retained[i]].index]>>shiftLayerGroup)<<(shiftLayerGroup+treeLvlGap);
prtSubgroup=0;
for (int m=0; m<=layerGroupParams.numSubgroupsMinus1[prtLayerGroup]; m++) {
if (layerGroupParams.sliceSelectionIndicationFlag[prtLayerGroup][m]) {
auto bbox_min=layerGroupParams.subgrpBboxOrigin[prtLayerGroup][m];
auto bbox_max=bbox_min+layerGroupParams.subgrpBboxSize[prtLayerGroup][m];
if (pos.x( )>=bbox_min[0]&& pos.x( )<bbox_max[0]
&& pos.y( )>=bbox_min[1]&& pos.y( )<bbox_max[1]
&& pos.z( )>=bbox_min[2]&& pos.z( )<bbox_max[2]) {
prtSubgroup=m;
break;
```

```
}
else if (m==layerGroupParams.numSubgroupsMinus1
  [prtLayerGroup]&& prtSubgroup==0)
}
}
retained_subgroup[prtSubgroup].push_back(retained[i]);
}
if (dcmNodesList.size( )) {
for (int i=0;
  i<=layerGroupParams.numSubgroupsMinus1[prtLay-
  erGroup]; i++) {
if (layerGroupParams.sliceSelectionIndicationFlag[prt-
  LayerGroup][i]
&& dcmNodeList_ParentSubgroup[i].size( )) {
for (int j=0; j<dcmNodeList_ParentSubgroup[i].size( );
  j++)
retained_subgroup[i].push_back(dcmNodeList_Parent-
  Subgroup[i][j]);
std::sort(retained_subgroup[i].begin( ), retained_sub-
  group[i].end( ));
}
}
if (layerIdx>=2) {
std::cout<<"(retained.size( )="<<retained.size( );
auto prev=retained.size( );
int parentLayerIndex=layerIdx-2;
for (int i=0;
  i<=layerGroupParams.numSubgroupsMinus1[prtLay-
  erGroup]; i++) {
if (layerGroupParams.sliceSelectionIndicationFlag[prt-
  LayerGroup][i]) {
for (int k=0; k<layerGroupParams.dcmNodesIdx[parent-
  LayerIndex][i].size( ); k++) {
auto pointCloudIndex=layerGroupParams.dcmNodesIdx
  [parentLayerIndex][i][k];
auto packedVoxelIndex=pointIdxToPackedVoxelIdx
  [pointCloudIndex];
retained.push_back(packedVoxelIndex);
}
}
}
}
}
for (int i=startIndex; i<endIndex; i++) {
auto pos=(pointCloud[packedVoxel[indexes[i]].index]
  >>shiftLayerGroup)<<K (shiftLayerGroup+treeLvl-
  Gap);
curSubgroup=0;
for (int m=0;
  m<=layerGroupParams.numSubgroupsMinus1[cur-
  LayerGroup]; m++) {
if (layerGroupParams.sliceSelectionIndicationFlag[cur-
  LayerGroup][m]) {
auto bbox_min=layerGroupParams.subgrpBboxOrigin
  [curLayerGroup][m];
auto bbox_max=bbox_min+layerGroupParams.subgrpB-
  boxSize[curLayerGroup][m];
if (pos.x( )>=bbox_min[0]&& pos.x( )<bbox_max[0]
&& pos.y( )>=bbox_min[1]&& pos.y( )<bbox_max[1]
&& pos.z( )>=bbox_min[2]&& pos.z( )<bbox_max[2]) {
curSubgroup=m;
break;
}
}
}
std::vector<point_t>biasedPos_indexes, biasedPos_re-
  tained;
  if (concatenateLayers && !layerGroupParams.layer-
    GroupEnabledFlag) {
    indexesOfSubsample.resize(endIndex);
    if (startIndex !=endIndex) {
      for (int32_t i=startIndex; i<endIndex; i++)
        indexesOfSubsample[i]=indexes[i];
      int32_t
        numOfPointInSkipped=geom_num_points_
        minus1+1-pointCount;
      if (endIndex-startIndex<=startIndex+nu-
        mOfPointInSkipped) {
        concatenateLayers=false;
      }else {
        for (int32_t i=0; i<startIndex; i++)
        indexes[i]=indexesOfSubsample[i];
        //reset predIndex
        predIndex=pointCount;
        for (int lod=0; lod<lodIndex-minGeomNode-
        SizeLog 2; lod++) {
        int divided_startIndex=pointCount-num-
        berOfPointsPerLevelOfDetail[lod];
        int divided_endIndex=pointCount-num-
        berOfPointsPerLevelOfDetail[lod+1];
        computeNearestNeighbors(
        aps, abh, packedVoxel, retained, divided_
        startIndex,
        divided_endIndex, lod+minGeomNodeSizeLog
        2, indexes, predictors,
        pointIndexToPredictorIndex, predIndex, atlas
  , layerGroupParams, curLayerGroup, curSubgroup
  , biasedPos_indexes, biasedPos_retained
);
  }
}
}
}
int numIndexedNodes=0;
if(layerGroupParams.layerGroupEnabledFlag) {
indexes.resize(startIndex);
int count=0;
for (int i=0;
  i<=layerGroupParams.numSubgroupsMinus1[curLay-
  erGroup]; i++) {
if (layerGroupParams.sliceSelectionIndicationFlag[cur-
  LayerGroup][i]) {
if (curLayerGroup==prtLayerGroup)
prtSubgroup=i; //prtSubgroup=curSubgroup
else {
auto
  cur_bbox_min=layerGroupParams.subgrpBboxOrigin
  [curLayerGroup][i];
auto cur_bbox_max=cur_bbox_min+layer
  GroupParams.subgrpBboxSize[curLayerGroup][i];
for (int m=0;
  m<=layerGroupParams.numSubgroupsMinus1[prt-
  LayerGroup]; m++) {
auto bbox_min=layerGroupParams.subgrpBboxOrigin
  [prtLayerGroup][m];
auto bbox_max=bbox_min+layerGroupParams.subgrpB-
  boxSize[prtLayerGroup][m];
if (cur_bbox_min.x( )>=bbox_min[0]&& cur_bbox_
  max.x( )<=bbox_max[0]
&& cur_bbox_min.y( )>=bbox_min[1]&& cur_bbox_
  max.y( )<=bbox_max[1]
&& cur_bbox_min.z( )>=bbox_min[2]&& cur_bbox_
  max.z( )<=bbox_max[2]) {
prtSubgroup=m;
```

```
break;
}
}
}
int startIndex_subgroup=0;
int endIndex_subgroup=indexes_subgroup[i].size( );
intcurSubgroup=i;
biasedPos_indexes.clear( );
biasedPos_indexes.reserve(indexes_subgroup[curSub-
  group].size( ));
for (int k=0; k<indexes_subgroup[curSubgroup].size( );
  k++) {
auto pos=pointCloud[packedVoxel[indexes_subgroup
  [curSubgroup][k]].index];
auto point=pos;
biasedPos_indexes.push_back(times
  ((point>>shiftLayerGroup)<<(shiftLayerGroup+
  treeLvlGap), aps.lodNeighBias));
}
biasedPos_retained.clear( );
biasedPos_retained.reserve(retained_subgroup[prtSub-
  group].size( ));
auto
  cur_bbox_min=layerGroupParams.subgrpBboxOrigin
  [curLayerGroup][i];
auto cur_bbox_max=cur_bbox_min+layerGroupParams.
  subgrpBboxSize[curLayerGroup][i];
for (int k=0; k<retained_subgroup[prtSubgroup].size( );
  k++) {
auto pos=pointCloud[packedVoxel[retained_subgroup
  [prtSubgroup][k]].index];
auto point=pos;
if (prtLayerGroup !=curLayerGroup) {
if (pos.x( )>=cur_bbox_min.x( )&& pos.x( )<cur_bbox_
  max.x( )&& pos.y( )>=cur_bbox_min.y( )&& pos.y
  ( )<cur_bbox_max.y( )&& pos.z( )>=cur_bbox_min.z
  ( ) && pos.z( )<cur_bbox_max.z( ))
biasedPos_retained.push_back(times
  ((point>>shiftLayerGroup)<<K (shiftLayerGroup+
  treeLvlGap), aps.lodNeighBias));
else
biasedPos_retained.push_back(times
  ((point>>shiftPrtLayerGroup)<<(shiftPrtLayerGroup+
  treeLvlGap), aps.lodNeighBias));
}
else
biasedPos_retained.push_back(times
  ((point>>shiftLayerGroup)<<K (shiftLayerGroup+
  treeLvlGap), aps.lodNeighBias));
}
computeNearestNeighbors(
aps, abh, packedVoxel, retained_subgroup[prtSubgroup],
  startIndex_subgroup, endIndex_subgroup, lodIndex,
  indexes_subgroup[i],
predictors, pointIndexToPredictorIndex, predIndex, atlas
, layerGroupParams, curLayerGroup, curSubgroup
, biasedPos_indexes, biasedPos_retained);
for (int m=startIndex_subgroup; m<endIndex_subgroup;
  m++)
//Update information about whether the neighbor is in the
  same subgroup
{
int cur_subgroup=i;
predIdxToLayerGroupMap.push_back(curLayerGroup);
predIdxToSubgroupMap.push_back(cur_subgroup);
indexes.push_back(indexes_subgroup[cur_subgroup]
  [m]);
}
numIndexedNodes+=indexes_subgroup[i].size( );
layerGroupParams.numberOfPointsPerLodPerSub-
  groups.push_back(indexes_subgroup[i].size( ));
}
else
layerGroupParams.numberOfPointsPerLodPerSub-
  groups.push_back(0);
}
}
else
computeNearestNeighbors(
aps, abh, packedVoxel, retained, startIndex, endIndex,
  lodIndex, indexes,
predictors, pointIndexToPredictorIndex, predIndex, atlas
, layerGroupParams, curLayerGroup, curSubgroup
, biasedPos_indexes, biasedPos_retained);
if (layerGroupParams.layerGroupEnabledFlag) {
if(pointCount>indexes.size( ))
numberOfPointsPerLevelOfDetail.push_back(point-
  Count−indexes.size( ));
}
else {
if (!retained.empty( )) {
numberOfPointsPerLevelOfDetail.push_back
  (retained.size( ));
}
}
input.resize(0);
  std::swap(retained, input);
}
std::reverse(indexes.begin( ), indexes.end( ));
updatePredictors(pointIndexToPredictorIndex, predic-
  tors);
std::reverse(
  numberOfPointsPerLevelOfDetail.begin( ),
  numberOfPointsPerLevelOfDetail.end( ));
layerGroupParams.numRefNodesInTheSameSubgrou-
  p.resize(pointCount, 0);
  //Update information about whether the neighbor is in
    the same subgroup
  if (layerGroupParams.layerGroupEnabledFlag) {
  std::reverse(predIdxToLayerGroupMap.begin( ), pre-
    dIdxToLayerGroupMap.end( ));
  std::reverse(predIdxToSubgroupMap.begin( ), pre-
    dIdxToSubgroupMap.end( ));
  for (int i=0; i<pointCount; i++) {
  auto& predictor=predictors[i];
  int curLayerGroup=predIdxToLayerGroupMap[i];
  int curSubgroup=predIdxToSubgroupMap[i];
  for (int k=0; k<predictor.neighborCount; k++) {
  int idx=predictor.neighbors[k].predictorIndex;
  int neighborLayerGroup=predIdxToLayerGroupMap
    [idx];
  int neighborSubgroup=predIdxToSubgroupMap[idx];
  if(neighborLayerGroup==curLayerGroup &&
    neighborSubgroup==curSubgroup) {
  predictor.neighbors[k].inTheSameSubgroupFlag=true;
  layerGroupParams.numRefNodesInTheSameSub-
    group[idx]++;
  }
  else
  predictor.neighbors[k].
    inTheSameSubgroupFlag=false;
  }
  }
}
```

}

The point cloud data transmission/reception method/device according to the embodiments may search for the nearest neighbors and perform an atlas shift.

When using an upper (parent) subgroup with additional missing nodes, the difference in node position between the parent and child subgroups may be large, and thus neighbors may not be found in the current attribute atlas. In the case where the current point is not present in the current atlas, the atlas shift process can be performed to align the start positions of nodes in parent and child LoDs.

For example, the atlas shift may be represented in pseudocode as follows.

```
if (curAtlasId != pointAtlasId) {
atlas.clearUpdates( );
curAtlasId = pointAtlasId;
while(cubeIndex < retainedSize
&& (packedVoxel[retained[cubeIndex]].mortonCode >>
atlasBoundaryBit) < curAtlasId)
++cubeIndex;
while (cubeIndex < retainedSize
&& (packedVoxel[retained[cubeIndex]].mortonCode >>
atlasBoundaryBit) ==curAtlasId)
{atlas.set(packedVoxel[retained[cubeIndex]].mortonCode >>
shiftBits3, cubeIndex);
++cubeIndex;
}
}
```

FIG. 23, the start node included in the child subgroup may be different from the start node included in the parent subgroup. In this case, the nodes in the parent subgroup may be mismatched with the nodes in the child subgroup, resulting in coding incorrect attribute values. To avoid this result, a process may be added to shift the atlas of the nodes (points) included in the parent subgroup so as to be matched with the atlas that includes the start node of the child subgroup.

Compare the atlas ID of the current point, which is the target of current attribute encoding, with the current atlas ID.

When the current atlas ID is different from the atlas ID of the current point, update the current atlas ID to the atlas ID of the current point.

When the atlas ID of the node belongs to the upper retained differs from the current atlas ID (it may be less than the current atlas ID because the atlas IDs are sorted in ascending order), the point index referred to as a cube index may be increased to select only the points belonging to the current atlas, excluding points that do not belong to the current atlas.

For nodes (points) in a subgroup that belong to the current atlas, the current atlas information may be updated based on a combination of the point index referred to as the cube index and the atlas index.

This process includes constructing an atlas by selecting points belonging to the bounding box (bbox) of the child subgroup from among the points belonging to the parent subgroup when the bounding box (bbox) of the child subgroup is included in the bounding box (bbox) of the parent subgroup.

When the current LoD is the N-th level, the retained is the N−1-th LoD. Therefore, in "while(packedVoxel[retained[cubeIndex]].mortonCode>>atlasBoundaryBit)<curAtlasId)++cubeIndex;" this process finds the initial start point of the nodes in the parent subgroup included in the bounding box range of the child subgroup by excluding points that do not belong to the current atlas ID (curAtlasId) from the points included in LoD N−1. Then, through the second while loop, the retained points that belong to the current atlas ID (curAtlasId) are register with the atlas.

Regarding the relationship between the atlas shift and NN search, when a node in the parent subgroup is selected as a neighbor candidate to predict the attributes of nodes in the child subgroup, the atlas of the parent subgroup may be shifted based on the atlas ID of the child subgroup.

The point cloud data transmission/reception method/device according to the embodiments may search for the nearest neighbor, shift the atlas (when necessary), and derive subgroup weights.

In predicting transform, quantization weights are used to assign credits to nodes used in prediction. In G-PCCv1, weights are derived as the sum of weights for related nodes referencing the current node as a neighbor. Based on the concept, the weights for the nodes in the subgroup may be calculated with the following constraints.

Subgroup weight derivation: When the current node and its neighbors belong to the same subgroup, the sum of weights for related nodes referencing the current node as a neighbor is generated.

Referring to FIG. 22, for each point (node) in the subgroup, a weight for compensating for the loss in neighbor selection may be assigned to nodes that are frequently selected as neighbors in order to reduce the loss.

The weight is for quantization.

The process of generating weights is configured as follows:

$$\text{weight }(m) \mathrel{+}= \text{alpha} * numRefNodes(m)/maxNumRefNodes + \text{beta}$$

numRefNodes: Indicates how many times the node is used as a neighbor at a specific node m.

maxNumRefNodes: Indicates the maximum number of nodes in the parent group that use the current node as a neighbor.

alpha and beta are variables.

The process of calculating quantized weights may be represented in pseudocode as follows.

```
inline void
computeQuantizationWeights(
  const std::vector<PCCPredictor>& predictors,
  std::vector<int64_t>& quantizationWeights,
  Vec3<int32_t> neighWeight,
LayerGroupSlicingParams& layerGroupParams,
bool flag = true) {
  const size_t pointCount = predictors.size( );
  quantizationWeights.resize(pointCount);
  for (size_t i = 0; i < pointCount; ++i) {
    quantizationWeights[i] = (1 << kFixedPointWeightShift);
  }
```

-continued

```
    for (size_t i = 0; i < pointCount; ++i) {
        const size_t predictorIndex = pointCount − i − 1;
        const auto& predictor = predictors[predictorIndex];
        const auto currentQuantWeight = quantizationWeights[predictorIndex];
        for (size_t j = 0; j < predictor.neighborCount; ++j) {
  if (predictor.neighbors[j].inTheSameSubgroupFlag) {
  const size_t neighborPredIndex = predictor.neighbors[j].predictorIndex;
    auto& neighborQuantWeight = quantizationWeights[neighborPredIndex];
    neighborQuantWeight += divExp2RoundHalfInf(
    neighWeight[j] * currentQuantWeight, kFixedPointWeightShift);
  }
  else if (flag) {
    const size_t neighborPredIndex = predictor.neighbors[j].predictorIndex;
    layerGroupParams.quantWeights_outOfSubgroup[neighborPredIndex] +=
divExp2RoundHalfInf(
    neighWeight[j] * currentQuantWeight, kFixedPointWeightShift);
  }
  }
    }
  }
```

This approach ensures that the decoder generates the same subgroup weights as the encoder for both the entire fine granularity slices (FGSs) (referring to the layer group-based slice in FIG. 17, i.e., a term referring to the slice granularity unit) and the missing FGS. However, the weights may be significantly smaller than expected weights, and the loss may be exacerbated at higher LoDs. Embodiments may include performing subgroup weight adjustment for each subgroup and each node to mitigate the loss.

The subgroup weights are adjusted as follows.

$$\text{weight } (m) += \text{alpha} * numRefNodes(m)/maxNumRefNodes + \text{beta}$$

weight(m) is the subgroup weight of the m-th node.

numRefNodes(m) is the number of related nodes for the m-th node.

maxNumRefNodes is the maximum number of related nodes in the current subgroup.

alpha and beta are weight adjustment coefficients that may be derived by the encoder.

As a method to adaptively correct weights for each node during the subgroup weight adjustment process, the degree of use of the weights for correction may be determined based on the number of times each node within the subgroup is referenced by neighbor nodes, as described above. In addition to the method presented above, another method may be used for node-adaptive correction weight calculation. Indicators indicating the importance of each node, such as a proportional weight based on the size of the weight, an out-of-subgroup weight, and the number of out-of-subgroup nodes, may be used to enhance the accuracy of correction for important nodes, i.e., nodes that are frequently referenced by other nodes.

The process of weight utilization and correction according to the embodiments may be represented in pseudocode as follows.

```
void
AttributeDecoder::decodeColorsPred(
    const AttributeDescription& desc,
    const AttributeParameterSet& aps,
    const AttributeBrickHeader& abh,
    const QpSet& qpSet,
    PCCResidualsDecoder& decoder,
    PCCPointSet3& pointCloud,
LayerGroupSlicingParams& layerGroupParams,
    const int curLayerGroup,
    const int curSubgroup)
{
    const size_t pointCount = pointCloud.getPointCount( );
    int64_t clipMax = (1 << desc.bitdepth) − 1;
    Vec3<int32_t> values;
    bool icpPresent = abh.icpPresent(desc, aps);
    auto icpCoeff = icpPresent ? abh.icpCoeffs[0] : 0;
    int lod = 0;
    int zeroRunRem = 0;
    int quantLayer = 0;
int idxStart = 0;
    int idxEnd = pointCount;
    int lodStart, lodEnd;
    if (layerGroupParams.layerGroupEnabledFlag) {
    lodEnd = 0;
    int prevLodEnd = 0;
    for (int i = 0; i <= curLayerGroup; i++) {
    lodEnd += layerGroupParams.numLayersPerLayerGroup[i];
    if(i != curLayerGroup)
    prevLodEnd += layerGroupParams.numLayersPerLayerGroup[i];
    }
```

-continued

```
    if (!curLayerGroup)
    lodStart = 0;
    else
    lodStart = prevLodEnd + 1;
    quantLayer = std::min(int(qpSet.layers.size( )) − 1, prevLodEnd);
  }
    if (layerGroupParams.layerGroupEnabledFlag && curLayerGroup == 0
    || !layerGroupParams.layerGroupEnabledFlag) {
    computeQuantizationWeights(_lods.predictors, _quantWeights, aps.quant_neigh_weight,
    layerGroupParams, false);
    }
  if (layerGroupParams.layerGroupEnabledFlag) {
    int weightAdjCoeff_a = 0;
    int weightAdjCoeff_b = 0;
    if (curLayerGroup) {
    weightAdjCoeff_a = layerGroupParams.weightAdjCoeff_a;
    weightAdjCoeff_b = layerGroupParams.weightAdjCoeff_b;
    }
    else {
    weightAdjCoeff_a = abh.subgroup_weight_adj_coeff_a;
    weightAdjCoeff_b = abh.subgroup_weight_adj_coeff_b;
    }
    int subgrpArrayIdx = layerGroupParams.numSubgroupsMinus1[curLayerGroup] −
curSubgroup;
    for (int i = 0; i < curLayerGroup; i++)
    subgrpArrayIdx += (layerGroupParams.numSubgroupsMinus1[i] + 1) *
(layerGroupParams.numLayersPerLayerGroup[i]);
    if (curLayerGroup > 0)
    subgrpArrayIdx++;
    int predStart = 0;
    for (int i = 0; i < subgrpArrayIdx; i++)
    predStart += layerGroupParams.numberOfPointsPerLodPerSubgroups[i];
    int predEnd = predStart +
layerGroupParams.numberOfPointsPerLodPerSubgroups[subgrpArrayIdx];
    int subgrpArrayIdx_init = subgrpArrayIdx;
    int predStart_init = predStart;
    int idxSelectedNodes = 0;
    int maxNumRefNodes = 0;
    for (lod = lodStart; lod <= lodEnd; lod++) {
    for (int m = predStart; m < predEnd; m++) {
    if (maxNumRefNodes < layerGroupParams.numRefNodesInTheSameSubgroup[m]) {
    idxSelectedNodes = m;
    maxNumRefNodes = layerGroupParams.numRefNodesInTheSameSubgroup[m];
    }
    }
    if (lod != lodEnd) {
    int prevIdx = subgrpArrayIdx;
    subgrpArrayIdx += layerGroupParams.numSubgroupsMinus1[curLayerGroup] + 1;
    for (int i = prevIdx; i < subgrpArrayIdx; i++)
    predStart += layerGroupParams.numberOfPointsPerLodPerSubgroups[i];
    predEnd = predStart +
layerGroupParams.numberOfPointsPerLodPerSubgroups[subgrpArrayIdx];
    }
    }
    subgrpArrayIdx = subgrpArrayIdx_init;
    predStart = predStart_init;
    predEnd = predStart +
layerGroupParams.numberOfPointsPerLodPerSubgroups[subgrpArrayIdx];
    for (lod = lodStart; lod <= lodEnd; lod++) {
    for (int m = predStart; m < predEnd; m++) {
    if(layerGroupParams.numRefNodesInTheSameSubgroup[idxSelectedNodes])
    _quantWeights[m] += weightAdjCoeff_a
    * layerGroupParams.numRefNodesInTheSameSubgroup[m] /
layerGroupParams.numRefNodesInTheSameSubgroup[idxSelectedNodes]
    + weightAdjCoeff_b;
    else
    _quantWeights[m] += weightAdjCoeff_b;
    }
    if (lod != lodEnd) {
    int prevIdx = subgrpArrayIdx;
    subgrpArrayIdx += layerGroupParams.numSubgroupsMinus1[curLayerGroup] + 1;
    for (int i = prevIdx; i < subgrpArrayIdx; i++)
    predStart += layerGroupParams.numberOfPointsPerLodPerSubgroups[i];
    predEnd = predStart +
layerGroupParams.numberOfPointsPerLodPerSubgroups[subgrpArrayIdx];
    }
    }
    }
  int subgroupIdx = layerGroupParams.numSubgroupsMinus1[curLayerGroup] −
```

-continued

```
curSubgroup;
    for (int i = 0; i < curLayerGroup; i++)
    subgroupIdx += (layerGroupParams.numSubgroupsMinus1[i] + 1) *
(layerGroupParams.numLayersPerLayerGroup[i]);
    if(curLayerGroup > 0)
    subgroupIdx++;
    idxStart = 0;
    for (int i = 0; i < subgroupIdx; i++)
    idxStart += layerGroupParams.numberOfPointsPerLodPerSubgroups[i];
    idxEnd = idxStart +
layerGroupParams.numberOfPointsPerLodPerSubgroups[subgroupIdx];
    for (lod = lodStart; lod <= lodEnd; lod++) {
    for (size_t predictorIndex = idxStart; predictorIndex < idxEnd;
    ++predictorIndex) {
    if (predictorIndex == _lods.numPointsInLod[quantLayer]) {
    quantLayer = std::min(int(qpSet.layers.size( )) − 1, quantLayer + 1);
    }
    const uint32_t pointIndex = _lods.indexes[predictorIndex];
    auto quant = qpSet.quantizers(pointCloud[pointIndex], quantLayer);
    auto& predictor = _lods.predictors[predictorIndex];
    predictor.predMode = 0;
    if (−−zeroRunRem < 0)
    zeroRunRem = decoder.decodeRunLength( );
    if (zeroRunRem)
    values[0] = values[1] = values[2] = 0;
    else
    decoder.decode(&values[0]);
    if (predModeEligibleColor(desc, aps, pointCloud, _lods.indexes, predictor))
    decodePredModeColor(aps, values, predictor);
    Vec3<attr_t>& color = pointCloud.getColor(pointIndex);
    const Vec3<attr_t> predictedColor =
    predictor.predictColor(pointCloud, _lods.indexes);
    if (icpPresent)
    icpCoeff = abh.icpCoeffs[lod];
    int64_t residual0 = 0;
    for (int k = 0; k < 3; ++k) {
    const auto& q = quant[std::min(k, 1)];
    int64_t qStep = q.stepSize( );
    int64_t weight = std::min(_quantWeights[predictorIndex], qStep)
    >> kFixedPointWeightShift;
    int64_t residual =
    divExp2RoundHalfUp(q.scale(values[k]), kFixedPointAttributeShift);
    residual /= weight;
    const int64_t recon =
    predictedColor[k] + residual + ((icpCoeff[k] * residual0 + 2) >> 2);
    color[k] = attr_t(PCCClip(recon, int64_t(0), clipMax));
    if (!k && aps.inter_component_prediction_enabled_flag)
    residual0 = residual;
    }
    }
    if (lod != lodEnd) {
    int prevIdx = subgroupIdx;
    subgroupIdx += layerGroupParams.numSubgroupsMinus1[curLayerGroup] + 1;
    //idxStart = 0;
    for (int i = prevIdx; i < subgroupIdx; i++)
    idxStart += layerGroupParams.numberOfPointsPerLodPerSubgroups[i];
    idxEnd = idxStart +
layerGroupParams.numberOfPointsPerLodPerSubgroups[subgroupIdx];
    }
    }
  }
```

The encoder may calculate alpha+beta as the greatest value of the out-of-subgroup weights, and set beta as the average of the out-of-subgroup weights at the subgroup leaf nodes. The out-of-subgroup weights may be estimated from the current subgroup for the out-of-subgroup.

Also, during the encoding process, it may be determined whether each node is included in the subgroup, based on the subgroup bounding box information. When the subgroup changes, the encoder, context, zerorun information, and arithmetic encoder that are used separately for each subgroup are updated. Zerorun, a method to improve compression efficiency by transmitting the number of consecutive zeros, may result in discontinuities within the LoD and reduce compression efficiency due to subgroup division. According to the embodiments, more efficient compression may be implemented by connecting the end of the previous LoD and the beginning of the next LoD within the same subgroup.

This process may be represented in pseudocode as follows.

```
void
AttributeEncoder::encodeColorsPred(
    const AttributeDescription& desc,
    const AttributeParameterSet& aps,
    const QpSet& qpSet,
    PCCPointSet3& pointCloud,
PCCResidualsEncoder& encoder______s,
```

```
std::vector<std::unique_ptr<EntropyEncoder>>& arithmeticEncoders,
LayerGroupSlicingParams& layerGroupParams,
const AttributeBrickHeader& abh,
const AttributeContexts& ctxtMem
)
{
  const size_t pointCount=pointCloud.getPointCount( );
  int64_t clipMax=(1<<desc.bitdepth)−1;
  Vec3<int32_t>values;
PCCResidualsEntropyEstimator context;
int zeroRunAcc=0;
std::vector<int>zerorun;
std::vector<int32_t>residual[3];
for (int i=0; i<3; i++) {
  residual[i].resize(pointCount);
  }
auto arithmeticEncoderIt=arithmeticEncoders.begin( );
  PCCResidualsEncoder encoder(aps, abh, ctxtMem,
    arithmeticEncoderIt→get( ));
  Vec3<int>bbox_min={0,0,0};
  Vec3<int>bbox_max=layerGroupParams.subgrpBbox
    Origin[0][0];
  std::vector<std::vector<std::
    unique_ptr<PCCResidualsEncoder>>>savedState
    Vector;
std::vector<int>zeroRunAccVector;
  std::vector<std::vector<std::
    vector<int>>>zerorunVector;
  //int numPointsInRootLayerGroup=0;
  int curLayerGroupId=0;
  intcurSubgroupId=0;
  int prevLayerGroupId=0;
  intprevSubgroupId=0;
  int numPrevSlices=0;
  int sum_layers=1;
  int startIdx, endIdx;
  if (layerGroupParams.layerGroupEnabledFlag) {
  savedStateVector.resize(layerGroupParams.numLayer-
    GroupsMinus1+1);
  zeroRunAccVector.resize(layerGroupParams.numLay-
    erGroupsMinus1+1);
  zerorunVector.resize(layerGroupParams.numLayer-
    GroupsMinus1+1);
  for (int layerGroupIdx=0;
    layerGroupIdx<=layerGroupParams.numLayer
    GroupsMinus1; layerGroupIdx++) {
savedStateVector[layerGroupldx].resize(layerGroupPa-
  rams.numSubgroupsMinus1[layerGroupI dx]+1);
zerorunVector[layerGroupldx].resize(layerGroupParams.
  numSubgroupsMinus1[layerGroupIdx]+1);
  }
  for (int i=0;
    i<layerGroupParams.numLayerGroupsMinus1+1;
    i++) {
  int sum=0;
  for (int j=0;
    j<layerGroupParams.numSubgroupsMinus1[i]+1;
    j++)
  sum+=layerGroupParams.numNodes[i][j];
  }
}
  else {
  zeroRunAccVector.resize(1);
  zerorunVector.resize(1);
  }
  bool icpPresent=_abh→icpPresent(desc, aps);
  if (icpPresent)
    _abh→icpCoeffs=computeInterComponent Predic-
      tionCoeffs(aps, pointCloud);
  auto icpCoeff=icpPresent?_abh→icpCoeffs[0]: 0;
if (layerGroupParams.layerGroupEnabledFlag) {
  layerGroupParams.quantWeights_outOfSub-
    group.clear( );
  layerGroupParams.quantWeights_outOfSubgroup.re-
    size(lods.predictors.size( ));
  }
  int lod=0;
  int quantLayer=0;
  std::vector<int64_t>quantWeights;
  computeQuantizationWeights(
    _lods.predictors, quantWeights, aps.quant_neigh_
      weight, layerGroupParams);
if (layerGroupParams.layerGroupEnabledFlag) {
  //Update quantizationWeight
  int predCnt=1;
  int arrayldx=1;
  layerGroupParams.quantWeights_top.clear( );
layerGroupParams.quantWeights_top.resize(layerGroup-
  Params.numLayerGroupsMinus1+1);
layerGroupParams.quantWeights_bottom.clear( );
layerGroupParams.quantWeights_bottom.resize(layer-
  GroupParams.numLayerGroupsMinus1+1);
  std::vector<std::vector<int>>numPointsInSubgroups;
  numPointsInSubgroups.resize(layerGroupParam-
    s.numLayerGroupsMinus1+1);
  std::vector<std::vector<int>>idxSelectedNodes;
  idxSelectedNodes.resize(layerGroupParams.numLay-
    erGroupsMinus1+1);
  for (int i=0;
    i<=layerGroupParams.numLayerGroupsMinus1;
    i++) {
  int numSubgroups=layerGroupParams.numSubgroups
    Minus1[i]+1;
  layerGroupParams.quantWeights_top[i].resize(num-
    Subgroups);
  layerGroupParams.quantWeights_bottom[i].resize
    (numSubgroups);
  numPointsInSubgroups[i].resize(numSubgroups);
  idxSelectedNodes[i].resize(numSubgroups);
  if (i==0) {
  numPointsInSubgroups[0][0]=layerGroupParam-
    s.numberOfPointsPerLodPerSubgroups[0];
  layerGroupParams.quantWeights_top[0][0]=layer-
    GroupParams.quantWeights_outOfSubgroup[0];
  }
  std::cout<<"layerGroupParams.numLayersPerLayer
    Group["<<i<<"]="<<layerGroupParams.numLayer-
    sPerLayerGroup[i]
    <<"\numSubgroups="<<numSubgroups<<std::endl;
  std::vector<int>maxValue;
  std::vector<int>maxNumRefNodes;
  maxValue.resize(numSubgroups);
  maxNumRefNodes.resize(numSubgroups);
  if (i==0) {
  idxSelectedNodes[0][0]=0;
  maxNumRefNodes[0]=layerGroupParams.num-
    RefNodesInTheSameSubgroup[0];
  }
  for (int j=0;
    j<layerGroupParams.numLayersPerLayerGroup[i];
    j++) {
  for (int k=0; k<numSubgroups; k++) {
```

```
int lyrgrpIdx=i;
int subgrpIdx=numSubgroups−1−k;
int sum=0;
int numPoints=layerGroupParams.numberOfPointsPerLodPerSubgroups[arrayIdx++];
for (int m=0; m<numPoints; m++) {
if(maxValue[subgrpIdx]<layerGroupParams.quantWeights_outOfSubgroup[predCnt])
maxValue[subgrpIdx]=layerGroupParams.quantWeights_outOfSubgroup[predCnt];
if (maxNumRefNodes[subgrpIdx]<
layerGroupParams.numRefNodesInTheSameSubgroup[predCnt]) {
idxSelectedNodes[lyrgrpIdx][subgrpIdx]=predCnt;
maxNumRefNodes[subgrpIdx]=layerGroupParams.numRefNodesInTheSameSubgroup[predCnt];
}
if (j==layerGroupParams.numLayersPerLayerGroup[i]−1)
layerGroupParams.quantWeights_bottom[i][k]+=layerGroupParams.quantWeights_outOfSubgroup[predCnt];
predCnt++;
}
numPointsInSubgroups[lyrgrpIdx][subgrpIdx]+=numPoints;
if (j==layerGroupParams.numLayersPerLayerGroup[i]−1) {
layerGroupParams.quantWeights_top[i][k]=maxValue[k];
if(numPoints)
layerGroupParams.quantWeights_bottom[i][k]/numPoints;
else
layerGroupParams.quantWeights_bottom[i][k]=0;
}
}
}
}
//Update quantizationWeight
predCnt=1;
arrayIdx=1;
for (int i=0; i<=layerGroupParams.numLayerGroupsMinus1; i++) {
int numSubgroups=layerGroupParams.numSubgroupsMinus1[i]+1;
if (i==0)
quantWeights[0]+=(layerGroupParams.quantWeights_top[0][0]−layerGroupParams.quantWeights_bottom[0][0])
layerGroupParams.numRefNodesInTheSameSubgroup[0]/layerGroupParams.numRefNodesInTheSameSubgroup[idxSelectedNodes[0][0]]
+layerGroupParams.quantWeights_bottom[0][0];
//update quantizationWeight
for (int j=0; j<layerGroupParams.numLayersPerLayerGroup[i]; j++) {
for (int k=0; k<numSubgroups; k++) {
int lyrgrpIdx=i;
int subgrpIdx=numSubgroups−1−k;
int numPoints=layerGroupParams.numberOfPointsPerLodPerSubgroups[arrayIdx++];
for (int m=0; m<numPoints; m++) {
if (layerGroupParams.numRefNodesInTheSameSubgroup[idxSelectedNodes[lyrgrpIdx][subgrpIdx]])
quantWeights[predCnt]+=(layerGroupParams.quantWeights_top[lyrgrpIdx][subgrpIdx]−layerGroupParams.quantWeights_bottom[lyrgrpIdx][subgrpIdx])//alpha
layerGroupParams.numRefNodesInTheSameSubgroup[predCnt]/layerGroupParams.numRefNodesInTheSameSubgroup[idxSelectedNodes[lyrgrpIdx][subgrpIdx]]//Number
+layerGroupParams.quantWeights_bottom[lyrgrpIdx][subgrpIdx]; //beta
else
quantWeights[predCnt]+=layerGroupParams.quantWeights_bottom[lyrgrpIdx][subgrpIdx];
predCnt++;
}
}
}
}
}
int numRemainingNodesInCurSubgroup=0;
int cnt=0;
int numSubgroups=0;
for (int i=0; i<=layerGroupParams.numLayerGroupsMinus1; i++)
for (int j=0; j<=layerGroupParams.numSubgroupsMinus1[i]; j++)
numSubgroups++;
layerGroupParams.numPointsPerAttrSubgroups.resize(numSubgroups);
for (size_t predictorIndex=0; predictorIndex<pointCount; ++predictorIndex) {
if (predictorIndex==_lods.numPointsInLod[quantLayer]) {
quantLayer=std::min(int(qpSet.layers.size( ))−1, quantLayer+1);
}
if (layerGroupParams.layerGroupEnabledFlag) {
if (predictorIndex==0) {
prevLayerGroupId=0;
prevSubgroupId=0;
curLayerGroupId=0;
curSubgroupId=0;
numRemainingNodesInCurSubgroup=layerGroupParams.numberOfPointsPerLodPerSubgroups[cnt++];
sum_layers+=layerGroupParams.numLayersPerLayerGroup[curLayerGroupId];
zeroRunAccVector.resize(layerGroupParams.numSubgroupsMinus1[curLayerGroupId]+1, 0);
layerGroupParams.numPointsPerAttrSubgroups[0]=numRemainingNodesInCurSubgroup;
startIdx=0;
endIdx=numRemainingNodesInCurSubgroup;
}
else if (!numRemainingNodesInCurSubgroup) {//Update every time the subgroup changes.
numRemainingNodesInCurSubgroup=layerGroupParams.numberOfPointsPerLodPerSubgroups[cnt++];
startIdx=endIdx;
endIdx+=numRemainingNodesInCurSubgroup;
if (predictorIndex==_lods.numPointsInLod[lod]&& curSubgroupId==0) {//In the case where the lod changes.
```

```
lod++;
prevLayerGroupId=curLayerGroupId;
prevSubgroupId=curSubgroupId;
if (lod==sum_layers) {//In the case where the layer-group changes
curLayerGroupId++;
curSubgroupId=layerGroupParams.numSubgroupsMinus1[curLayerGroupId];
int refLayerGroupId=layerGroupParams.refLayerGroupId[curLayerGroupId][curSubgroupId];
int refSubgroupId=layerGroupParams.refSubgroupId[curLayerGroupId][curSubgroupId];
numPrevSlices+=layerGroupParams.numSubgroupsMinus1[prevLayerGroupId]+1;
savedStateVector[prevLayerGroupId][prevSubgroupId].reset(new PCCResidualsEncoder(encoder));
encoder=*savedStateVector[refLayerGroupId][refSubgroupId];
encoder.arithmeticEncoder=(arithmeticEncoderIt+(numPrevSlices+curSubgroupId))→get( );
for (int i=0; i<layerGroupParams.numSubgroupsMinus1[prevLayerGroupId]+1; i++) {
if (zeroRunAccVector[i])
zerorunVector[prevLayerGroupId][i].push_back(zeroRunAccVector[i]);
}
zeroRunAccVector.clear( );
zeroRunAccVector.resize(layerGroupParams.numSubgroupsMinus1[curLayerGroupId]+1, 0);
if (icpPresent)
icpCoeff=_abh→icpCoeffs[lod];
}
else {//In the case where the lod changes but the layer-group remains the same
curSubgroupId=layerGroupParams.numSubgroupsMinus1[curLayerGroupId];
savedStateVector[prevLayerGroupId][prevSubgroupId].reset(new PCCResidualsEncoder(encoder));
encoder=*savedStateVector[curLayerGroupId][curSubgroupId];
encoder.arithmeticEncoder=(arithmeticEncoderIt+(numPrevSlices+curSubgroupId))→get( );
if (icpPresent)
icpCoeff=_abh→icpCoeffs[lod];
}
if(lod==sum_layers)
std::cout<<"refLayerGroupId="<<layerGroupParams.refLayerGroupId[curLayerGroupId][curSubgroupId]
<<"\trefSubgroupId="<<layerGroupParams. refSubgroupId[curLayerGroupId][curSubgroupId]<<std::endl;
}
else {//In the case where the lod does not change
prevLayerGroupId=curLayerGroupId;
prevSubgroupId=curSubgroupId--;
if (lod==sum_layers) {//Start of subgroups
int refLayerGroupId=layerGroupParams.refLayerGroupId[curLayerGroupId][curSubgroupId];
int refSubgroupId=layerGroupParams.refSubgroupId[curLayerGroupId][curSubgroupId];
savedStateVector[prevLayerGroupId][prevSubgroupId].reset(new PCCResidualsEncoder(encoder));
encoder=*savedStateVector[refLayerGroupId][refSubgroupId];
encoder.arithmeticEncoder=(arithmeticEncoderIt+(numPrevSlices+curSubgroupId))→get( );
if (!curSubgroupId)
sum_layers+=layerGroupParams.numLayersPerLayerGroup[curLayerGroupId];
}
else {//Continued with subgroups
savedStateVector[prevLayerGroupId][prevSubgroupId].reset(new PCCResidualsEncoder(encoder));
encoder=*savedStateVector[curLayerGroupId][curSubgroupId];
encoder.arithmeticEncoder=(arithmeticEncoderIt+(numPrevSlices+curSubgroupId))→get( );
}
}
int idx=curSubgroupId;
for (int i=0; i<curLayerGroupId; i++)
idx+=(layerGroupParams.numSubgroupsMinus1[i]+1);
layerGroupParams.numPointsPerAttrSubgroups[idx]+=numRemainingNodesInCurSubgroup;
}
else {
//If the subgroup does not change, continue to use the encoder.
}
if (numRemainingNodesInCurSubgroup)
numRemainingNodesInCurSubgroup−−;
else {
predictorIndex−−;
continue;
}
}
  const auto pointIndex=_lods.indexes[predictorIndex];
  auto quant=qpSet.quantizers(pointCloud[pointIndex], quantLayer);
  auto& predictor=_lods.predictors[predictorIndex];
  predictor.predMode=0;
  bool predModeEligible=predModeEligibleColor(desc, aps, pointCloud, _lods.indexes, predictor);
  if (predModeEligible)
    decidePredModeColor(
      desc, aps, pointCloud, _lods.indexes, predictorIndex, predictor,
      encoder, context, icpCoeff, quant);
  const Vec3<attr_t>color=pointCloud.getColor(pointIndex);
  const Vec3<attr_t>predictedColor=
    predictor.predictColor(pointCloud, _lods.indexes);
  Vec3<attr_t>reconstructedColor;
  int64_t residual0=0;
  for (int k=0; k<3; ++k) {
    const auto& q=quant[std::min(k, 1)];
    int64_t residual=color[k]−predictedColor[k];
    int64_t qStep=q.stepSize( );
    int64_t weight=std::min(quantWeights[predictorIndex], qStep)
    >>kFixedPointWeightShift;
    int64_t residualQ=q.quantize((residual*weight)<<kFixedPointAttributeShift);
    int64_t residualR=divExp2RoundHalfUp(q.scale(residualQ), kFixedPointAttributeShift);
    residualR/=weight;
    if (aps.inter_component_prediction_enabled_flag && k>0) {
      residual=residual−((icpCoeff[k]*residual0+2)>>2);
```

```
residualQ=q.quantize((residual*weight)
  <<kFixedPointAttributeShift);
residualR=divExp2RoundHalfUp(q.scale(residualQ), kFixedPointAttributeShift);
residualR/=weight;
residualR+=((icpCoeff[k]*residual0+2)>>2);
}
if(k==0)
  residual0=residualR;
values[k]=residualQ;
int64_t recon=predictedColor[k]+residualR;
reconstructedColor[k]=attr_t(PCCClip(recon, int64_t(0), clipMax));
}
if (predictorIndex<=startIdx+5||predictorIndex>=endIdx-5) {
for (int k=0; k<predictor.neighborCount; k++) {
auto predictorIndex_NN=predictor.neighbors[k].predictorIndex;
auto pointIndex NN=_lods.indexes[predictorIndex_NN];
}
}
  if (predModeEligible)
    encodePredModeColor(aps, predictor.predMode, values);
  pointCloud.setColor(pointIndex, reconstructedColor);
  encoder.resStatUpdateColor(values);
  if (!values[0]&& !values[1]&& !values[2]) {
++zeroRunAccVector[curSubgroupId];
}else {
zerorunVector[curLayerGroupId][curSubgroupId].push_back(zeroRunAccVector[curSubgroupId]);
  zeroRunAccVector[curSubgroupId]=0;
  zerorun.push_back(zeroRunAcc);
  zeroRunAcc=0;
}
for (int i=0; i<3; i++) {
  residual[i][predictorIndex]=values[i];
  }
}
if (layerGroupParams.layerGroupEnabledFlag) {
savedStateVector[curLayerGroupId][curSubgroupId].reset(new-PCCResidualsEncoder(encoder));
zerorunVector[curLayerGroupId][curSubgroupId].push_back(zeroRunAccVector[curSubgroupId]);
  for (int i=0; i<layerGroupParams.numSubgroupsMinus1[curLayerGroupId]+1; i++)
{
  if (zeroRunAccVector[i])
  zerorunVector[curLayerGroupId][i].push_back(zeroRunAccVector[i]);
  }
  }
  else {
  if (zeroRunAcc)
  zerorun.push_back(zeroRunAcc);
}
std::vector<std::vector<int>>zeroRunRemVector;
  std::vector<std::vector<int>>runIdxVector;
  zeroRunRemVector.resize(layerGroupParams.numLayerGroupsMinus1+1);
  runIdxVector.resize(layerGroupParams.numLayerGroupsMinus1+1);
  for (int i=0; i<layerGroupParams.numLayerGroupsMinus1+1; i++) {
zeroRunRemVector[i].resize(layerGroupParams.numSubgroupsMinus1[i]+1, 0);
runIdxVector[i].resize(layerGroupParams.numSubgroupsMinus1[i]+1, 0);
}
prevLayerGroupId=0;
prevSubgroupId=0;
curLayerGroupId=0;
curSubgroupId=0;
int runIdx=0;
int zeroRunRem=0;
numPrevSlices=0;
numRemainingNodesInCurSubgroup=0;
cnt=0;
sum_layers=1;
lod=0;
for (size_t predictorIndex=0; predictorIndex<pointCount;
++predictorIndex) {
if (layerGroupParams.layerGroupEnabledFlag) {
if (predictorIndex==0) {
prevLayerGroupId=0;
prevSubgroupId=0;
curLayerGroupId=0;
curSubgroupId=0;
numRemainingNodesInCurSubgroup=layerGroupParams.numberOfPointsPerLodPerSubgroups[cnt++];
sum_layers+=layerGroupParams.numLayersPerLayerGroup[curLayerGroupId];
encoder=*savedStateVector[curLayerGroupId][curSubgroupId];
encoder.arithmeticEncoder=(arithmeticEncoderIt+(numPrevSlices+curSubgroupId))->get( );
startIdx=0;
endIdx=numRemainingNodesInCurSubgroup;
}
else if (!numRemainingNodesInCurSubgroup) {//Update every time the subgroup changes.
numRemainingNodesInCurSubgroup=layerGroupParams.numberOfPointsPerLodPerSubgroups[cnt++];
startIdx=endIdx;
endIdx+=numRemainingNodesInCurSubgroup;
if (predictorIndex==_lods.numPointsInLod[lod]&& curSubgroupId==0) {//In the case where the lod changes.
lod++;
prevLayerGroupId=curLayerGroupId;
prevSubgroupId=curSubgroupId;
if (lod==sum_layers) {//In the case where the layer-group changes
curLayerGroupId++;
curSubgroupId=layerGroupParams.numSubgroupsMinus1[curLayerGroupId];
int refLayerGroupId=layerGroupParams.refLayerGroupId[curLayerGroupId][curSubgroupId];
int refSubgroupId=layerGroupParams.refSubgroupId[curLayerGroupId][curSubgroupId];
numPrevSlices+=layerGroupParams.numSubgroupsMinus1[prevLayerGroupId]+1;
savedStateVector[prevLayerGroupId][prevSubgroupId].reset(new PCCResidualsEncoder(encoder));
encoder=*savedStateVector[refLayerGroupId][refSubgroupId];
encoder.arithmeticEncoder=(arithmeticEncoderIt+(numPrevSlices+curSubgroupId))->get( );
}
```

```
else {
curSubgroupId=layerGroupParams.numSubgroups
  Minus1[curLayerGroupId];
savedStateVector[prevLayerGroupId][prevSubgrou-
  pId].reset(new PCCResidualsEncoder(encoder));
encoder=*savedStateVector[curLayerGroupId][cur-
  SubgroupId];
encoder.arithmeticEncoder=(arithmeticEncoderIt+
  (numPrevSlices+curSubgroupId))→get( );
}
}
else {//In the case where the lod does not change
prevLayerGroupId=curLayerGroupId;
prevSubgroupId=curSubgroupId−−;
if (lod==sum_layers) {//Start of subgroups
int refLayerGroupId=layerGroupParams.refLayer
  GroupId[curLayerGroupId][curSubgroupId];
int refSubgroupId=layerGroupParams.refSubgroupId
  [curLayerGroupId][curSubgroupId];
savedStateVector[prevLayerGroupId][prevSubgrou-
  pId].reset(new PCCResidualsEncoder(encoder));
encoder=*savedStateVector[refLayerGroupId][refSub-
  groupId];
encoder.arithmeticEncoder=(arithmeticEncoderIt+
  (numPrevSlices+curSubgroupId))→get( );
if (!curSubgroupId)
sum_layers+=layerGroupParams.numLayersPerLayer-
  Group[curLayerGroupId];
}
else {
savedStateVector[prevLayerGroupId][prevSubgrou-
  pId].reset(new-PCCResidualsEncoder(encoder));
encoder=*savedStateVector[curLayerGroupId][cur-
  SubgroupId];
encoder.arithmeticEncoder=(arithmeticEncoderIt+
  (numPrevSlices+curSubgroupId))→get( );
}
}
zeroRunRemVector[prevLayerGroupId][prevSubgrou-
  pId]=zeroRunRem;
runIdxVector[prevLayerGroupId][prevSubgroupId]=
  runIdx;
zeroRunRem=zeroRunRemVector[curLayerGroupId]
  [curSubgroupId];
runIdx=runIdxVector[curLayerGroupId][curSubgrou-
  pId];
}
else {
//If the subgroup does not change, continue to use the
  encoder.
}
if (numRemainingNodesInCurSubgroup)
numRemainingNodesInCurSubgroup−−;
else {
predictorIndex−−;
continue;
}
}
if (−−zeroRunRem<0) {
zeroRunRem=zerorunVector[curLayerGroupId][cur-
  SubgroupId][runIdx++];
encoder.encodeRunLength(zeroRunRem);
}
if (!zeroRunRem) {
for (size_t k=0; k<3; k++)
values[k]=residual[k][predictorIndex];
  encoder.encode(values[0], values[1], values[2]);
  }
}
for (int k=0; k<arithmeticEncoders.size( ); k++) {
  auto dataLen=arithmeticEncoders[k]→stop( );
}
int runIdx=0;
  int zeroRunRem=0;
  for (size_t predictorIndex=0;
    predictorIndex<pointCount;
    ++predictorIndex) {
  if (−−zeroRunRem<0) {
    zeroRunRem=zerorun[runIdx++];
    encoder.encodeRunLength(zeroRunRem);
  }
  if (!zeroRunRem) {
    for (size_t k=0; k<3; k++)
      values[k]=residual[k][predictorIndex];
    encoder.encode(values[0], values[1], values[2]);
    }
  }
}
```

FIG. 24 illustrates an attribute encoding method according to embodiments.

The point cloud data transmission method/device according to embodiments of FIG. 24 corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 11, 20, 30, and 32, the transmission method of FIG. 33, and the like.

FIG. 24 is an exemplary flowchart of a layer-group slicing encoder for LoD-based attribute coding. First, parameters of SPS, GPS, APS, LGSI, or the like are generated, and a layer-group structure is configured. The layer-group structure may be configured when or before a layer group slice inventory (LGSI) is generated. After geometry coding is performed, LoD generation is performed based on geometry nodes. An attribute coding layer (e.g., LoD, RAHT coding layer) is matched to a layer-group, and then a quantization weight is obtained based on the LoD. Then, it is checked for each attribute coding layer whether the layer-group has changed, and it is checked for nodes in the attribute coding layer whether the subgroup has changed. When the subgroup or layer-group is changed, the attribute encoder for the previous subgroup may be stored and the attribute encoder for the current subgroup may be used to ensure continuity of contexts, zeroruns, and the like within the subgroup and to ensure independence from neighbor subgroups. After compressing the nodes belonging to all attribute coding layers, the coded bitstream for each subgroup is packed into each slice.

While the example described above is based on LoD-based attribute coding, the same may also be applied to other attribute coding, such as RAHT, which is included in the embodiments.

Referring to FIG. 24, the encoder may encode point cloud data according to the flowchart of FIG. 24. Depending on the encoding configuration of encoder, the values of the parameters may be generated. Here, parameters of the SPS, GPS, APS, LGSI, and the like may be generated and transmitted in a bitstream along with the encoded point cloud data. The encoder may first encode the geometry data of the point cloud data through a geometry encoder. After the geometry encoding, the encoder may generate LODs through an attribute encoder. During LOD generation, the attributes may be represented in a layer-group (which may be referred to as a layer-group including subgroups, an FGS including the same, or the like) structure according to embodiments described above. LODs may be mapped to layer-groups. One or more indexes (which may be referred to as layers, levels, depths, etc.) of LODs may be grouped (or mapped) into layer-groups. Each layer-group may be assigned a weight. For example, when the highest level layer-group is important, it may be assigned a greater weight. On the other hand, when the lowest level layer-group is important, it may be assigned a greater weight. The weights are variable depending on depending on the desired configuration, such as random access to data about the level of detail and partial coding. A layer-group may be determined. Here, the determined layer-group may be a layer-group to be partially encoded or partially transmitted. A subgroup may be determined among the subgroups belonging to the layer-group. The determined subgroup may be a subgroup to be partially encoded or partially transmitted. It is checked whether the subgroup changes. In the case where the subgroup changes, the context information may be saved in encoding the subgroup, and necessary context information may be loaded. The attributes of a node are encoded. In the case where the subgroup does not change, the attributes of the node may be encoded immediately. When the end of the nodes and the end of LOD are reached, an attribute data unit header may be generated. An attribute bitstream may be generated and transmitted along with the geometry bitstream. Additionally, predictive encoding may be performed based on subgroups, as illustrated in FIGS. 21 to 23.

Figure 25:
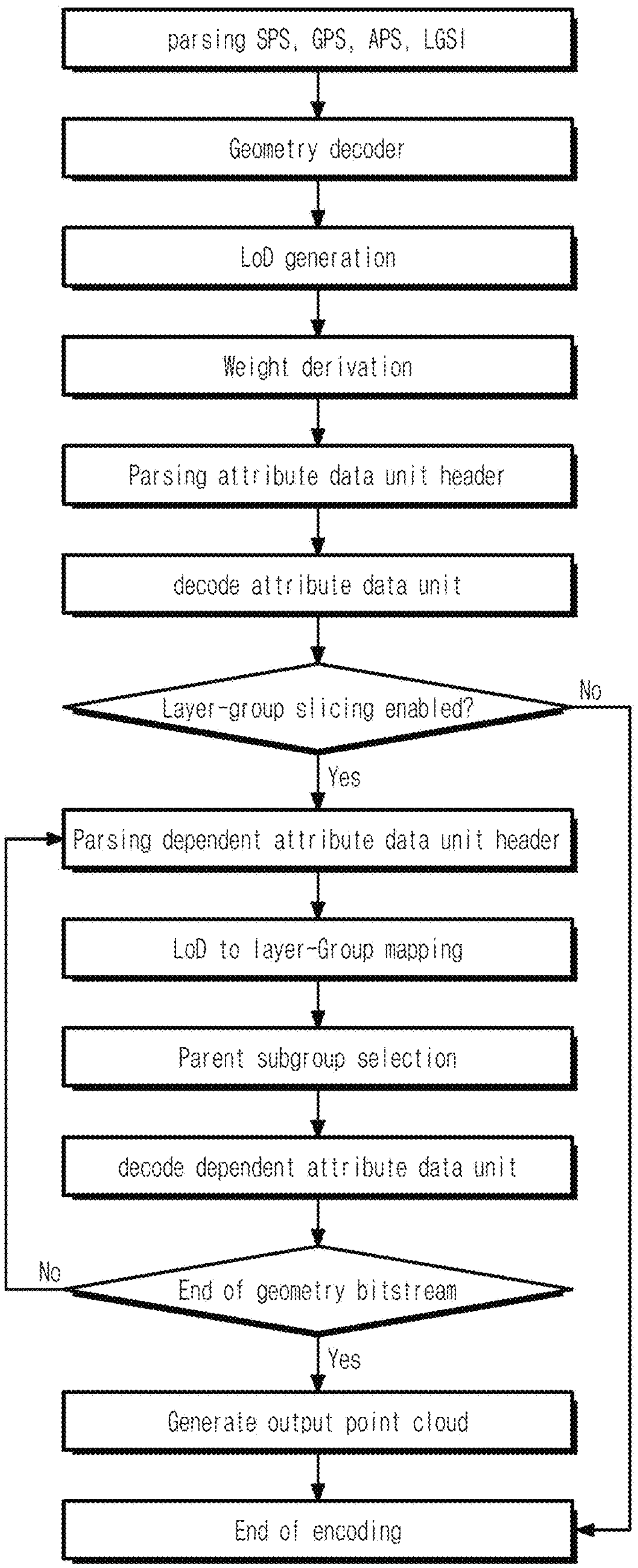
FIG. 25 illustrates an attribute decoding method according to embodiments.

FIG. 25 illustrates an attribute decoding method according to embodiments.

The point cloud data reception method/device according to embodiments of FIG. 25 corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIG. 7, the reception device of FIG. 9, the devices of FIG. 10, the decoder of FIGS. 11, 20, 30, and 32, the reception method of FIG. 34, and the like.

The inputs to the attribute decoder are an attribute fine granularity slice bitstream, decoded geometry data, and a layer-group structure. After geometry decoding, LoD generation is performed based on the decoded geometry data provided, and weight derivation is performed based on the relationship of nodes according to the LoD. The information generated through the operations is used in the subsequent operations for attribute decoding. The first attribute slice may be operated in the same manner that the previous attribute slice is operated. Then, when layer-group slicing is enabled, the dependent attribute data unit header may be parsed and the information in layer_group_id and subgroup_id may be acquired. When necessary, information about the LoD may be signaled. Based on the information, a layer-group that matches the current LoD may be searched for, and a parent subgroup may be selected. When the layer-group structure is applied to geometry and attributes in the same manner, the reference and parent information used in geometry decoding may be used. Based on the information, the information in the dependent attribute data unit may be decoded and the point cloud data may be reconstructed.

In performing the decoding, the LoD generation and weight derivation methods used by the encoder may be used. Thus, the LoDs may be mapped to layer-groups.

Referring to FIG. 25, the decoder may decode the point cloud data based on the flowchart shown in FIG. 25. Parameters contained in the bitstream, for example, the SPS, GPS, APS, and LGSI, may be parsed. The geometry decoder of the decoder may decode geometry data. The attribute decoder of the decoder may generate an LOD. In generating the LOD, the layer-group structure (FGS) according to embodiments may be used. LOD-specific weights may be derived. The weights may be applied to the attributes in the reverse process to the operation of the encoder. The attribute data unit header in the bitstream may be parsed. The attribute data unit in the bitstream may be decoded. It is checked whether layer-group slicing is enabled. When layer-group slicing is enabled, the dependent attribute data unit header is parsed. LODs may be mapped to layer-groups. A higher subgroup of the current subgroup of the current layer-group may be selected. The higher subgroup may refer to the parent subgroup of the current subgroup, the parent subgroup of the parent, and the like. The dependent attribute data unit may be decoded. It is checked whether the end of the geometry bitstream is reached. The attribute bitstream corresponding to the geometry bitstream may be decoded. Both geometry and attributes are decoded, and point cloud output is generated. Then, the decoding process is terminated. When the layer-group slicing is not enabled, decoding may be terminated without any layer-group-based operation. Additionally, predictive decoding may be performed based on subgroups, as illustrated in FIGS. 21 to 23.

Figure 26:
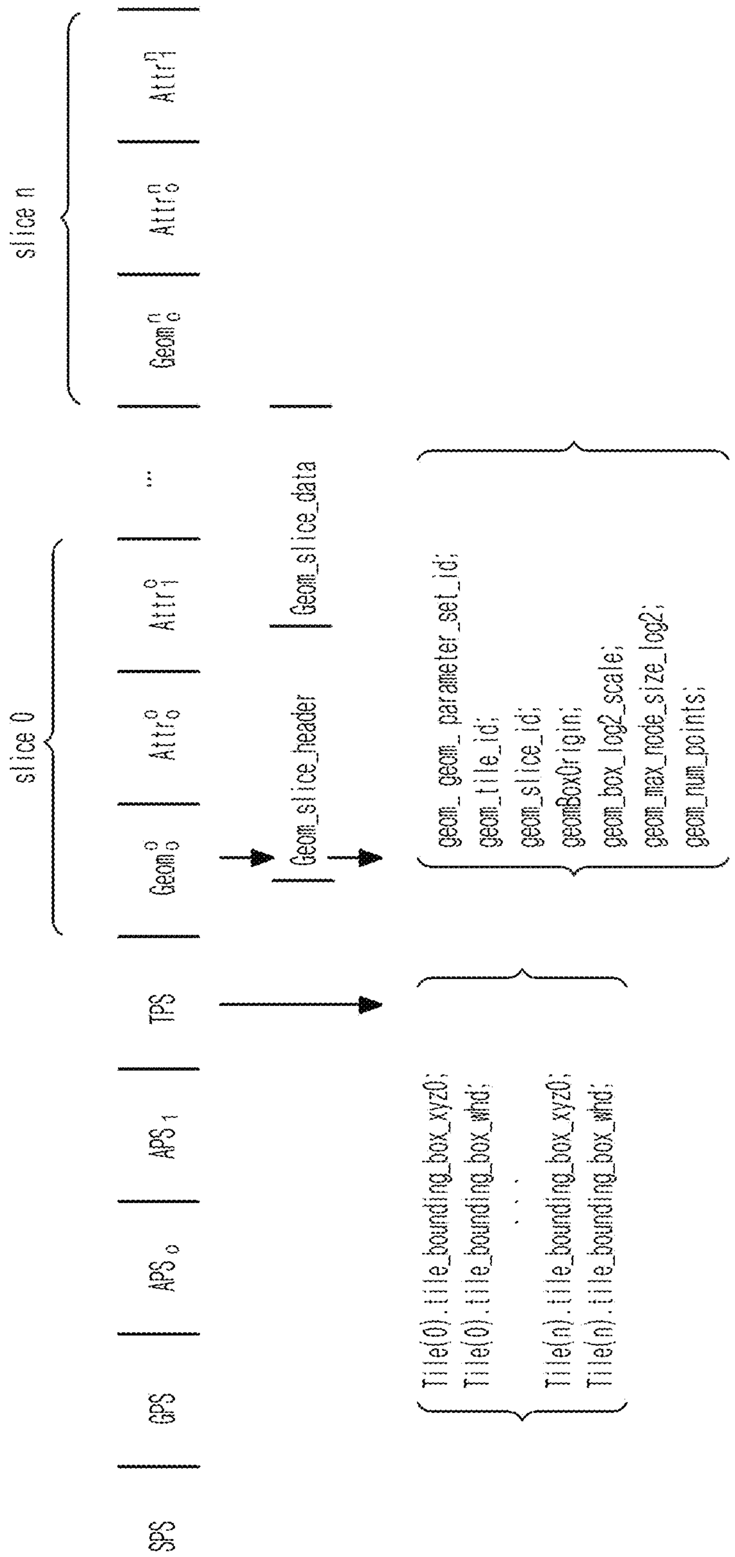
FIG. 26 illustrates a bitstream containing parameters and encoded point cloud data according to embodiments.

FIG. 26 illustrates a bitstream containing parameters and encoded point cloud data according to embodiments.

The point cloud data transmission method/device according to embodiments, which corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 11, 20, 30, and 32, the transmission method of FIG. 33, and the like, may generate the bitstream as shown in FIG. 26.

The point cloud data reception method/device according to embodiments of FIG. 25, which corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIG. 7, the reception device of FIG. 9, the devices of FIG. 10, the decoder of FIGS. 11, 20, 30, and 32, the reception method of FIG. 34, and the like, may parse the bitstream as shown in FIG. 26.

Information about the separated slices (which refers to layer-groups, subgroups, FSGs, etc.) according to embodiments may be defined in parameter sets and an SEI message as follows. It may be defined in the sequence parameter set, geometry parameter set, attribute parameter set, geometry slice header and attribute slice header, and may be defined at a corresponding position or a separate position depending on the application or system to use a different application range, a different application method, and the like. In other words, it may have a different meaning depending on the position at which the signal is carried. When the information is defined in the SPS, it may be applied equally throughout the sequence. When it is defined in the GPS, this may indicate that the information is used for position reconstruction. When it is defined in the APS, it may indicate that the information is applied to attribute reconstruction. When it is defined in the TPS, it may indicate that the signaling is applied only to the points within a tile. When delivered on a slice basis, it may indicate that the signaling is applied only to the corresponding slice. Also, it may be defined at a corresponding position or a separate position depending on the application and the system to use a different application range, a different application method, and the like. In addition, when the syntax elements defined below are applicable to multiple point cloud data streams as well as the current point cloud data stream, the information may be carried in a superordinate parameter set or the like.

Each abbreviation has the following meaning. Each abbreviation may be referred to by another term within the scope of the equivalent meaning: SPS: Sequence Parameter Set; GPS: Geometry Parameter Set; APS: Attribute Parameter Set; TPS: Tile Parameter Set; Geom: Geometry bitstream=geometry slice header+geometry slice data; Attr: Attribute bitstream=attribute brick header+attribute brick data.

While defining the information independently of the coding technique has been described, the information may be defined in connection with the coding method. It may be defined in the tile parameter set to support regionally different scalability. In addition, when the syntax elements defined below are applicable to multiple point cloud data streams as well as the current point cloud data stream, the information may be carried in a superordinate parameter set or the like.

Alternatively, a network abstract layer (NAL) unit may be defined, and relevant information for selecting a layer, such as layer_id, may be delivered such that a bitstream may be selected at the system level.

Parameters (which may be referred to as metadata, signaling information, etc.) according to embodiments may be generated in a process of a transmitter according to embodiments described below, and delivered to a receiver according to embodiments for use in a reconstruction process.

For example, the parameters according to embodiments may be generated in a metadata processor (or metadata generator) of the transmission device according to embodiments described below and acquired by a metadata parser of the reception device according to embodiments.

The transmission method/device according to the embodiments generates information as shown in FIGS. 27 to 29, and transmits the bitstream of FIG. 26 containing the same.

FIG. 27 illustrates a sequence parameter set according to embodiments.

FIG. 27 illustrates a sequence parameter set contained in the bitstream of FIG. 26.

sps_extension_flag: Indicates whether the sequence parameter set is extended. Depending on whether the set is extended, it contains the following elements layer_group_enabled_flag: Indicates whether the bitstream included in the sequence is encoded based on a layer group (e.g., FIG. 17).

num_layer_groups_minus1: Indicates the number of layer groups contained in the bitstream.

layer_group_id[i]: Identifies each layer group.

num_layers_minus1[i]: Indicates the number of layers included in the layer group.

subgroup_enabled_flag[i]: Indicates whether a layer group includes subgroups, as shown in FIG. 18.

subgroup_bbox_origin_bits_minus1: Indicates the origin position of the bounding box of the subgroup.

subgroup_bbox_size_bits_minus1: Indicates the size (width, height, depth) of the bounding box of the subgroup.

root_subgroup_bbox_origin: Indicates the origin position of the bounding box that is the root among the bounding boxes of the subgroup.

root_subgroup_bbox_size: Indicates the size (width, height, depth) of the bounding box that is the root among the bounding boxes of the subgroup the subgroup.

root_subgroup_bbox_origin indicates the origin position of the subgroup bounding box of the root subgroup.

root_subgroup_bbox_size indicates the size of the subgroup bounding box of the root subgroup FIG. 28 illustrates an attribute parameter set and an attribute data unit header according to embodiments.

FIG. 28 illustrates an attribute parameter set and an attribute data unit header contained in the bitstream of FIG. 26.

aps_attr_ref_id_present_flag: When equal to 1, it indicates the context reference of the attribute slice based on attr_ref_layer_group_id and attr_ref_subgroup_id. It indicates that the context state use of subsequent attribute slices is indicated by attr_context_reference_indication_flag. When aps_attr_ref_id_present_flag is equal to 0, the context reference and context state use are inherited from the geometry slice corresponding to layer_group_id and subgroup_id of the current dependent attribute slice.

subgroup_weight_adj_coeff_a_bits_minus1 and subgroup_weight_adj_coeff_b_bits_minus1 plus 1 indicate the size of subgroup_weight_adj_coeff_a and the size of subgroup_weight_adj_coeff_b, respectively.

subgroup_weight_adj_coeff_a and subgroup_weight_adj_ coeff_b indicate the coefficients for weight adjustment in the current subgroup.

FIG. 29 illustrates a dependent attribute data unit header according to embodiments.

FIG. 29 illustrates a dependent attribute data unit header contained in the bitstream of FIG. 26.

dadu_attribute_parameter_set_id of the dependent attribute data unit indicates the active attribute parameter set (APS) indicated by aps_attr_parameter_set_id. The value of dgdu_attribute_parameter_set_id of the dependent geometry data unit is equal to the value of adu_geometry_parameter_set_id of the attribute data unit of the corresponding slice dadu_sps_attr_idx identifies the attribute coded as an index to the active SPS attribute list.

dadu_slice_id indicates the attribute fragment to which the current dependent attribute data unit belongs.

dadu_layer_group_id indicates the indicator of the layer group of the slice. dadu_layer_group_id is in the range of 0 to num_layer_groups_minus1. When not present, it is inferred to be 0.

dadu_subgroup_id indicates the subgroup indicator of the layer group referenced by dadu_layer_group_id. dadu_subgroup_id is in the range of 0 to num_subgroups_minus1 [dadu_layer_group_id]. Here, dadu_subgroup_id indicates the order of slices in the same dadu_layer_group_id. When not present, dadu_subgroup_id is inferred to be 0.

attr_ref_layer_group_id indicates an indicator of the layer group identifier for the context reference of the current dependent attribute data unit. attr_ref_layer_group_id is in the range of 0 to attr_layer_group_id of the current dependent attribute data unit.

attr_ref_subgroup_id indicates an indicator of the reference subgroup of the layer group indicated by attr_ref_layer_group_id. attr_ref_subgroup_id is in the range of 0 to num_subgroup_id_minus1 in the layer group indicated by attr_ref_layer_group_id.

When attr_context_reference_indication_flag is equal to 1, attr_context_reference_indication_flag indicates that the context state of the current dependent attribute slice is inherited by one or more subsequent dependent attribute slices. attr_context_reference_indication_flag equal to 0 indicates that the context state of the current dependent slice is not inherited by subsequent dependent slices.

The decoder may use attr_context_reference_indication_flag to manage the context buffer. When attr_context_reference_indication_flag is equal to 1, the context state of the current dependent slice is stored in the context buffer at the end of decoding. When attr_context_reference_indication_flag is equal to 0, the context state of the current dependent slice is not stored in the context buffer.

When subgroup_weight_adj_coeff_present_flag is equal to 1, subgroup_weight_adj_coeff_present_flag indicates that subgroup_weight_adj_coeff_a and subgroup_weight_adj_coeff_b are present for the current subgroup corresponding to the current slice. When subgroup_weight_adj_coeff_present_flag is equal to 0, subgroup_weight_adj_coeff_present_ flag indicates that subgroup weight adjustment coefficients are not present. The subgroup weight adjustment coefficients (subgroup_weight_adj_coeff_a and subgroup_weight_adj_coeff_b) are inferred to be 0.

FIG. 30 illustrates the process of transmitting partial point cloud data according to embodiments.

The point cloud data transmission method/device according to embodiments, which corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 11, 20, 30, and 32, the transmission method of FIG. 33, and the like, may scalably encode the entire point cloud data, store the same in the storage, perform transcoding for partial encoding, and then transmit a partial bitstream, as shown in FIG. 30.

The point cloud data reception method/device according to embodiments, which corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIG. 7, the reception device of FIG. 9, the devices of FIG. 10, the decoder of FIGS. 11, 20, 30, and 32, the reception method of FIG. 34, and the like, may receive and decode a bitstream of partial point cloud data to reconstruct partial geometry and/or partial attributes.

Embodiments include a method of dividing and transmitting compressed data according to specific criteria for point cloud data. When layered coding is used, the compressed data may be divided and transmitted according to layers, which may increase the efficiency of the receiving side.

The geometry and attributes of point cloud data may be compressed to provide a service. In PCC-based services, the compression rate or number of data may be adjusted for transmission depending on the receiver performance or transmission environment.

When point cloud data is configured on a slice-by-slice basis, the receiver performance or transmission environment may change. In this case, it is necessary to 1) pre-transcode a bitstream into a form suitable for each environment, store the same separately, and select a portion at the time of transmission, or to 2) perform transcoding prior to the transmission. In this case, if the number of receiver environments to be supported increases or the transmission environment frequently changes, issues related to the storage space or a delay resulting from transcoding may be raised.

FIG. 31 illustrates a method of transmitting and receiving point cloud data according to embodiments.

The point cloud data transmission method/device according to embodiments, which corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 11, 20, 30, and 32, the transmission method of FIG. 33, and the like, may scalably encode the entire point cloud data and store the same in the storage (the storing may be skipped) as shown in FIG. 30, and may select a bitstream to immediately transmit a partial point cloud, unlike in FIG. 30.

The point cloud data reception method/device according to embodiments, which corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIG. 7, the reception device of FIG. 9, the devices of FIG. 10, the decoder of FIGS. 11, 20, 30, and 32, the reception method of FIG. 34, and the like, may immediately receive and decode a bitstream of partial point cloud data to reconstruct partial geometry and/or partial attributes.

According to embodiments, when compressed data is partitioned and transmitted according to layers, only a necessary part of the pre-compressed data may be selectively transmitted in a bitstream step without a separate transcoding operation. This is efficient even in terms of storage space because only one storage space per stream is needed. Also, since only necessary layers are selectively transmitted, efficient transmission may be performed even in terms of a (bitstream selector) bandwidth.

The point cloud data reception method/device according to embodiments may provide the following effects.

FIG. 32 illustrates a method of transmitting and receiving point cloud data according to embodiments.

The point cloud data transmission method/device according to embodiments, which corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 3, the transmission device of FIG. 8, the devices of FIG. 10, the encoder of FIGS. 11, 20, 30, and 32, the transmission method of FIG. 33, and the like, may scalably encode the entire point cloud data and store the same in the storage (the storing may be skipped), perform transcoding, then transmit the entire point cloud, as shown in FIG. 31.

The point cloud data reception method/device according to embodiments, which corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIG. 7, the reception device of FIG. 9, the devices of FIG. 10, the decoder of FIGS. 11, 20, 30, and 32, the reception method of FIG. 34, and the like, may receive the entire point cloud, scalably decode the same, and select data through subsampling to carry out the method of reconstructing the entire geometry/attributes or reconstructing partial geometry/attributes.

In other words, when layered point cloud data is transmitted, advantageous effects may be achieved on the transmitting and receiving sides. In this case, if information that enables the entire PCC data to be reconstructed is transmitted regardless of the performance of the receiver, the receiver needs to select data corresponding to a required layer (i.e., perform data selection or sub-sampling) after reconstructing the point cloud data through decoding. In this case, since the delivered bitstream has already been decoded, a delay may occur in the receiver targeting low delay, or decoding may not be performed depending on the receiver performance.

According to embodiments, when the bitstream is divided into slices and delivered, the receiver may selectively deliver the bitstream to the decoder according to the decoder performance or the density of the point cloud data to be represented according to the application field. In this case, by performing selection before the decoding, the decoder efficiency may increase and decoders with various performances may be supported.

FIG. 33 illustrates a method of transmitting point cloud data according to embodiments.

S3300: The point cloud data transmission method according to embodiments may include encoding point cloud data.

The encoding operation according to the embodiments may include the transmission device 10000, the point cloud video acquirer 10001, and the point cloud video encoder 10002 of FIG. 1, the acquisition 20000/encoding 20001 of FIG. 2, the encoder of FIG. 3 the encoder of FIG. 8, the XR device 1030 of FIG. 10, the encoder 15000 of FIG. 11, the encoder 60000 and slice selector 60001 of FIG. 20, the parameter generation and geometry/attribute encoding of FIG. 24, the bitstream and parameter generation of FIGS. 26 to 29, and the scalable encoder, bitstream selector of FIGS. 30 to 32.

S3301: The point cloud data transmission method according to embodiments may further include transmitting a bitstream containing the point cloud data.

The transmitting operation according to the embodiments may include the transmission device 10000, the transmitter 10003 of FIG. 1, the transmission 20002 of FIG. 2, the bitstream transmission of FIG. 3, the bitstream transmission of FIG. 8, the partial or full PCC bitstream transmission of FIG. 11, the layer group-based bitstream transmission of FIG. 20, and the partial or full bitstream transmission of FIGS. 30 to 32.

FIG. 34 illustrates a method of receiving point cloud data according to embodiments.

S3400: The point cloud data reception method according to embodiments may include receiving a bitstream containing point cloud data.

The receiving operations according to the embodiments may include the reception device 10004 and receiver 10005 of FIG. 1, the transmission 20002 of FIG. 2, the bitstream reception of FIGS. 7 and 9, the XR device 1030 of FIG. 10, the full or partial bitstream reception of FIG. 11, the layer group-based bitstream reception of FIG. 20, the bitstream and parameter parsing of FIG. 25, the parameter and bitstream reception of FIGS. 26 to 29, and the full or partial bitstream reception of FIGS. 30 to 32.

S3401: The point cloud data reception method according to embodiments may further include decoding the point cloud data.

The decoding operation according to the embodiments may include the reception device 10004, point cloud video decoder 10006, and receiver 10007 of FIG. 1, the decoding 20003/rendering 20004 of FIG. 2, the decoders of FIGS. 7 and 9, the XR device 1030 of FIG. 10, the decoder, selectable decoder, data selection of FIG. 11, the decoder 60002 of FIG. 20, the parameter decoding and geometry/attribute decoding of FIG. 25, the parameter and bitstream decoding of FIGS. 26 to 29, and the decoder, selectable decoder, and data selector/sub-sampling of FIGS. 30 to 32.

Referring to FIG. 1, a transmission method according to embodiments may include encoding point cloud data, and transmitting a bitstream containing the point cloud data.

Referring to FIGS. 18, 25, and 21, regarding attributes, LoD, layer groups (subgroups), nearest neighbor search, and intra-layer-group search, the encoding of point cloud data may include encoding an attribute of the point cloud data. The encoding of the attribute may include generating a layer group based on a level of detail (LOD) of the attribute, and searching for a neighbor candidate of the attribute based on neighbor nodes of a subgroup in the layer group.

Referring to FIG. 22, regarding the inter-layer-group search, the encoding of the attribute may include searching for the neighbor candidate of the attribute based on neighbor nodes of a parent subgroup of the subgroup in the layer group.

Referring to FIG. 23, regarding the layer-group adapted position, nodes within the child subgroup bounding box, and nodes out of the child subgroup bounding box, based on the neighbor candidate being in the subgroup, a geometry position of the neighbor candidate may be considered based on the subgroup. Based on the neighbor candidate being out of the subgroup, the geometry position of the neighbor candidate may be considered based on the parent subgroup of the subgroup.

Referring to FIG. 23, regarding atlas shift, the encoding of the attribute may further include aligning a start position of nodes included in the subgroup and a start position of nodes included in the parent subgroup of the subgroup, wherein atlas information may be shifted to the attribute.

Referring to FIG. 22, regarding the subgroup weight derivation, the encoding of the attribute may further include performing predicting transform on the attribute based on a quantization weight, wherein the quantization weight may be generated based on whether a current node is referenced as a neighbor node.

Referring to FIG. 22, regarding the weight generation method ((weight(m)+=alpha*numRefNodes(m)/maxNumRefNodes+beta)), the quantized weight for node m may be generated based on the number of nodes referencing the current node as a neighbor node (numRefNodes(m)), the maximum number of related nodes in the current subgroup (maxNumRefNodes), and the coefficients related to the weight (alpha and beta).

Referring to FIGS. 27 to 29, regarding the subgroup weight adjustment coefficients (subgroup_weight_adj_coeff_a and subgroup_weight_adj_coeff_b), the bitstream may contain coefficient information related to the weight of the subgroup including the point cloud data.

The point cloud data transmission method may be performed by a transmission device. The transmitting device may include an encoder configured to encode point cloud data, and a transmitter configured to transmit the point cloud data. The transmission device may include a memory storing encoding instructions and a processor configured to perform encoding operations.

A method of receiving point cloud data may be performed in the reverse process to the method of transmitting point cloud data. Referring to FIG. 1, the reception method may include receiving a bitstream containing point cloud data and decoding the point cloud data.

The decoding of the point cloud data may include decoding an attribute of the point cloud data. The decoding of the attribute may include generating a layer group based on an LOD of the attribute and searching for a neighbor candidate of the attribute based on neighbor nodes of a subgroup in a layer group.

The decoding of the attribute may include searching for the neighbor candidate of the attribute based on neighbor nodes of a parent subgroup of the subgroup in the layer group.

The decoding of the attribute may further include aligning a start position of nodes included in the subgroup and a start position of nodes included in the parent subgroup of the subgroup, wherein atlas information may be shifted to the attribute.

The point cloud data reception method may be performed by a reception device. The reception device may include a receiver configured to receive a bitstream containing the point cloud data and a decoder configured to decode the point cloud data.

As a result, the point cloud data may be compressed and reconstructed with high compression efficiency. Also, spatial random access and scalable coding may be implemented.

The embodiments have been described in terms of a method and/or a device, and the description of the method and the description of the device may be applied complementary to each other.

Although the accompanying drawings have been described separately for simplicity, it is possible to design new embodiments by combining the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In the present disclosure, "/"and"," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to perform the related operation or interpret the related definition according to a specific condition when the specific condition is satisfied.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related details have been described in the best mode for carrying out the embodiments.

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

The invention claimed is:

1. A method of encoding point cloud data, the method comprising:

encoding geometry data of a fine granularity slice (FGS) for point cloud data;

encoding attribute data of the FGS for the point cloud data, wherein the FGS is identified by a pair consisting of a layer-group index (layer_group_id) and a subgroup index (subgroup_id), wherein the attribute data includes an attribute data unit ADU) or a dependent attribute data unit (DADU) based on the pair of the layer_group_id and the subgroup_id, and wherein a header of the DADU includes a flag indicating whether subgroup weight adjustment coefficients are present for a current subgroup for the FGS; and generating a bitstream containing the geometry data and the attribute data.

2. The method of claim 1, wherein the encoding of the attribute comprises:

generating a layer group based on a level of detail (LOD) for the attribute; and searching for a neighbor candidate of the attribute based on neighbor nodes of a subgroup in the layer group.

3. The method of claim 2, wherein the encoding of the attribute further comprises:

searching for the neighbor candidate of the attribute based on neighbor nodes of a parent subgroup of the subgroup in the layer group.

4. The method of claim 3, wherein:

based on the neighbor candidate being in the subgroup, a geometry position of the neighbor candidate is considered based on the subgroup; and based on the neighbor candidate being out of the subgroup, the geometry position of the neighbor candidate is considered based on the parent subgroup of the subgroup.

5. The method of claim 4, wherein the encoding of the attribute further comprises:

aligning a start position of nodes included in the subgroup and a start position of nodes included in the parent subgroup of the subgroup, wherein atlas information is shifted to the attribute.

6. The method of claim 4, wherein the encoding of the attribute further comprises:

performing predicting transform on the attribute based on a quantization weight, wherein the quantization weight is generated based on whether a current node is referenced as a neighbor node.

7. The method of claim 6, wherein the quantization weight is generated based on the number of nodes referencing the current node as the neighbor node, a maximum number of related nodes in a current subgroup, and a coefficient related to the quantization weight.

8. The method of claim 1, wherein the bitstream contains coefficient information related to a quantization weight for a subgroup including the point cloud data.

9. A device for encoding point cloud data, comprising:

a memory; and at least one processor connected to the memory, the at least one processor configured to:

encode geometry data of a fine granularity slice (FGS) for point cloud data; and encode attribute data of the FGS for the point cloud data, wherein the FGS is identified by a pair consisting of a layer-group index (layer_group_id) and a subgroup index (subgroup_id), wherein the attribute data includes an attribute data unit (ADU) or a dependent attribute data unit (DADU) based on the pair of the layer_group_id and the subgroup_id, and wherein a header of the DADU includes a flag indicating whether subgroup weight adjustment coefficients are present for a current subgroup for the FGS; and generate a bitstream containing the geometry data and the attribute data.

10. A method of decoding point cloud data, the method comprising:

obtaining a bitstream including geometry data and attribute data of fine granularity slices (FGSs) for point cloud data; and obtaining an FGS based on a pair consisting of a layer-group index(layer_group_id) and a subgroup index (subgroup_id);

decoding the geometry data; and decoding an attribute data unit (ADU) or a dependent attribute data unit (DADU) based on the pair of the layer_group_id and the subgroup_id, wherein a header of the DADU includes a flag indicating whether subgroup weight adjustment coefficients are present for a current subgroup for the FGS.

11. The method of claim 10, wherein the decoding of the attribute comprises:

generating a layer group based on a level of detail (LOD) for the attribute; and searching for a neighbor candidate of the attribute based on neighbor nodes of a subgroup in the layer group.

12. The method of claim 11, wherein the decoding of the attribute further comprises:

searching for the neighbor candidate of the attribute based on neighbor nodes of a parent subgroup of the subgroup in the layer group.

13. The method of claim 12, wherein:

based on the neighbor candidate being in the subgroup, a geometry position of the neighbor candidate is considered based on the subgroup; and based on the neighbor candidate being out of the subgroup, the geometry position of the neighbor candidate is considered based on the parent subgroup of the subgroup.

14. The method of claim 13, wherein the decoding of the attribute further comprises:

aligning a start position of nodes included in the subgroup and a start position of nodes included in the parent subgroup of the subgroup, wherein atlas information is shifted to the attribute.

15. A device for decoding point cloud data, comprising:

a memory; and at least one processor connected to the memory, the at least one processor configured to:

obtain a bitstream including geometry data and attribute data of fine granularity slices (FGSs) for point cloud data;

obtain an FGS based on a pair consisting of a layer-group index (layer_group_id) and a subgroup index (subgroup_id); and decode the geometry data; and decode an attribute data unit (ADU) or a dependent attribute data unit (DADU) based on the pair of the layer_group_id and the subgroup_id, wherein a header of the DADU includes a flag indicating whether subgroup weight adjustment coefficients are present for a current subgroup for the FGS.

* * * * *